(12) United States Patent
Bellenger et al.

(10) Patent No.: US 6,263,016 B1
(45) Date of Patent: Jul. 17, 2001

(54) METHODS FOR INTERFACING A SUBSCRIBER LINK TO DIGITAL NETWORKS

(75) Inventors: Donald Morgan Bellenger, Los Altos Hills; Richard Guy Carrington Williams, San Diego, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/018,771

(22) Filed: Feb. 4, 1998

(51) Int. Cl.$^7$ ........................................................ H04L 5/16

(52) U.S. Cl. ......................... 375/222; 375/219; 375/242; 370/231; 370/236; 370/468

(58) Field of Search ..................................... 375/222, 219, 375/242; 370/231, 236, 468; 714/708

(56) References Cited

U.S. PATENT DOCUMENTS

| | | |
|---|---|---|
| 3,532,827 | 10/1970 | Ewin . |
| 3,821,484 | 6/1974 | Sternung et al. . |
| 4,002,849 | 1/1977 | Kotler et al. . |
| 4,282,408 | 8/1981 | Stauers . |
| 4,665,514 | 5/1987 | Ching et al. . |
| 4,782,512 | 11/1988 | Hutton . |
| 5,119,403 | 6/1992 | Krishnan . |
| 5,134,611 | 7/1992 | Steinka et al. . |
| 5,185,763 | 2/1993 | Krishnan . |
| 5,198,818 | 3/1993 | Samueli et al. . |
| 5,202,884 | 4/1993 | Close et al. . |
| 5,210,530 | 5/1993 | Kammerer et al. . |
| 5,214,650 | 5/1993 | Renner et al. . |
| 5,222,077 | 6/1993 | Krishnan . |
| 5,247,347 | 9/1993 | Litteral et al. . |
| 5,282,155 | 1/1994 | Jones . |
| 5,285,474 | 2/1994 | Chow et al. . |
| 5,293,402 | 3/1994 | Crespo et al. . |
| 5,295,159 | 3/1994 | Kerpez . |
| 5,313,454 | * 5/1994 | Bustini et al. ........................ 370/231 |
| 5,331,670 | 7/1994 | Sorbara et al. . |
| 5,337,348 | 8/1994 | Yamazaki et al. . |
| 5,339,355 | 8/1994 | Mori et al. . |
| 5,341,474 | 8/1994 | Gelman et al. . |
| 5,345,437 | 9/1994 | Ogawa . |
| 5,367,540 | 11/1994 | Kakuishi et al. . |
| 5,371,532 | 12/1994 | Gelman et al. . |
| 5,400,322 | 3/1995 | Hunt et al. . |
| 5,404,388 | 4/1995 | Eu . |
| 5,408,260 | 4/1995 | Arnon . |
| 5,408,522 | 4/1995 | Ikehata et al. . |
| 5,408,527 | 4/1995 | Tsutsu . |
| 5,408,614 | 4/1995 | Thornton et al. . |
| 5,410,264 | 4/1995 | Lechleider . |
| 5,410,343 | 4/1995 | Coddington et al. . |
| 5,414,455 | 5/1995 | Hooper et al. . |
| 5,414,733 | 5/1995 | Turner . |
| 5,422,876 | 6/1995 | Turudic . |
| 5,428,608 | 6/1995 | Freeman et al. . |
| 5,440,335 | 8/1995 | Beveridge . |
| 5,442,390 | 8/1995 | Hooper et al. . |

(List continued on next page.)

Primary Examiner—Stephen Chin
Assistant Examiner—Shuwang Liu
(74) Attorney, Agent, or Firm—McDonnell Boehnen Hulbert & Berghoff

(57) ABSTRACT

The current invention provides methods for relieving congestion associated with interfacing multiple types of subscriber link traffic, i.e. voice, voice-band data, and broadband data, with a network such as the public switched telephone network (PSTN). In an embodiment of the invention waste of modem resources is diminished by reducing the magnitude of the transmission parameters between a data terminal and modem resources during intervals of reduced data flow. This frees scarce modem resources for other sessions. In another embodiment of the invention the time required to initiate session setup is reduced. This reduces the time devoted by modem facilities to call setup at the start of session, or after an idle period.

26 Claims, 23 Drawing Sheets

U.S. PATENT DOCUMENTS

| | | | |
|---|---|---|---|
| 5,442,637 | * 8/1995 | Nguyen | 714/708 |
| 5,452,306 | 9/1995 | Turudic et al. . | |
| 5,453,779 | 9/1995 | Dan et al. . | |
| 5,461,415 | 10/1995 | Wolf et al. . | |
| 5,461,616 | 10/1995 | Suzuki . | |
| 5,461,640 | 10/1995 | Gatherer . | |
| 5,469,495 | 11/1995 | Beveridge . | |
| 5,475,735 | 12/1995 | Williams et al. . | |
| 5,477,263 | 12/1995 | O'Callaghan et al. . | |
| 5,479,447 | 12/1995 | Chow et al. . | |
| 5,495,483 | 2/1996 | Grube et al. . | |
| 5,513,251 | 4/1996 | Rochkind et al. . | |
| 5,521,914 | 5/1996 | Mavraganis et al. | 370/352 |
| 5,528,585 | 6/1996 | Cooley et al. . | |
| 5,539,734 | 7/1996 | Burwell et al. | 370/410 |
| 5,546,379 | 8/1996 | Thaweethai et al. . | |
| 5,550,881 | 8/1996 | Sridhar et al. | 375/377 |
| 5,590,132 | * 12/1996 | Ishibashi et al. | 370/236 |
| 5,598,435 | 1/1997 | Williams | 375/261 |
| 5,600,715 | 2/1997 | Bingel | 379/393 |
| 5,623,605 | 4/1997 | Keshav et al. | 709/236 |
| 5,631,897 | 5/1997 | Pacheco et al. | 370/237 |
| 5,633,866 | 5/1997 | Callon | 370/397 |
| 5,668,857 | 9/1997 | McHale . | |
| 5,673,253 | 9/1997 | Shaffer | 370/229 |

* cited by examiner

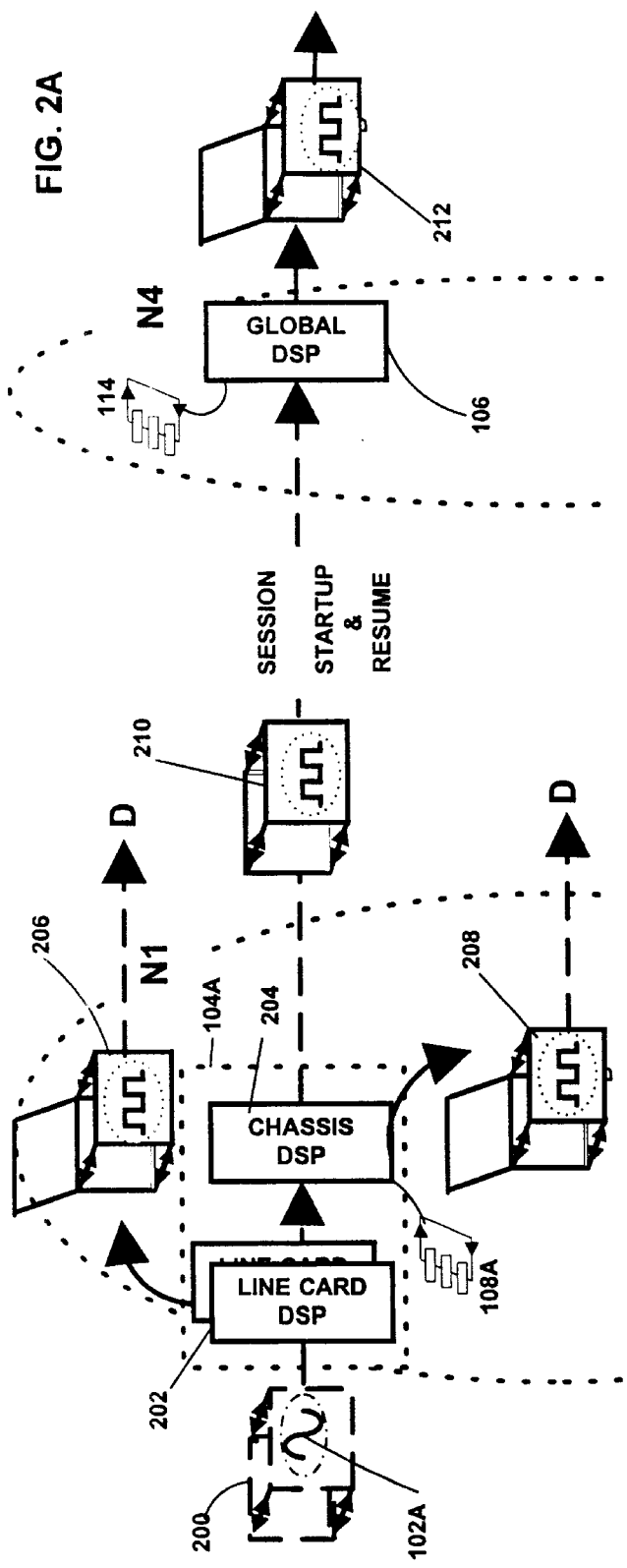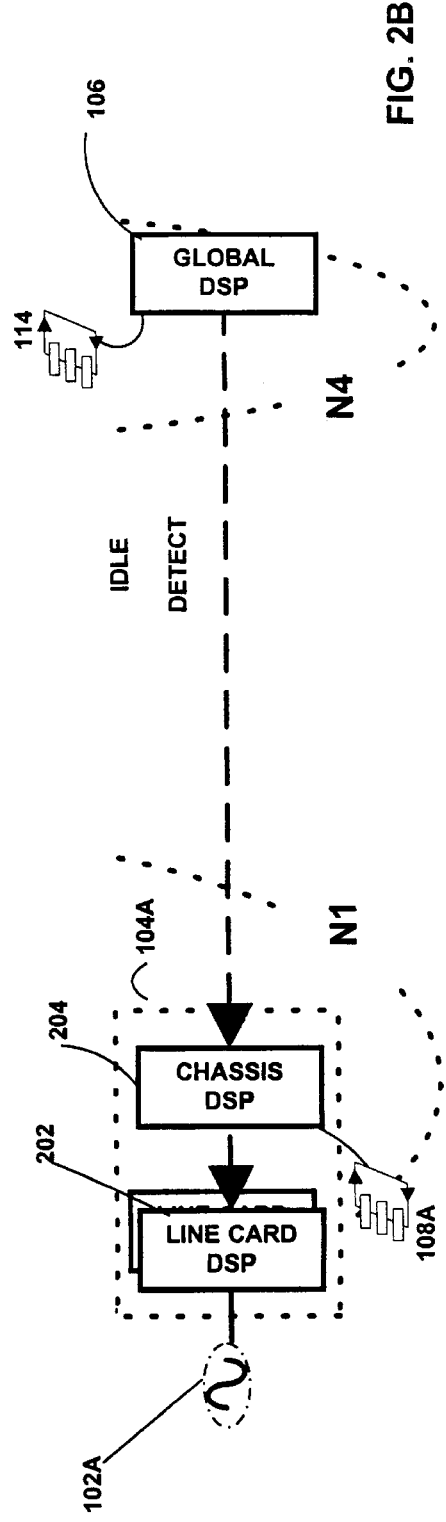

FIG. 5  300 - 3400 hz / 112 Khz

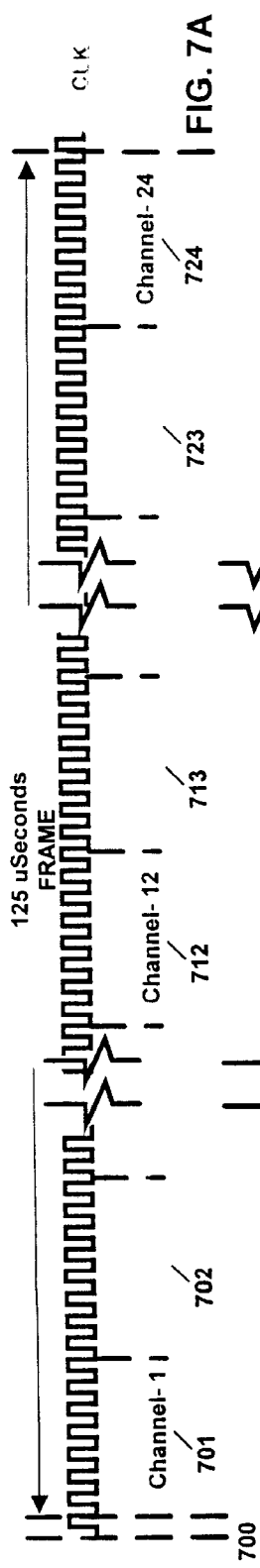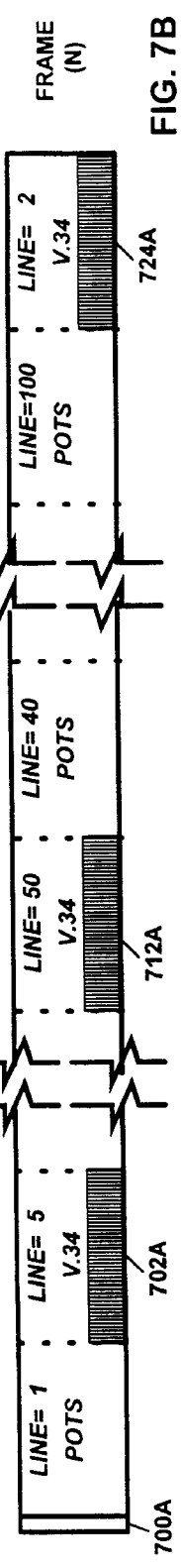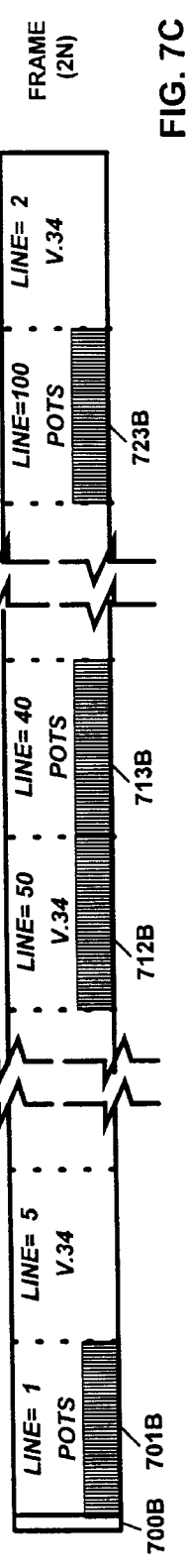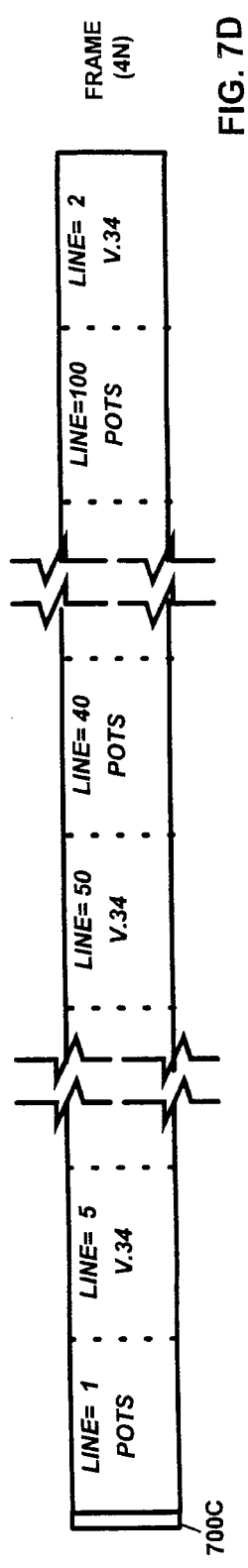

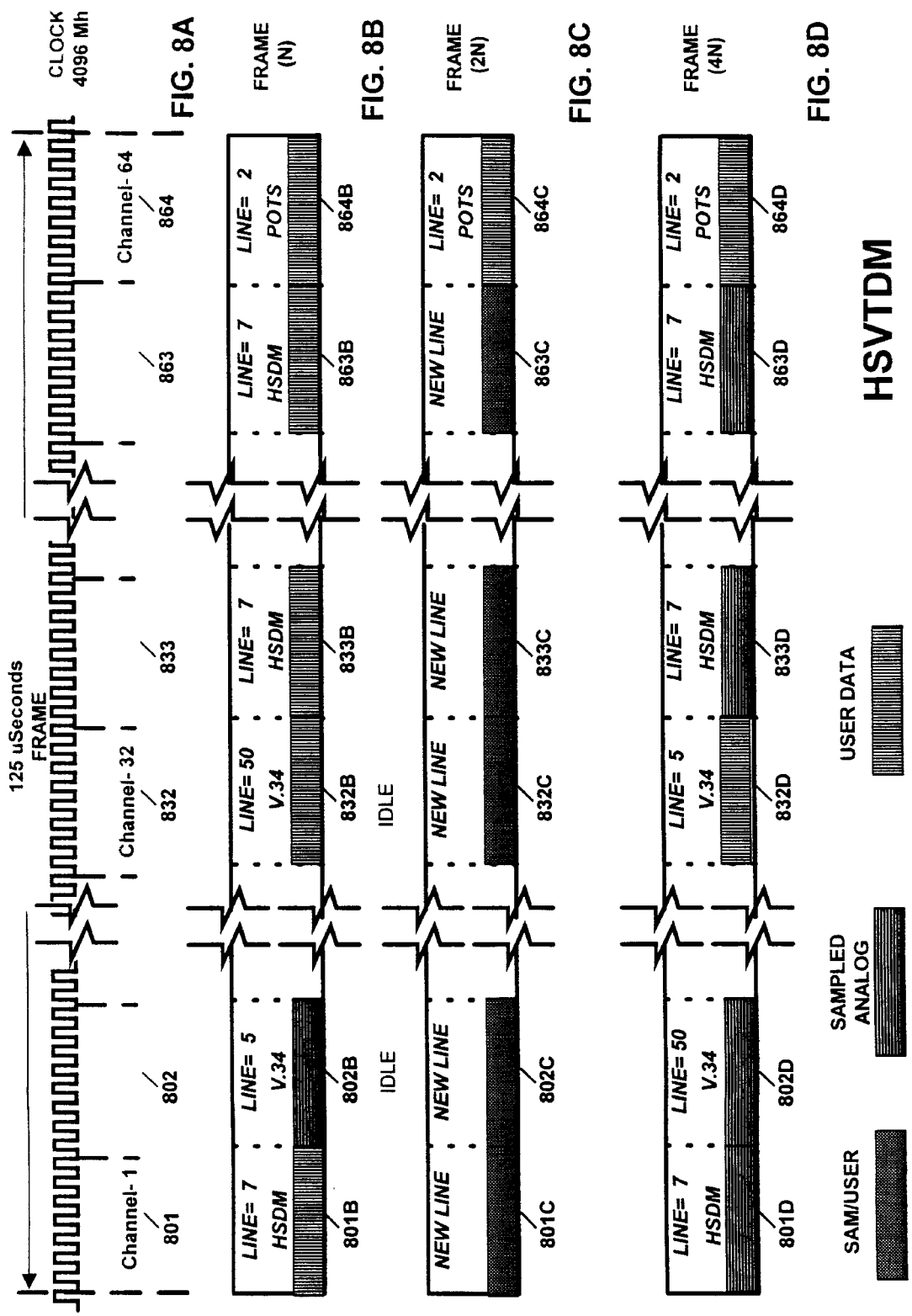

EXIT IDLE
after
RATE REDUCTION
or
CLEARDOWN w/o
HANGUP

914C/A

| $INFO_0$ bits LSB:MSB | Definition |
|---|---|
| 0:3 | Fill bits: 1111 |
| 4:11 | Frame sync: 01110010, where the left-most bit is first in time |
| 12 | Set to 1 indicates symbol rate 2743 is supported |
| 13 | Set to 1 indicates symbol rate 2800 is supported |
| 14 | Set to 1 indicates symbol rate 3429 is supported |
| 15 | Set to 1 indicates the ability to transmit at the low carrier frequency with a symbol rate of 3000 |
| 16 | Set to 1 indicates the ability to transmit at the high carrier frequency with a symbol rate of 3000 |
| 17 | Set to 1 indicates the ability to transmit at the low carrier frequency with a symbol rate of 3200 |
| 18 | Set to 1 indicates the ability to transmit at the high carrier frequency with a symbol rate of 3200 |
| 19 | Set to 0 indicates that transmission with a symbol rate of 3429 is disallowed |
| 20 | Set to 1 indicates the ability to reduce transmit power to a value lower than the nominal setting |
| 21:23 | Maximum allowed difference in symbol rates in the transmit and receive directions. With the symbol rates labelled in increasing order, where 0 represents 2400 and 5 represents 3429, an integer between 0 and 5 indicates the difference allowed in number of symbol rate steps |
| 24 | Set to 1 in an $INFO_0$ sequence transmitted from a CME modem |
| 25 | Set to 1 indicates the ability to support up to 1664 point signal constellations |
| 26:27 | Transmit clock source: 0 = internal, 1 = synchronized to receive timing, 2 = external, 3 = reserved for ITU |
| 28 | Set to 1 to acknowledge correct reception of an $INFO_0$ frame during error recovery |
| 29:44 | CRC |
| 45:48 | Fill bits: 1111 |

NOTES

1 – Bits 12 through 14 are used to indicate the modem's capabilities and/or configuration. The values of bits 15 through 20 depend upon regulatory requirements and apply only to the modem's transmitter.

2 – Bit 24 may be used in conjunction with the GSTN access category octet defined in Recommendation V.8 to determine the optimum parameters for the signal convertors and error-control functions in the call and answer modem and any intervening CME.

| INFO$_{1c}$ bits LSB:MSB | Definition |
|---|---|
| 0:3 | Fill bits: 1111 |
| 4:11 | Frame sync: 01110010, where the left-most bit is first in time |
| 12:14 | Minimum power reduction to be implemented by the answer modem transmitter. An integer between 0 and 7 gives the recommended power reduction in dB. These bits shall indicate 0 if INFO$_{0a}$ indicated that the answer modem transmitter cannot reduce its power |
| 15:17 | Additional power reduction, below that indicated by bits 12-14, which can be tolerated by the call modem receiver. An integer between 0 and 7 gives the additional power reduction in dB. These bits shall indicate 0 if INFO$_{0a}$ indicated that the answer modem transmitter cannot reduce its power |
| 18:24 | Length of MD to be transmitted by the call modem during Phase 3. An integer between 0 and 127 gives the length of this sequence in 35 ms increments |
| 25 | Set to 1 indicates that the high carrier frequency is to be used in transmitting from the answer modem to the call modem for a symbol rate of 2400 |
| 26:29 | Pre-emphasis filter to be used in transmitting from the answer modem to the call modem for a symbol rate of 2400. These bits form an integer between 0 and 10 which represents the pre-emphasis filter index (see Tables 3 and 4) |
| 30:33 | Projected maximum data rate for a symbol rate of 2400. These bits form an integer between 0 and 14 which gives the projected data rate as a multiple of 2400 bits/s. A 0 indicates the symbol rate cannot be used |
| 34:42 | Probing results pertaining to a final symbol rate selection of 2743 symbols per second. The coding of these 9 bits is identical to that for bits 25-33 |
| 43:51 | Probing results pertaining to a final symbol rate selection of 2800 symbols per second. The coding of these 9 bits is identical to that for bits 25-33 |
| 52:60 | Probing results pertaining to a final symbol rate selection of 3000 symbols per second. The coding of these 9 bits is identical to that for bits 25-33. Information in this field shall be consistent with the answer modem capabilities indicated in INFO$_{0a}$ |
| 61:69 | Probing results pertaining to a final symbol rate selection of 3200 symbols per second. The coding of these 9 bits is identical to that for bits 25-33. Information in this field shall be consistent with the answer modem capabilities indicated in INFO$_{0a}$ |
| 70:78 | Probing results pertaining to a final symbol rate selection of 3429 symbols per second. The coding of these 9 bits is identical to that for bits 25-33. Information in this field shall be consistent with the answer modem capabilities indicated in INFO$_{0a}$ |
| 79:88 | Frequency offset of the probing tones as measured by the call modem receiver. The frequency offset number shall be the difference between the nominal 1050 Hz line probing signal tone received and the 1050 Hz tone transmitted, f(received) − f(transmitted). A two's complement signed integer between −511 and 511 gives the measured offset in 0.02 Hz increments. Bit 88 is the sign bit of this integer. The frequency offset measurement shall be accurate to 0.25 Hz. Under conditions where this accuracy cannot be achieved, the integer shall be set to −512 indicating that this field is to be ignored |
| 89:104 | CRC |
| 105:108 | Fill bits: 1111 |

NOTE – Projected maximum data rates greater than 12 in bits 30:33 shall only be indicated when the remote modem supports up to 1664 point signal constellations.

TABLE 16/V.34

Definition of bits in the $INFO_{1a}$ sequence

| $INFO_{1a}$ bits LSB:MSB | Definition |
|---|---|
| 0:3 | Fill bits: 1111 |
| 4:11 | Frame sync: 01110010, where the left-most bit is first in time |
| 12:14 | Minimum power reduction to be implemented by the call modem transmitter. An integer between 0 and 7 gives the recommended power reduction in dB. These bits shall indicate 0 if $INFO_{0c}$ indicated that the call modem transmitter cannot reduce its power |
| 15:17 | Additional power reduction, below that indicated by bits 12:14, which can be tolerated by the answer modem receiver. An integer between 0 and 7 gives the additional power reduction in dB. These bits shall indicate 0 if $INFO_{0c}$ indicated that the call modem transmitter cannot reduce its power |
| 18:24 | Length of MD to be transmitted by the answer modem during Phase 3. An integer between 0 and 127 gives the length of this sequence in 35 ms increments |
| 25 | Set to 1 indicates that the high carrier frequency is to be used in transmitting from the call modem to the answer modem. This shall be consistent with the capabilities of the call modem indicated in $INFO_{0c}$ |
| 26:29 | Pre-emphasis filter to be used in transmitting from the call modem to the answer modem. These bits form an integer between 0 and 10 which represents the pre-emphasis filter index (see Tables 3 and 4) |
| 30:33 | Projected maximum data rate for the selected symbol rate from the call modem to the answer modem. These bits form an integer between 0 and 14 which gives the projected data rate as a multiple of 2400 bits/s |
| 34:36 | Symbol rate to be used in transmitting from the answer modem to the call modem. An integer between 0 and 5 gives the symbol rate, where 0 represents 2400 and a 5 represents 3429. The symbol rate selected shall be consistent with information in $INFO_{1c}$ and consistent with the symbol rate asymmetry allowed as indicated in $INFO_{0a}$ and $INFO_{0c}$. The carrier frequency and pre-emphasis filter to be used are those already indicated for this symbol rate in $INFO_{1c}$ |
| 37:39 | Symbol rate to be used in transmitting from the call modem to the answer modem. An integer between 0 and 5 gives the symbol rate, where 0 represents 2400 and a 5 represents 3429. The symbol rate selected shall be consistent with the capabilities indicated in $INFO_{0a}$ and consistent with the symbol rate asymmetry allowed as indicated in $INFO_{0a}$ and $INFO_{0c}$ |
| 40:49 | Frequency offset of the probing tones as measured by the answer modem receiver. The frequency offset number shall be the difference between the nominal 1050 Hz line probing signal tone received and the 1050 Hz tone transmitted, f(received) − f(transmitted). A two's complement signed integer between −511 and 511 gives the measured offset in 0.02 Hz increments. Bit 49 is the sign bit of this integer. The frequency offset measurement shall be accurate to 0.25 Hz. Under conditions where this accuracy cannot be achieved, the integer shall be set to −512 indicating that this field is to be ignored |
| 50:65 | CRC |
| 66:69 | Fill bits: 1111 |

NOTE − Projected maximum data rates greater than 12 in bits 30:33 shall only be indicated when the remote modem supports up to 1664 point signal constellations.

| MP bits LSB:MSB | Definition |
|---|---|
| 0:16 | Frame sync: 1111111111111111 |
| 17 | Start bit: 0 |
| 18 | Type: 1 |
| 19 | Reserved for ITU: This bit is set to 0 by the transmitting modem and is not interpreted by the receiving modem |
| 20:23 | Maximum call modem to answer modem data signalling rate:<br>Data rate = N * 2400 where N is a four-bit integer between 1 and 14 |
| 24:27 | Maximum answer modem to call modem data signalling rate:<br>Data rate = N * 2400 where N is a four-bit integer between 1 and 14 |
| 28 | Auxiliary channel select bit. Set to 1 if modem is capable of supporting and enables auxiliary channel. Auxiliary channel is used only if both modems set this bit to 1 |
| 29:30 | Trellis encoder select bits:<br>0 = 16 state, 1 = 32 state, 2 = 64 state, 3 = reserved for ITU.<br>Receiver requires remote-end transmitter to use selected trellis encoder |
| 31 | Non-linear encoder parameter select bit for the remote-end transmitter.<br>0: Θ = 0, 1: Θ = 0.3125 |
| 32 | Constellation shaping select bit for the remote-end transmitter.<br>0: minimum, 1: expanded (see Table 10) |
| 33 | Acknowledge bit. 0 = modem has not received MP from far end. 1 = received MP from far end |
| 34 | Start bit: 0 |
| 35:49 | Data signalling rate capability mask.<br>Bit 35:2400; bit 36:4800; bit 37:7200; ...; bit 46:28 800; bit 47:31 200; bit 48:33 600; bit 49: Reserved for ITU. (This bit is set to 0 by the transmitting modem and is not interpreted by the receiving modem.) Bits set to 1 indicate data signalling rates supported and enabled in both transmitter and receiver of modem |
| 50 | Asymmetric data signalling rate enable. Set to 1 indicates modem capable of asymmetric data signalling rates |
| 51 | Start bit: 0 |
| 52:67 | Precoding coefficient h(1) real |
| 68 | Start bit: 0 |
| 69:84 | Precoding coefficient h(1) imaginary |
| 85 | Start bit: 0 |
| 86:101 | Precoding coefficient h(2) real |
| 102 | Start bit: 0 |
| 103:118 | Precoding coefficient h(2) imaginary |
| 119 | Start bit: 0 |
| 120:135 | Precoding coefficient h(3) real |
| 136 | Start bit: 0 |
| 137:152 | Precoding coefficient h(3) imaginary |
| 153 | Start bit: 0 |
| 154:169 | Reserved for ITU: These bits are set to 0 by the transmitting modem and are not interpreted by the receiving modem |
| 170 | Start bit: 0 |
| 171:186 | CRC |
| 187 | Fill bit: 0 |

NOTE – Data rates greater than 12 in bits 20:23 and 24:27 shall only be indicated when the remote modem supports up to 664 point signal constellations.

FIG. 11D

METHODS FOR INTERFACING A SUBSCRIBER LINK TO DIGITAL NETWORKS

BACKGROUND OF INVENTION

Field of Invention

For the past one hundred years analog transmission has dominated all communication. In particular, the telephone system was originally based entirely on analog signaling. While the long-distance trunks are now largely digital in more advanced countries, the local loops are still analog and are likely to remain so for a least a decade or two, due to the enormous cost of converting them. Consequently, when a computer wishes to send digital data over a dial-up line the data must first be converted into analog form by a modem for transmission over the local loop, then converted to digital form for transmission over the long-haul trunks, then back to analog over the local loop at the receiving end and finally back to digital by another modem for storage in the destination computer.

Integrated services digital network (ISDN) can be viewed as an evolutionary progression and a conversion of analog telephone systems into an eventual all-digital network with both voice and data to be carried end-to-end in digital form. As it currently exists, the telephone company backbone and switching equipment is devoted to voice traffic over what is called a narrow band ISDN (N-ISDN) backbone.

The ISDN network architecture is based on standards set by the International Telecommunications Union (ITU) with standards in the United States largely driven by American National Standards Institute (ANSI). Two types of ISDN service are available: Basic Rate ISDN (BRI) and Primary Rate ISDN (PRI). BRI delivers two B-channels, each having a capacity of 64 Kbps and a 16 Kbps D-channel. PRI, i.e. T1, provides twenty three B-channels of 64 Kbps and a 64 Kbps D-channel. The D-channel channel is used for signaling between the central office switch and terminating equipment which could be a telephone set, personal computer, video-conferencing set or other device. The B-channels are used for any kind of service including voice data and video.

In the early days of the telephone, the connection was made by having an operator plug a jumper cable into the input and output sockets. An important property of this circuit switching is the need to set up an end-to-end path before any data can be sent. The elapsed time between the end of dialing and the start of ringing can approach ten seconds or more on a long-distance or international call. During this time interval the telephone system is hunting for a signal path. Once the setup is completed the only delay for data is the propagation time for the electromagnetic signal, about 5 msec per thousand kilometers. Once the complete end-to-end circuit is established for each pair of voice and data users the circuit is dedicated for the full duration of a call. The circuit is disconnected when either party hangs up.

To combine multiple telephone calls the telephone company uses a multiplexing technique called time division multiplexing (TDM). TDM operates on digital data. Voice digitization is accomplished by a technique known as pulse code modulation (PCM) in which an incoming analog voice conversation is encoded into a 64 Kbps digital data stream for transmission on telephone company digital transmission facilities. Once a call is digitized and routed to the distant telephone company office serving the destination or called party the 64 Kbps digital data stream is converted back to an analog voice signal and passed to the called party. Similarly the voice conversation generated by the called party flows in an analog form via the local loop to the telephone company office serving the subscriber. At that location the conversation is digitized and multiplexed using TDM equipment and placed onto a digital trunk linking that office to the office serving the call originator. At that office the call is removed from the trunk by the processing known as demultiplexing, converted back into its analog format and passed to the local subscriber.

Under the T1 format TDM occurs in frames containing 24 voice sessions. Each of the 24 groups places 8 bits into each frame for a total of 192 bits, plus an additional synchronization bit. One frame is transmitted every 125 microseconds for a total of 8000 frames per second. The frame is identified as a DS1 and each of the 24 channels within it a DS0. Thus, the T1 operating rate can be expressed as 24 channels, i.e. DS0s, times 64 kbps/channels resulting in an operating rate of 1.544 Mbps. A telephone call is established by dedicating a specific channel, i.e. a DS0. The DS0 is dedicated to a call for the full duration of the session.

One of the major limitations associated with PSTN circuit-switching is a permanent assignment of a path for the exclusive use of communication sessions during the duration of that session. This means that regardless of whether a full circuit or channel within a circuit is used to establish a path that circuit or channel cannot be used to support other activities until the session in progress is completed. The disadvantage to circuit switching particularly for a data transmission is that bandwidth must be permanently allocated for the duration of the session even though data traffic is bursty rather than continuous.

Recognizing the limitations of circuit-switching, packet switching was developed as a technique to enable the sharing of transmission facilities among many users. To overcome this limitation and to approximate over telephone networks the capabilities that existed over local area networks (LAN) packet switching over public data networks (PDN) was developed. Currently, packet switching exists as an add on to existing circuit-switched PSTN infrastructure.

Packet-based PDN utilize the existing telephone company backbone, e.g. T1 lines, for the transmission of packets of data Packet switching also takes advantage of the burstiness of digitized speech and data communications. User information streams are divided into segments that are combined with headers to form packets. A packet switching network routes the packets to their appropriate destinations based on addresses contained in the packet headers. In this way, the network resources are statistically shared among all users, than being dedicated to users on a full-time basis. An inherent characteristic of packet switched networks is large and variable end-to-end delays that may be experienced by individual packets during transport. Sampled analog signals will only be useful for the transfer of the embedded user data with adequate additional buffering. Another problem is that packets can be delivered out of order to a destination if corrective measures are not taken. Packet network use is normally more economical than transmission over the dedicated switched circuits of traditional public-switched telephone network. Transmission facilities used to route packets from the originator to the destination examine the destination of packets, as they flow through the network and transfer the packets onto trunks based upon the packet destination and network activity.

The PSTN as it currently exists has a digital backbone that carries both packet and circuit switched traffic but the bulk of the traffic on those circuits originates over analog plain old telephone service (POTS) lines. POTS subscriber lines carry both voice and data traffic. The voice traffic enters the analog line largely unchanged, i.e. in its original analog form. There is however a basic incompatability between the digital signals transmitted by computers and those transmitted by POTS lines which were originally designed to carry analog voice signals. Although digital signals can be transmitted on an analog telephone line, their transmission distance is limited by the effects of resistance, inductance, and capacitance on the line. In addition amplifiers on the telephone lines rebuild signals literally, including any distortion experienced during transit. Thus distortion to a digital pulse is increased by the amplifier. Digital networks by contrast use regenerators that detect the incoming bit stream and create an entirely new signal that is identical with the original.

Due to the incompatabilities between the digital signals produced by computers and the analog signals POTS lines carry, a conversion device is required to enable digital signals to be carried on an analog transmission medium. The conversion device is a modem, whose name comes from a contraction of the term modulator-demodulator even though modulation and demodulation are no longer used in some types of modem. The transmitter converts the digital signals generated by computers into analog tones for transmission over telephone network analog facilities, the receiver portion of the modem receives a transmitted analog signal and reconverts it to its original digital form.

POTS analog lines are utilized to handle increasing quantities of digital data, originating from individuals and corporations. This increased demand has required a proportionate investment by the phone companies to handle the data traffic. One area in which enormous investment has been required is in linking internet service providers (ISPs) with their clients across the PSTN backbone. The required investment in this area has been increased as a result of regulations which partially exempt the ISPs from the full cost of PSTN connections. Because the ISPs do not therefore pass the full cost of PSTN connection on to their clients, i.e. they bill clients at flat rates, the clients engage in practices which waste the limited PSTN resources. One of these practices involves a client dialing in to an ISP and setting up a call session of indefinite duration. During large portions of the call session an idle condition exists, i.e. no data is being transmitted. Nevertheless the client, who is billed a flat rate, has no incentive to disconnect. Both the phone company and the ISP are disadvantaged by the practice. The ISP must lease more lines to the local office. The phone company must invest in additional resources to process the call sessions, and currently idle and active call sessions require the same amount of resources to process.

What is needed are ways to increase data handling capabilities of ISPs and the PSTN without an increase in the size of modem facilities.

SUMMARY

The current invention provides methods for allowing modem facilities which interface via subscriber links with a digital network such as the PSTN, to handle increased data The current invention also provides methods for allowing modem facilities located remotely from subscriber links to handle increased data. The current invention can be implemented with existing and enhanced client modems, both analog and digital. The current invention can be implemented at a single site, e.g. an ISP or central office, or globally with resources located at a number of sites coordinated by a control entity.

Subscriber links carry analog traffic which may originate from a telephone, or from a data terminal. Voice traffic from a telephone is analog to begin with. Computer generated data is digital to begin with and must be converted to analog before being transmitted over a subscriber link. The modem portion of a data terminal handles the conversion of digital data to an analog form for transmission on the subscriber link. Modem resources perform a similar function at the opposite end of the subscriber link.

Traditionally when a call session is initiated transmission parameters are established, e.g. baud rate, symbols, etc. by the data terminal and modem resources and maintained for the duration of the session, even during intervals when no data is being transmitted. Thus, traditionally, a considerable portion of the modem facilities processing time is wasted in high speed reception of subscriber links which may be temporarily idle, i.e. carry no data.

In an embodiment of the invention waste of central modem resources is diminished by reducing the magnitude of the transmission parameters between a data terminal and the central modem resources during intervals of reduced data flow. This frees scarce central modem resources for other sessions.

A method for managing digital transmissions on a network is disclosed. The transmissions are generated by a data terminal which communicates via an interface with the network. The method for managing comprises the acts of:

detecting in the digital transmissions a beginning of a decreased data throughput;

negotiating with the data terminal a decrease in a rate of the digital transmissions, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting.

In another embodiment of the invention the time required to initiate session setup is reduced. This reduces the time devoted by central modem facilities to call setup at the start of session, or after an idle period.

A method for managing session setup on a network, and the sessions involving a data terminal communicating via an interface with the network, and the method for managing comprising the acts of:

identifying a call session with the data terminal;

retrieving transmission parameters associated with the data terminal and the interface; and initiating communications with the data terminal in accordance with the transmission parameters obtained in said retrieving step.

DESCRIPTION OF FIGURES

FIGS. 2A–B are symbolic representations of the hierarchical processing of a call session.

FIGS. 7A–D show data transmission formats on a time division multiplex (TDM) bus.

FIGS. 8A–D show data transmission protocols on a statistical time division multiplex and hierarchical statistical time division multiplex bus.

FIGS. 11A–D show file formats associated with modem startup protocols shown in FIG. 9.

DESCRIPTION OF REPRESENTATIVE EMBODIMENTS

The current invention provides methods for relieving congestion associated with interfacing multiple types of analog subscriber line traffic, i.e. voice, voiceband data, and broad-band data, across a digital circuit-switched network, such as the public switched telephone network (PSTN).

Voice-band data is data carried on subscriber lines and transmitted within the typical frequency limits of the subscriber lines, i.e. 300–3400 Hz. This data is transmitted at an effective symbol rate of below 8,000 symbols per second. Some subscriber lines are short enough in length, as to lack load coils and other bandwidth limiting devices. These subscriber lines can carry broad-band data. Broad-band data is data transmitted at frequencies in the kilo or mega hertz range. The effective symbol rate for this data is well above 8,000 symbols per second.

The current invention relieves network congestion in three ways. First, voice-band data and broad-band data sessions are provided broader data bandwidth by being placed on a packet-switched digital network, thereby avoiding the data bandwidth constraints associated with the channel based communication protocols of the PSTN. Second, increased throughput within existing data bandwidth constraints is achieved by implementing statistical multiplexing of either or both voice-band and broad-band data. Data transmissions, unlike voice transmissions, are inherently bursty, i.e. have idle portions during which no data is being transmitted. Statistical multiplexing refers to the ability to reallocate existing network and backplane data bandwidth during idle portions of a voice-band or broad-band data session. Third, voice-band and broad-band data sessions require large amounts of digital signal processing resources in order to perform the complex receiver algorithms associated with voice-band modem protocols, e.g. V.34/56k, and or broad-band modem protocols which we will generically refer to as high speed data modem (HSDM), i.e. modems operating at symbol rates in excess of 8000 symbols/second. Typically tradeoffs exist between the savings realized by providing modem resources sufficient only to meet average data throughput, and the inconvenience to subscribers during periods of peak data throughput. The current invention avoids the bottlenecks associated with current subscriber line reception techniques such as dedicating modems to each subscriber line, and instead offers a hierarchical reception environment, dynamically configurable for both average or peak data throughput.

Figure 1A:
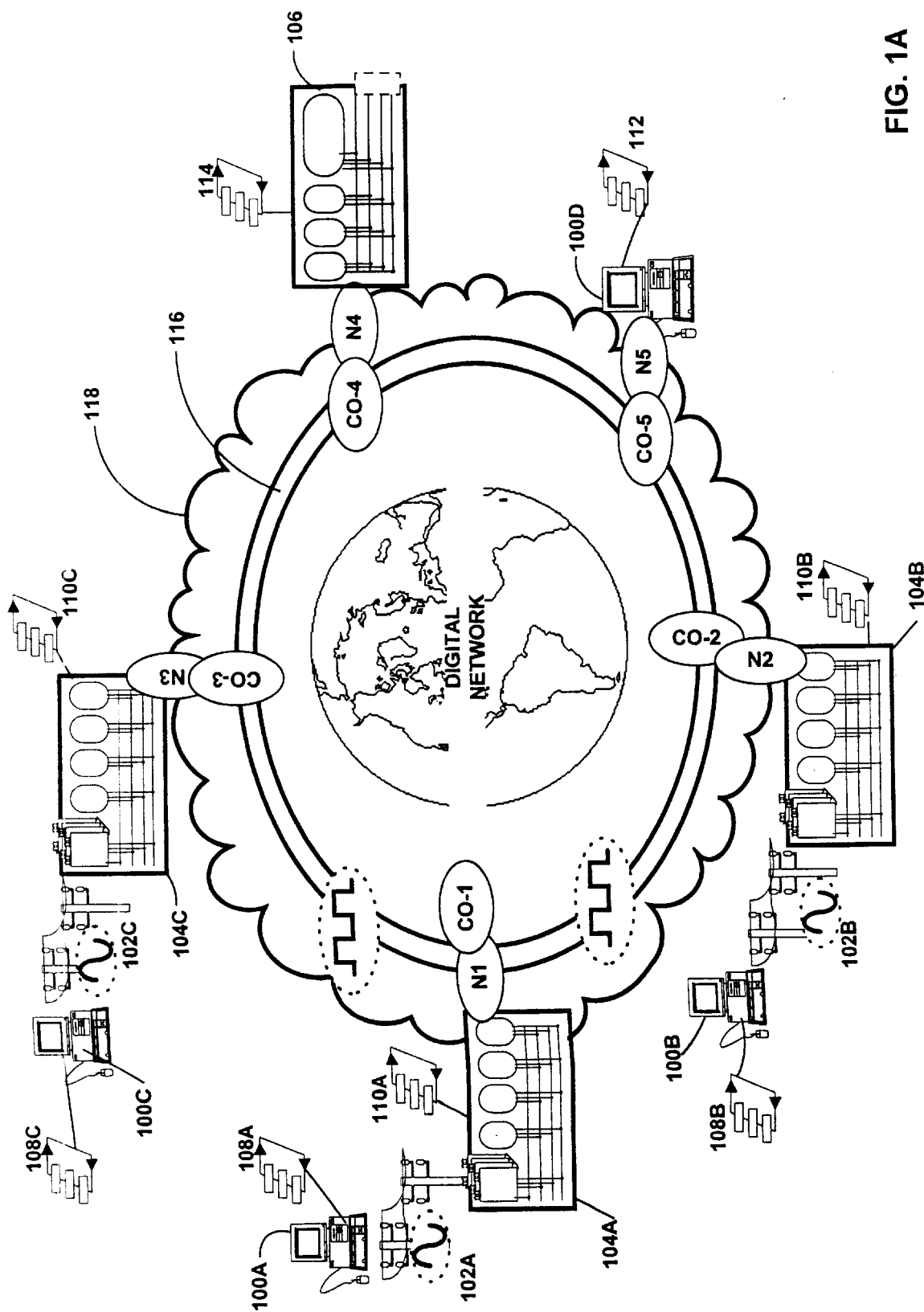
FIGS. 1A–B show global and single site embodiments of the current invention.

FIG. 1A shows an environment in which hierarchical processing capabilities are available for interfacing analog subscriber lines to packet and circuit switched networks. The environment provides statistical multiplexing and hierarchical session management (HSM). HSM refers to the extraction of user data from analog traffic by either or both primary and backup digital signal processor as determined by a control entity. Statistical multiplexing refers to the dynamic data bandwidth allocation on a digital network, bus or analog subscriber line, in proportion to session traffic. Idle detection enables statistical multiplexing. Idle detection refers to the ability to detect cessation in session traffic and react to this cessation by reallocation of subscriber line, digital network, backplane, and digital signal processing (DSP) resources. In the embodiment shown in FIG. 1A HSM, statistical multiplexing (SM) and idle detection (ID) may be practiced individually or in any combination.

The system environment shown in FIG. 1A includes remote line units 104A–C, control unit 106 and data terminals 100A–D. The networks which Interface the data terminals, include analog plain old telephone service (POTS) subscriber lines 102A–C, digital circuit-switched network 116 and digital packet-switched network 118. The digital circuit-switched network can be implemented on PSTN in a variety of protocols including T1, E1, synchronous optical network (SONET), etc. The digital packet-switched network can be implemented by protocols such as Frame Relay.

Data terminals 100A–C are connected via respectively analog subscriber lines 102A–C to remote line units 104A–C. Remote line units 104A–C are each connected to both the circuit-switched network 116 and the packet-switched network 118 at respectively nodes 1–3. In a PSTN embodiment each of these nodes 1–3 is associated with a central switching office (CO-x). The control unit 106 is connected to both the circuit-switched network 116 and the packet-switched network 118 at node 4, associated with CO-4. A digital data terminal 100D is connected to both the circuit and packet switched networks at node 5 associated with CO-5.

In operation a new session involving a party utilizing an analog subscriber line is detected by processes 108A–C on, respectively, remote line units 104A–C. These processes operating in conjunction with process 114 on the control unit 106 determine whether the call is voice or data. In the former case the traffic will be routed via the circuit-switched network 116. In the latter case, the traffic will be routed via the packet-switched network. When data is being transmitted the control unit process 114 determines where the call session will be changed from a sampled analog signal to user data. The change may take place at a number of locations, including any of the remote line units 104A–C or the control unit 106. The control unit process 114 also determines the amount of processing resources required. Voice-band data, for example, requires less resources to extract user data from an analog signal than does broad-band data When the extraction of user data occurs at the remote line unit, the packet switched network transports user data to the destination. When this extraction occurs at the global control unit, the packet switched network first transports a sampled analog signal from the remote line unit to the control unit where the signal is processed. Then the user data is routed from the global control unit to the final destination. The digital data terminal 100D interfaces digitally directly with either network, 116–118. Processes 112 on that data terminal allow it to receive a sampled analog signal or user data and to perform accordingly.

Figure 1B:
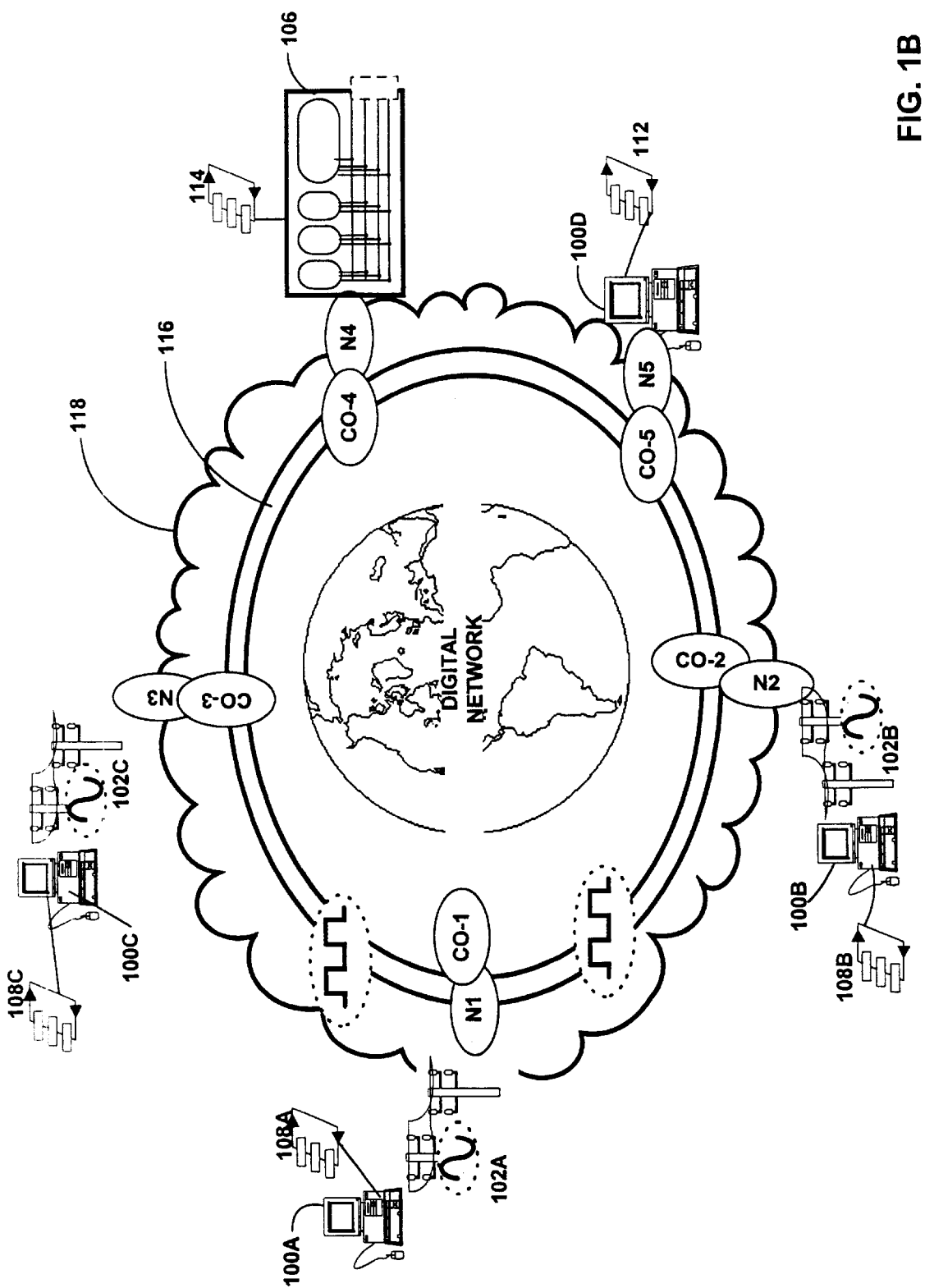

FIG. 1B shows an environment in which statistical multiplexing and session management capability is added to packet and circuit switched networks which interface with analog subscriber lines. These capabilities allow an ISP, for example, to manage traffic more efficiently with reduced resources. The ISP is equipped with a control unit 106 which is capable of controlling the client modems within data terminals 100A–C. The control unit manages these modems in a manner which reduces the processing resources allocated to these modems during idle intervals. Additionally, in an embodiment of the invention in which the client modems have enhanced statistical multiplexing capabilities, the control unit can not only reduce communication rates, but also, cleardown and hold, pass/save session parameters and resume sessions with reduced startup time.

The system environment shown in FIG. 1B includes control unit 106 and data terminals 100A–D. The networks which interface the data terminals, include analog plain old telephone service (POTS) subscriber lines 102A–C, digital circuit-switched network 116 and digital packet-switched network 118.

Data terminals 100A–C are connected via respectively analog subscriber lines 102A–C to the circuit/packet switched networks at nodes 1–3 respectively. The control unit 106 is connected to both the circuit-switched network 116 and the packet-switched network 118 at node 4, associated with CO-4. The control unit in an embodiment of the invention is located at an ISP. A digital data terminal 100D is connected to both the circuit and packet switched networks at node 5 associated with CO-5.

In operation a new session involving a party utilizing an analog subscriber line is detected by processes 114 on global control unit 106. The call session may be communicated to the control unit at the ISP over either the circuit/packet switched networks, respectively 118–116. If the control unit detects that the data terminal with which it is communicating does not have enhanced processes 108A–C then the control unit will limit its statistical multiplexing capabilities to idle detection and rate reduction. Rate reduction frees existing resources for processing other call sessions in which user data is present. If alternately the control unit detects that the modem(s) with which it is communicating do have enhanced processes 108 then the control unit may implement additional statistical multiplexing capabilities such as cleardown and hold, parameter passing, and reduced setup times. These enhanced statistical multiplexing capabilities allow the ISP to manage still more data traffic with existing resources. During idle intervals processing resources allocated to a call session may be terminated by implementing a cleardown, or cleardown and hold. Additionally, parameter passing between the control unit and the data terminal with enhanced processes 108, may be utilized to reduce the time required to setup a subsequent call.

FIGS. 2A–B show a symbolic representation of the hierarchical and statistical multiplexing capabilities of the remote line unit 104A and the control unit 106 as shown in FIG. 1A. The remote line unit includes line card 202 and backup DSP 204. The line card has primary DSP resources which are allocable to receive incoming subscriber line traffic and to transmit outgoing subscriber line traffic. The backup DSP 204 offers similar receive and transmit capabilities. The backup DSP 204 has digital signal processing resources allocable to an analog session originating on any one of the input lines of any of a number of line cards on the remote line unit 104A, e.g. line card 202. Symbolically sampled analog traffic is shown as a closed container and user data traffic is shown as an open container.

As will be explained in greater detail in connection with FIG. 3, analog modem traffic including that adhering to a V.34 protocol is encoded in a manner which requires extensive processing resources to transmit and receive. After A/D conversion sampled analog signals must be subject to extensive processing in order to reduce it to user data.

In operation FIG. 2A shows three possible locations at which reception of incoming subscriber line traffic or transmission of outgoing subscriber line traffic can be performed, i.e., by the primary DSP resources on the line card 202 or at the backup DSPs 204 or DSP 106. Reception of subscriber line traffic 200 that occurs on the primary DSP on the line card is represented schematically by user data container 206. Reception of subscriber line traffic 200 that occurs on the backup DSP on the line card chassis is represented schematically by user data container 208. In an embodiment of the invention, user data 206/208 can be routed directly from node N1 to its destination on the packet-switched network 118 [see FIG. 1A]. Sampled analogue data 210 is routed via either the circuit/packet switched networks 116–118 to the DSP resources at node N4, i.e. the global control 106, for extraction of user data 212. Subsequently this user data 212 can be routed to its destination.

In an alternate embodiment of the invention the line card DSP serves only to monitor subscriber lines and report the onset of new sessions, the receiving of which is passed to either of the backup DSPs 204 or 106.

FIG. 2B shows the same call session as does FIG. 2A at an interval during which no data is being transmitted on analog subscriber line 102A. An idle condition can be detected by whichever of the DSP resources, e.g. the line card 202, the backup 204 or global control 106, is extracting the data In an embodiment of the invention an idle condition corresponds to a period of inactivity in both the incoming and outgoing subscriber line traffic. In another embodiment of the invention, an idle condition corresponds to a period of inactivity in one or the other of the incoming and outgoing subscriber line traffic. When an idle condition is detected the receiving DSP negotiates a rate reduction with the remote modem connected to the subscriber line. Then under the direction of a control unit, i.e., control unit 106, the DSP resource closest to the analog telephone line 102A, i.e. the line card DSP 202 is delegated the duty of monitoring the subscriber line by receiving it at the reduced rate.

Idle detection and response has several benefits. First, global and backup DSP resources are freed for the processing of other sessions. Second, network and back plane bus traffic is reduced during the idle portion of a session. Finally, the rate reduction itself results in a reduction of DSP resources required to interface with the subscriber line. The processing required to receive and monitor low rate traffic for data is proportionately less than the resources required to receive high rate traffic. When the monitoring DSP resource detects a resumption of data traffic the DSP resources devoted to processing the data are reallocated under the direction of the global control, e.g. global control 106.

The current invention includes a first set of embodiments which can be implemented with existing client modems, including V.34 modems, to provide statistical multiplexing capabilities to call sessions. This first set of embodiments includes idle detection and rate renegotiation capabilities.

These capabilities reduce the resources required to handle call sessions by detecting idle intervals during which no user data is being transmitted and by reducing processing resources allocated to a call session during idle intervals. Thus scarce resources can be reallocated to other call sessions in which user data is being communicated.

The current invention also includes a second set of embodiments which can be implemented with client modems with enhanced feature sets and which also provide statistical multiplexing capabilities to call sessions. This second set of embodiments includes cleardown, cleardown and hold, parameter passing, and enhanced call setup capabilities. These capabilities also reduce the resources required to handle call sessions by reducing the time required to setup a call and by further reductions in resource allocation to call sessions during idle intervals.

For purposes of example, both the first and second sets of embodiments are disclosed in embodiments implemented on client modems utilizing the V.34 communications protocol. As will be obvious to those skilled in the art, the teachings of this invention can be applied with equal benefit, to voice-band/broad-band; analogue/digital modems including but not limited to those implementing the following communications protocols: V.34, V.34.bis, V.34/X2, V.pcm, HDSL, HDSL2, and ISDN. HDSL implementations may be based on the 2B1Q encoding, and HDSL2 implementations may be based on the overlapped pulse amplitude modulation (PAM) with interlocking spectrum (OPTIS).

V.34 Modem

The ITU-T V.34 standard represents a quantum leap in both complexity and operating rate capability in comparison to the V.32bis standard. Features include asymmetrical transmission capability, an auxiliary channel, nonlinear encoding, precoding and trellis coding. When such previously developed features as error correction, compression, and different baud rate operations are considered, the V.34 standard offers well over 100 combinations of modulation schemes, baud rates, and other operating parameters.

Figure 3:
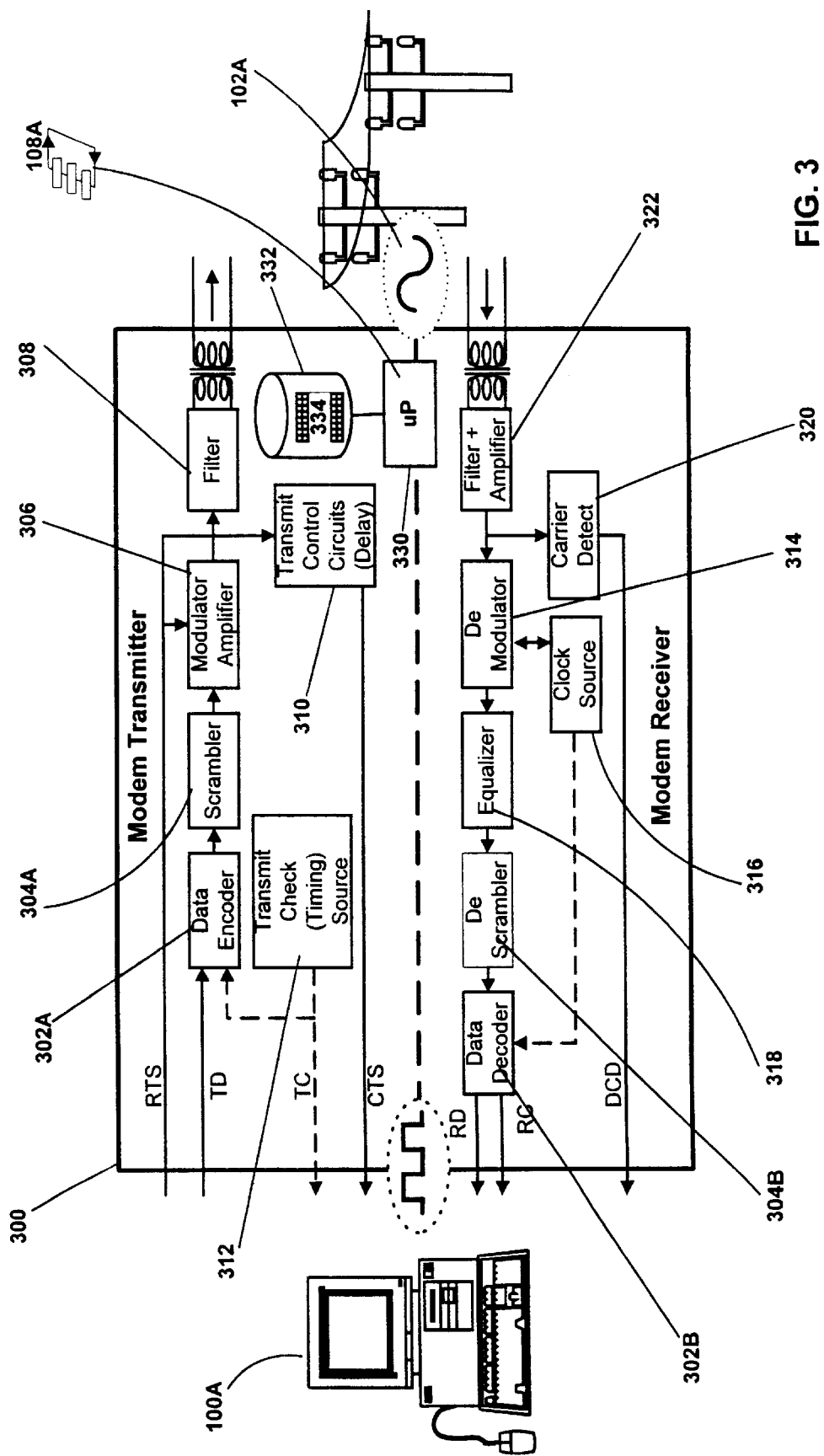
FIG. 3 shows an embodiment of a V.34 modem in accordance with the current invention.

FIG. 3 shows a V.34 modem 300 for connecting a data terminal 100A to an analog subscriber line 102A. Those components associated with the transmitter are at the top and the components associated with the receiver are located in the lower portion.

The transmitter includes a data encoder 302A a scrambler 304A, an amplifier 306, a filter 308, a transmit control 310 and a transmit clock 312. The data terminal 100A is connected to the data encoder 302A. The transmit clock is connected to the data encoder. The data encoder is connected to the scrambler. The scrambler is connected to the amplifier 306. The amplifier is connected to the filter 308, which is in turn connected to the subscriber link 102A. The transmit control is connected to the data terminal.

The receiver includes a filter 322, a carrier detector 320, an equalizer 318, a demodulator 314, a clock 316, a descrambler 304B and a data decoder 302B. The subscriber line 102A is connected to the filter. The filter is connected to the carrier detector and the demodulator. The demodulator is connected to the equalizer and the clock. The equalizer is connected to the descrambler. The descrambler is connected to the data decoder. The data decoder is connected to the data terminal 100A.

In an embodiment of the invention the modem includes enhanced statistical multiplexing processes 108A such as cleardown and hold, parameter passing and reduced setup times. The modem is shown with a processor 330 and a memory 332, in which is stored a parameter table 334. The processes 108A may be implemented on the dedicated processor 330 or on any of the processing resources within either the modem 300 or the data terminal 100A. The parameter table may be implemented on the dedicated memory 332 or on any of the memory resources within either the modem or data terminal.

The modem memory 332 contains a parameter table 334. This table contains call session parameters for modems accessed in current or prior call sessions. These parameters can be used to bypass many of the time consuming call startup procedures implemented in most modem communication protocols, including the V.34 protocol. Instead parameters for a prospective answering modem which have been stored in memory 332 are utilized in subsequent sessions to reduce call connection time. These parameter passing properties are described in greater detail in FIGS. 12A–B. In an embodiment of the invention V.34 modems having parameter passing capabilities will indicate these capabilities in the INFO() sequences or MP sequences described in greater detail in FIGS. 9 and 11 A–D.

Encoder

The data encoder 302A is an option built into many modems. The encoder is used in conjunction with some modulation schemes, enabling each signal change to represent more than one bit of information, i.e., a symbol.

Scrambler

For a modem's received clock to function correctly, it must remain in synchronization with the data being received. This requires a sufficient number of changes in the composition of the data-for example, 0>1 and 1>O to permit the receiving modem's circuitry to derive timing from the received data. Because the data stream can consist of any arbitrary bit pattern, it is quite possible that the data will randomly contain long sequences of 0s or 1s. When these sequences occur, the data will not provide the modem's receiver with a sufficient number of transitions for clock recovery. This condition is responsible for the incorporation of scramblers.

Scrambler 304A modifies the data to be modulated based on a predefined algorithm. This algorithm is normally implemented through a feedback shift register, which examines a defined sequence of bits and modifies their composition to ensure that every possible bit combination is equally likely to occur. At the receiving modem, a descrambler uses the inverse of the predefined algorithm to restore the data into its original serial data stream.

Transmitter, Amplifier, and Filler

The transmitter 306 acts on a serial data stream by using the composition of the data to alter the signal that the modem places on the communications line. When a connection between two modems is established, one modem "transmits" a signal that is heard by the distant modem. By itself, this signal conveys only the presence of a like device. It is varied by the transmitter to impress information that the distant modem receives.

The amplifier boosts the level of the transmitted signal for transmission onto the telephone line. The filter 308 limits the frequencies present in the signal placed on the line possibly to comply with regulations. At the receiver, the signals received from the telephone line are filtered to remove extraneous signals caused by noise, then amplified to boost the received signal level.

Modulation

The V.34 standard specifies three mandatory baud rates-2400, 3000, and 3429. To significantly reduce the probability of errors due to impairments causing a small shift in a point in the signal constellation, the V.34 modem includes nonlinear coding, precoding, and a choice of 16, 32, and 64 state trellis coding.

In addition to the mandatory baud rates, the V.34 standard specifies optional rates of 2743, 2800, and 3429. The 2743 and 2800 baud rates can be an important consideration when transmission occurs via an infrastructure where voice is digitized using Adaptive Differential Pulse Code Modulation (ADPCM), which uses prediction to reduce the voice digitization rate from PCM's 64 kbps to 32 kbps. You typically encounter ADPCM when communicating via satellite or on terrestrial circuits. Certain ADPCM implementations preclude modem operation at symbol rates of 3000 or higher, the optional 2743 and 2800 baud rates permit relatively communications to occur over an ADPCM infrastructure. Under ideal conditions, a V.34 modem maps 10.375 bits into each symbol, resulting in an operating rate of 3429 baud at 10.375 bits/baud or 33.6 kbps. At this operating rate there are 1664 points in the modem's signal constellation.

The V.34 standard specifies two carrier frequencies for both mandatory and optional baud rates.

Options

In addition to the three baud rates being specified as options, the V.34 standard allows asymmetrical transmission, an auxiliary channel, nonlinear encoding, and precoding.

Asymmetrical Transmission

The asymmetrical transmission capability of a V.34 modem enables it to send and receive at different operating rates. This feature removes the slowest common denominator acting as a brake on the data exchange.

Auxiliary Channel

The V.34 standard specifies a separate channel signal for the exchange of information on line quality and modem operating conditions. Unless the auxiliary channel option is included in both modems, a pair of V.34 modems will not support the use of this option.

The auxiliary channel operates at 200 bps and is multiplexed by the modem over the regular channel, being demultiplexed at the other end of the connection. Thus, this option provides an inband management channel that could be used to transmit or receive management data from a bridge or router during a communications session.

Nonlinear Encoding

Nonlinear encoding represents a technique used to increase the immunity of a modem to multiplicative noise such as that caused by the pulse code modulation (PCM) of analog lines by the communications carrier for transport over the carrier's backbone digital infrastructure. Under nonlinear coding, constellation points are spaced unequally so that the points in areas of greater amplitude are farther apart. This technique reduces the probability that these points will be confused with each other and can reduce the error rate when operating at 33.6 kbps by up to 50 percent.

Precoding and Pre-emphasis

Precoding represents a form of equalization that reduces the amount of intersymbol interference seen at the receiver. This in turn permits the modem to obtain a high baud rate via the use of more bandwidth than might be obtainable if no preceding occurred.

Trellis Coding

The use of trellis coding enables a modem to maintain a high data rate on a noisy line. Under the V.34 specification, 16-, 32-, and 64-state trellis codes are specified for the transmitter. Only one of the three must be implemented in the receiver.

Operation

A V.34 modem will exchange a set of test tones with another V.34 modem to profile the channel from 150 Hz to 3750 Hz. This channel profile operation determines the effective bandwidth available and is used to make such configuration decisions as the symbol rate, carrier frequency, use of constellation expansion and transmission power to use. Under ideal conditions, a V.34 modem will operate at 3429 baud, mapping 10.375 bits per symbol to obtain a 33.6 kbps operating rate. The modem can drop back in steps of 2.4 kbps to data rates as low as 2.4 kbps and also bump up if line quality improves.

Operating Limitations

One of the major problems associated with the use of V.34 modems is the fact that many users will not be able to achieve its maximum operating rate capability of 33.6 kbps due to limitations in existing subscriber lines. A data rate of 33.6 kbps requires a bandwidth of 3429 Hz (244 to 3674 Hz). Due to telephone company trunk components and switches as well as faulty premises wiring and long local loops, the ability to obtain a 3429 Hz bandwidth on an end-to-end basis can become very difficult, resulting in a V.34 modem operating at a lower bandwidth resulting in a reduced data rate.

Subscriber Line Capability

Subscriber lines 102A–C transport a plurality of different traffic types including voice traffic, i.e. POTS data traffic from voice-band modems such as V.34 and broad-band traffic such as HDSL.

In all of the text here, the designation of V.34 is used in a broad sense to include any extensions of V.34. Such as: V.fc, K56flex, X2, or V.pcm, etc. The descriptions here are based on the ITU Telecommunications Standardization Sector V.34 recommendation (10/96) which is incorporated by reference as if fully set forth herein. A recently determined standard, V.pcm extends the data rate to 56 kbps.

High frequency broadband traffic is possible where for example phone lines are short in length and therefore do not include load coils which restrict the bandwidth to 300 to 3400 hertz. Frequencies of 10 kilohertz and higher are possible and therefore broadband modems such as DSL, ADSL, XDSL, HDSL, SDSL or VDSL are supported.

Figure 4:
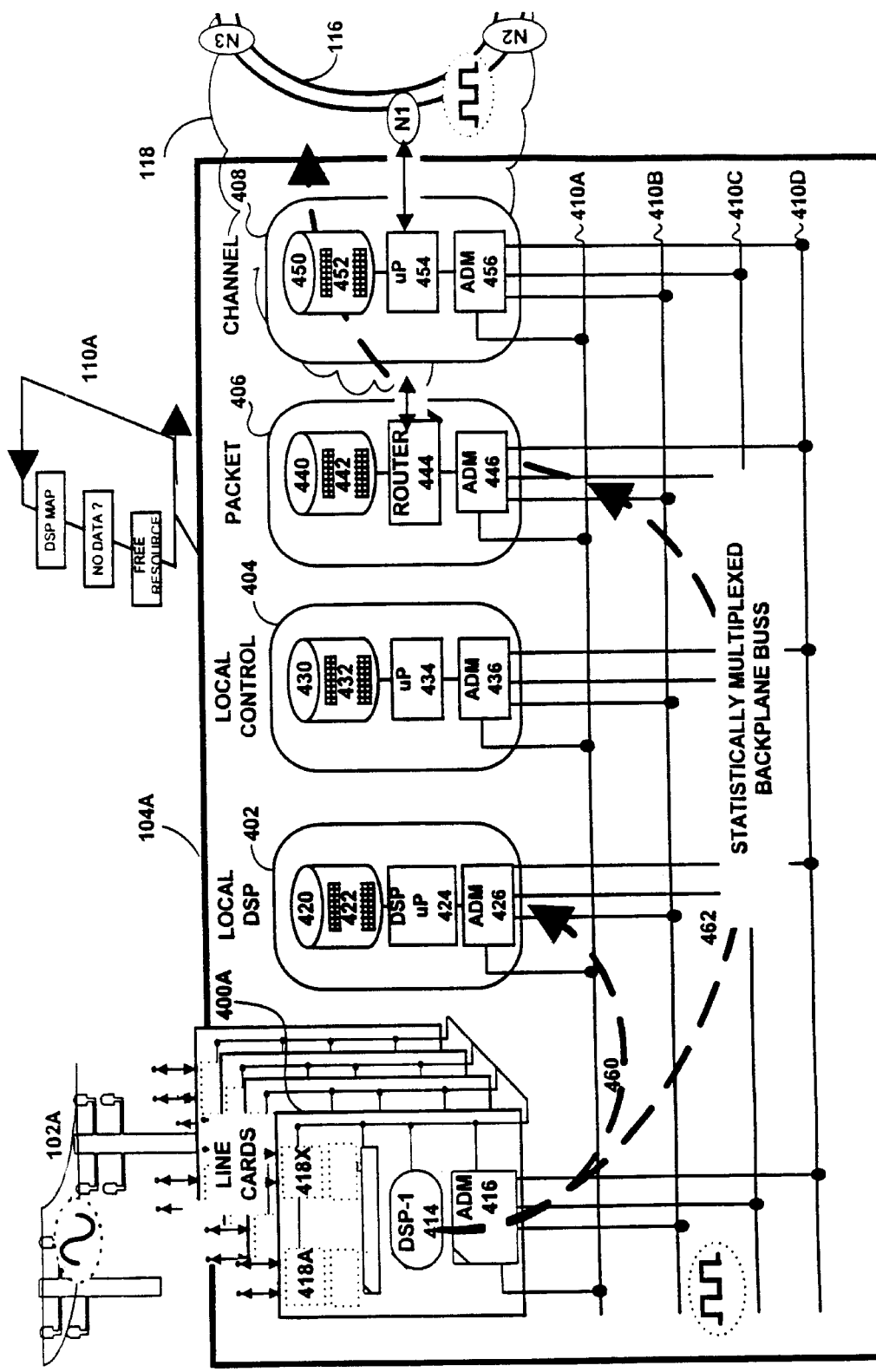
FIG. 4 is a detailed hardware block diagram of the chassis shown in FIG. 1A.

FIG. 4 is a detailed hardware block diagram of the components of remote line unit 104A shown at node 1 in FIG. 1A. The remote line unit contains a number of cards each interfacing one to another via a backplane bus 410A–D. A plurality of cards are shown, of which line card 400A is referenced. These line cards interface with each of the subscriber lines. The remote line unit also includes a digital signal processing card 402, a control card 404, a packet-switch network card 406, a circuit-switched network card 408, backplane bus 410A–D and a bus controller 412.

Each of the line cards includes a primary DSP, e.g. DSP 414 which is switchably connected through dedicated analog to digital converters and interfaces, e.g., 418A–X, to each of the subscriber lines connected to the card. In an embodiment each card accepts 24 subscriber lines. The primary DSP of each line card can receive, transmit and/or monitor traffic on the subscriber lines. The primary DSP interfaces with the backplane bus 410A–D via add/drop MUX (ADM) 416. Subscriber line card DSP resources are limited and can not handle peak traffic conditions. Therefore, in an embodiment of the invention each of the subscriber lines also interfaces with the backplane bus 410A–D along a secondary path which bypasses the primary DSP. Incoming subscriber line traffic which follows this secondary path is sent along the backplane bus to backup DSP resources on either the remote line units or the global control 106 [see FIG. 1A]. Outgoing subscriber line traffic which follows this secondary path has already been modulated by backup DSP resources and does not require further processing by the primary DSP on the line card.

The first of the backup DSP resources is the DSP card 402. The card includes a DSP 424 connected to a memory 420 and an add/drop multiplexer (ADM) 426. The memory 420 includes a channel ID and modem protocol table 422. The table is dynamically updated by the local control 404 and/or the global control 606 [see FIG. 6]. The table records two types of information. First, the table identifies which among the back plane bus lines 410A–D contains digital traffic which requires processing. That traffic includes digital traffic destined for the subscriber lines which is user data and traffic originating on a subscriber which has not yet been converted from sampled analog data to user data. Second, the table contains the modem protocols which the DSP processor 424 is to implement. In an embodiment of the current invention, these include V.34/56k and HSDM. The DSP card interfaces with the backplane bus via the ADM.

Locally the control card 404 orchestrates the processes performed on each of the line cards, the DSP card 402, and the packet and circuit switched cards 406–408. The processes include: hierarchical session management, statistical multiplexing and idle detection and circuit/packet switched network interfacing. The control card interfaces with each of these cards via the backplane bus 410. The control card includes a microprocessor 434 an ADM 436 and a memory 430. The memory includes a control table 432.

In an embodiment of the invention the control table 432 contains any one or all of the following tables: a DSP table, an activity table, a profile table, a subscriber table, and a media table. These tables are dynamically updated by or in cooperation with the global control 604 [see FIG. 6].

The DSP table includes allocation and availability information for all DSP resources including the DSP resources at a line card and chassis level within the remote line units 104A–C as well as DSP 602 within the global control unit 106. The DSP table may also include information correlating specific subscriber lines with primary or backup DSP resource processing the specific subscriber line traffic. The DSP table may also include information as to DSP resources dedicated to monitoring dormant or idle subscriber lines.

The activity table maintains status information on subscriber lines, e.g. off-hook, clear-down, clear-down and hold, idle, etc.

The profile table stores profile information on data lines. This profile information reflects electrical or physical characteristics of data line, its associated subscriber line and data line, intervening components, as well as any other component or factor that effects the performance or electrical characteristics of signals received on data lines.

The subscriber table stores subscriber information indexed by one or more identifiers of subscriber. Subscriber table includes subscriber modem type and capabilities, subscriber connect times, session duration, session activity, session logs, billing data, subscriber account information, and any other suitable subscriber information. The subscriber table may also include information on the last session, such as modem parameters, session duration, percent utilization, etc.. This information may be summarized and additional information included to generate billing and demographic data on subscribers.

The media table stores information on backplane bus, and network availability.

The packet-switched network card 406 includes a router 444 connected to an ADM multiplexer 446 and a storage unit 440. The ADM connects the card to the backplane bus 410A–D. The storage unit 440 includes a packet table 442 for correlating traffic on the backplane bus 410A–D with traffic on the packet-switched network 118. The packet table can be dynamically updated by the local control card 404, or the global control card 604 [see FIG. 6].

The circuit-switched card 408 includes a microprocessor 454, connected to an ADM 456 and a storage unit 450. The ADM connects the card to the backplane bus 410A–D. The storage unit 450 includes a circuit table 452 for correlating traffic on the backplane bus 410A–D with traffic on the circuit-switched network 116. The circuit table can be dynamically updated by the local control card 404, or the global control card 604 [see FIG. 6]. The microprocessor is connected to the circuit-switched network 116. The circuit switched network can be implemented in any of a number of protocols including: public switched telephone network (PSTN) protocols such as; ISDN, T1, Tx . . . , E1; synchronous optical network (SONET); or independent protocols such as Fiberchannel, etc.

Each of the individuals lines 410A–D of the back plane bus 410 operate on the same clock and are in turn synchronized with the clocks on each of the cards.

Backplane Bus and ADMs

Each of the cards interfaces with the backplane bus 410A–D through a corresponding ADM. A number of protocols can be implemented on the backplane bus. FIGS. 8A–D and the associated text describe an embodiment in which statistical multiplexing is implemented in a TDM context.

The ADMs on each line card must be compatible with the backplane bus. Therefore, if the backplane bus implements a TDM protocol, the ADMs can be implemented using time slot interchangers (TSI).

Figure 5:
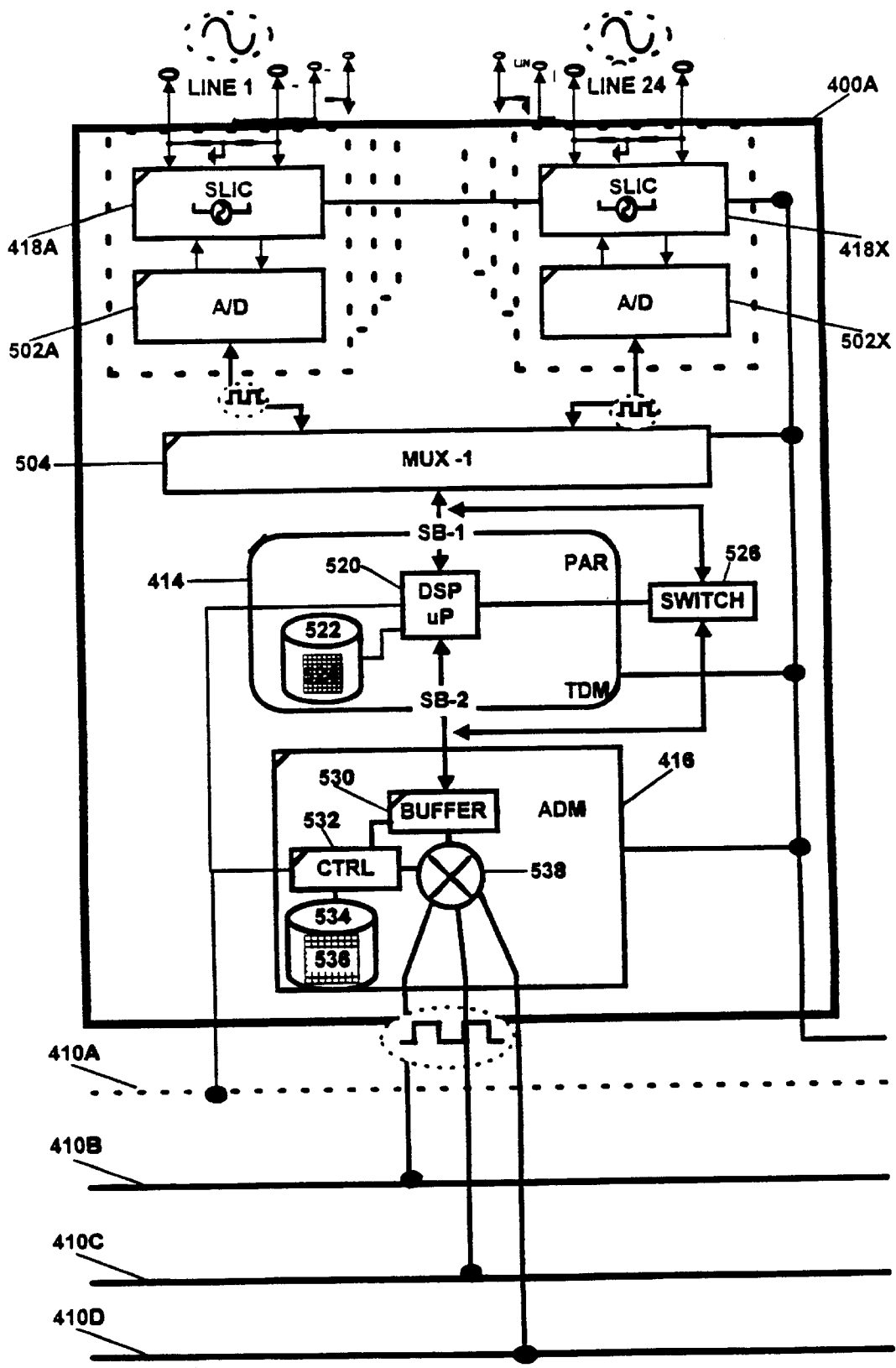
FIG. 5 is a detailed hardware block diagram of the line card shown in FIG. 4.

A session originating on analog line 102A, which is one of a plurality of connections to line card 400A, is detected by a processor, e.g. processor 520 [see FIG. 5] operating in conjunction with a dedicated subscriber line interface circuit (SLIC) 418A. The type of session: e.g. POTS, voice-band modem, or broad-band modem is determined by the processor operating in conjunction with either the central office to which the remote line unit is attached or the local or global control units 404 or 604 [see FIGS. 4,6]. The processor may monitor caller ID, dial tone multiple frequency (DTMF), direct current voltages, data link frames, or any other protocol or data sequencing to determine the characteristics of the subscriber line traffic. The processor may monitor electrical tones generated by the modem while in the process of training, notching, equalizing, or performing any other task that puts electrical tones onto subscriber line 102A. The processor may also detect frames or packets. The processor could also examine various protocols such as TCP/IP, PPP, or any other suitable network protocol or data stream.

Primary Call Setup in Circuit-switched Network

In an embodiment of the invention, call setup for all call types, e.g. POTS, voice-band and broad-band takes place in the circuit-switched network and is handled by the central office. In another embodiment of the invention, call setup on the circuit-switched network is handled by the local and global control cards, respectively, 404 and 604 [see FIGS. 4,6].

In operation a new session originating on any one of the analog signal lines will be detected by the processor connected to the corresponding SLIC units, e.g. SLICs 418A–X. If the backplane and circuit switched network are implementing a TDM protocol, the processor's session notification is passed to the central office on an out-of-band signal line such as ISDN-D. In a TDM embodiment a DS0 digital channel between the caller and destination is established [see FIGS. 7A–D]. The session is identified as voice, voice-band modem, or broad-band modem. The identification may result from the correlation by the central office (CO) or the local/global control cards; of the number dialed or the caller ID, with a specific type of service. The session identification may be stored by the local control card, e.g. 404 [see FIG. 4] or the global control card 604 [see FIG. 6].

If the session is identified as a POTS session the existing DS0 between the caller and destination has sufficient bandwidth for the call. If the session is voice-band data or broad-band data, a call setup may be conducted on the packet-based network to provide more bandwidth for the data session. The transition to the packet switch network may be accompanied by continuance/discontinuance of the DS0 channel on the circuit-switched network.

In an embodiment of the invention, call setup on the packet switched network is handled by the central office. In another embodiment of the invention call setup on the packet-switched network is handled by the local and global control cards, respectively, 404 and 604 [see FIGS. 4,6].

Packet-switched Network

Packet switching networks allow many users to share the facilities of the network. The design of packet networks results in the use of capacity only when stations have packets to transmit. Almost all interactive transmission includes pauses and because idle time on a circuit is essentially being wasted, packetizing and interleaving packets makes efficient use of a circuit.

Figure 6:
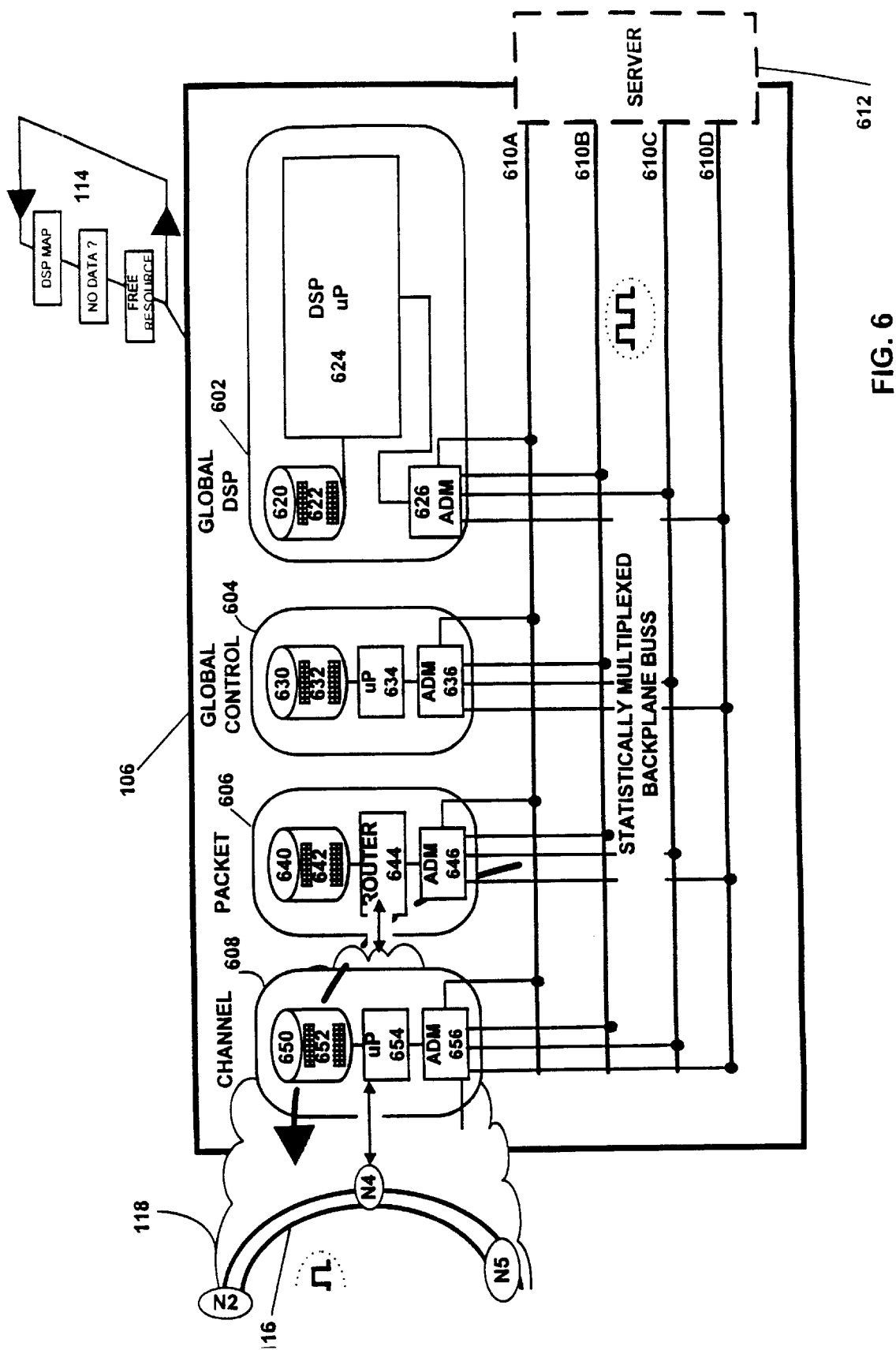
FIG. 6 is a detailed hardware block diagram of the control unit shown in FIG. 1A.

DSP resources for transmitting and receiving incoming and outgoing subscriber line traffic are allocated cooperatively by the local control card 404 [see FIG. 4] operating in conjunction with the global control card 604 [see FIG. 6]. Modem reception may occur on the primary DSP resources on the line card or may be passed 460 to the backup DSP resources on the remote line unit, or passed 462 to the global DSP resources.

DSP processing of voice-band data normally requires less computation than processing of broad-band data. Voice-band data may be sampled 16,000 times per second for 16 bit symbols for a data rate of 256 Kbaud. A typical voice-band session requires approximately 25 MIPS of DSP capacity. Broad-band data by contrast may be sampled 128,000 times per second for 16 bit symbols for a data rate of 2048 Kbaud. A broad-band data session, e.g. including compression, can require in excess of 50 MIPS of DSP capacity.

During a data session, e.g. voice-band or broad-band, idle detection will be implemented by the DSP handling the reception/transmission of data. An idle condition occurs when no data is being transmitted. When no data is being transmitted, DSP, network and backplane bus resources can be reallocated. In an embodiment of the invention this process involves the receiving DSP negotiating a lower baud rate for the sending and/receiving voice-band or broad-band modem. When this takes place, the control units, i.e. local and global, will reallocate monitoring of the subscriber line to the primary DSP. Then, backplane bus, network and backup DSP resources can be reallocated. All of these processes, which will be set forth in greater detail in the following FIGS. and text are orchestrated by the local control cards e.g. card 404 [see FIG. 4] operating in conjunction with the global control card 604 [see FIG. 6].

FIG. 5 is a detailed hardware block diagram of a representative one of the line cards 400A shown in FIG. 4. In an embodiment of the invention, line card 400A includes resources dedicated to each subscriber line as well as resources shared between each of the subscriber lines. In the embodiment shown in FIG. 5 each subscriber line has dedicated resources in the form of a SLIC and an analog front end (AFE). SLIC 418A and AFE 502A are shown dedicated to subscriber line 1. SLIC 418X and AFE 502X are devoted to subscriber line 24. Shared resources include MUX 504, DSP 414, switch 526 and ADM 416. Each subscriber line is connected via its own SLIC and AFE pair to MUX 504. MUX 504 interfaces with both primary DSP 414 and/or switch 526.

In an embodiment of the invention, the SLICs 418A–Z can be implemented with a chip produced by Lucent Technology Microelectronics Group and identified by their model number L7585. The chip integrates the battery feed, test access relay, and ringing relay that are necessary to interface a codec to the tip and ring of a subscriber loop into one low power package.

In an embodiment of the invention, the analog front end (AFE) 502A–X can each be implemented with a single chip produced by SGS-Thompson Microelectronics and identified by their part number STLC 7550. This single chip solution provides on board clock generation for sampling frequencies requested for V.34 and 56 kbps applications and additionally in slave mode excepts higher frequency signals for driving A-to-D and D-to-A conversion.

In an embodiment of the invention, MUX 504 can be implemented utilizing a field programmable gate array produced by XILINX® and identified by their model number XC5200.

The DSP 414 handles the monitoring of subscriber lines, the companding of POTS traffic, and has sufficient processing power to transmit/receive several of the subscriber link's data traffic. Monitoring typically takes place at reduced data rates, e.g. at the low end of the V.34 and/or HSDM ranges. Companding refers to the compression of voice signals in the transmitting direction and expanding in the receiving direction. Its purpose is to reduce data rate without perceptibly reducing the quality of voice signals. The DSP 414 includes a microprocessor 520 and a memory 522. Memory 522 includes a control table 524. In an embodiment of the invention, the control table includes a record of receiving and transmitting parameters for each of the subscriber lines. The control table may also include the processes for implementing the supported modem protocols, e.g. V.34. In an embodiment of the invention, the control table is dynamically updated as subscriber line conditions change. Switch 526 provides an alternate path for subscriber line traffic that bypasses DSP 414. As discussed above, this secondary path is utilized when off card backup DSP resources are used to process subscriber line traffic. The switch operates under the direct control of DSP microprocessor 520 under the direction of either or both the local and global control cards 404, 604 [see FIGS. 4,6]. When the switch is enabled MUX 504 is direct connected to ADM 416 rather then to the microprocessor 526 of the DSP 414. Both switch 526 and DSP microprocessor 520 are connected to add-drop multiplexer 416 and specifically add-drop multiplex buffer 530.

In an embodiment of the invention the DSP 414 can be implemented as a single chip produced by Texas Instrument and identified by their model number TMS320BV548PGE-80. This signal processor offers 80 million instructions per second. In an embodiment of the invention 24 subscriber lines are attached to the line card 400A. Any or all of these can potentially demand DSP service. DSP 414 can only receive about 3 lines simultaneously at full speed. V.34 sessions require about 20 to 25 MIPS each, broadband protocols such as HDSL are expected to require over 50 MIPS each. So if all 24 connected subscriber lines were to demand modem service simultaneously, the primary DSP 414 would not be able to handle the offered load. Backup DSP resources are therefore needed. The allocation of DSP resources for voice and data traffic is governed by both the local control unit 404 [see FIG. 4] and the global control unit 604 [see FIG. 6].

The ADM handles the transmission of traffic between the backplane bus 410 and the line card 400A. The ADM includes buffer 530, switch fabric 538, control 532 and a memory 534. The memory includes a control table 536 which correlates backplane traffic to a corresponding subscriber line. In the embodiment shown, the backplane bus implements a TDM protocol. In this embodiment switch fabric 538 connects directly to physical lines 410B–D of the backplane bus. The remaining physical line of the backplane bus 410A is dedicated to control and signaling between the various cards on the backplane bus. Line 410A directly connects to ADM control 532 and to DSP microprocessor 520. Control unit 532 interfaces with buffer 530, switch fabric 538 and add-drop multiplex memory 534.

The ADM 416 can in an embodiment in which the backplane bus implements a TDM protocol be realized with several time slot interchange (TSI) chips produced by Lucent Technologies and identified by their model number T7270. The TSI interchanges time slot data among four user programmable full duplex serial TDM buses 410A–D. The TSI is dynamically configured via a microprocessor interface which in the example shown is connected to DSP microprocessor 520. This interface can also read and write time slot and device data Each highway has a programmable data rate (up to 4.096 in mbps) virtual frame off sets, highway clock, mode selects allowing single and double data rate clocks and individually controlled transmitter and receiver configuration. At the appropriate time and by using the cross connect information stored in the connection memory 534 the outgoing data is read from the time slot memory and presented to the concentration highway output section. The connection memory provides the pointers that define the interchange as well as the control information associated with each time slot. For each time slot of each output highway there are three bits of control information. The TSI has the ability to source microprocessor generated patterns on to any of the physical lines of the backplane bus.

FIG. 6 shows the global control unit 106 [see FIG. 1A]. The global control unit orchestrates the activities of all the remote line units 104A–C. The global control unit 106 includes circuit-switched network card 608, packet-switched network card 606, global control card 604, and a global DSP card 602. In an alternate embodiment, global DSP card 602 could itself be located at another node on the network operating under the control of global control card 604. Each of the cards has its own memory, microprocessor, and ADMs. In an alternate embodiment the current invention the global control unit 106 interfaces not only with networks 116–118, but also with server 612. Server 612 and global control unit could in this embodiment be located at an internet service provider (ISP) and be utilized to manage incoming and outgoing data for the ISP.

The circuit-switched card 608 includes a microprocessor 654, connected to an ADM 656 and a storage unit 650. The ADM connects the card to the backplane bus 610A–D. The storage unit 650 includes a circuit table 652 for correlating traffic on the backplane bus with traffic on the circuit-switched network 116. The circuit table can be dynamically updated by the global control card 604. The microprocessor is connected to the circuit-switched network 116.

The packet-switched network card 606 includes a router 644 connected to an ADM 646 and a storage unit 640. The ADM connects the card to the backplane bus 610A–D. The storage unit 640 includes a packet table 642 for correlating traffic on the backplane bus 610A–D with traffic on the packet-switched network 118. The packet table can be dynamically updated by the global control card 604. The router is connected to the packet-switched network 118.

Backup DSP resources are provided by the DSP card 602. The card includes a DSP 624 connected to a memory 620 and an ADM 626. The memory 620 includes a channel ID and modem protocol table 622. The table is dynamically updated by the global control 604. The table records two types of information. First, the table identifies which among the back plane bus lines 610A–D contains digital traffic which requires processing. That traffic includes digital traffic destined for the subscriber links which is user data and traffic originating on a subscriber link which is still in the form of a sampled analog signal. Second, the table contains the modem protocols which the DSP processor 624 is to implement. In an embodiment of the current invention these include V.34N.pcm and HSDM. The DSP card interfaces with the backplane bus via the ADM.

The global control card 604 orchestrates the processes performed on all the remote line units 104A–C, as well as on its neighboring cards on the global controller 106. The processes include: hierarchical session management, statistical multiplexing idle detection and circuit/packet switched network interfacing. The control card interfaces with each of these cards via the backplane bus 610.

Global control card 604 includes microprocessor 634 connected both to ADM 636 and to memory 630. Memory 630 includes global control table 632. The global control table 632 contains information required to interface with the remote line units and to interact on a master-slave, peer-to-peer, or autonomous basis with the remote line units. To those ends the global control table can include one or more of the following tables: a DSP table, an activity table, a profile table, a subscriber table, and a media table.

The DSP table includes allocation and availability information for all DSP resources including the DSP resources at a line card and chassis level within the remote line units 104A–C as well as DSP 602 within the global control unit 106. The DSP table may also include information correlating specific subscriber lines with primary or backup DSP resource processing the specific subscriber line traffic. The DSP table may also include information as to DSP resources dedicated to monitoring dormant or idle subscriber lines.

The activity table maintains status information on subscriber lines, e.g. off-hook, clear-down, clear-down and hold, idle, etc. .

The profile table stores profile information on data lines. This profile information reflects electrical or physical characteristics of data line, its associated subscriber line and data line, intervening components, as well as any other component or factor that effects the performance or electrical characteristics of signals received on data lines.

The subscriber table stores subscriber information indexed by one or more identifiers of subscriber. Subscriber table includes subscriber modem type and capabilities, subscriber connect times, session duration, session activity, session logs, billing data, subscriber account information, and any other suitable subscriber information. The subscriber table may also include information on the last session, such as modem parameters, session duration, percent utilization, etc.. This information may be summarized and additional information included to generate billing and demographic data on subscribers.

The media table stores information on backplane bus, and network availability.

Each of the individuals lines 610A–D of the back plane bus 610 operate on the same clock and are in turn synchronized with the clocks on each of the cards.

Control

The hierarchical system for statistically multiplexing subscriber line traffic can be implemented in several ways without departing from the teachings of the invention.

The remote line units can exist without global control. One of those units can perform as master and other as slaves. The slaves can report availability and demand to the master on a round robin basis, a broadcast basis, or in response to an inquiry from the master. The master can communicate directions directly to the local control on each remote line unit or can communicate directly with DSP and other resources on each remote line unit. In another embodiment, the remote line units can operate in a peer-to-peer relationship with broadcast of and shared decision making as to DSP allocation. In another embodiment, remote line units can perform semi-autonomously with tasks such as backplane traffic management and primary and backup DSP resourcing made autonomously by each remote line unit. In embodiments which utilize the global control: master-slave, peer-to-peer, and autonomous models for interaction can be implemented. In the master-slave model, the slaves can report availability and demand to the master on: a round robin basis, a broadcast basis, or in response to an inquiry from the master. In another embodiment, the master can communicate directions directly to the local control on each remote line unit or can communicate directly with DSP and other resources on each remote line unit. In this latter case remote line units may in certain embodiments not contain control cards. In another embodiment, the remote line units and global control can operate in a peer-to-peer relationship with broadcast of and shared decision making as to DSP allocation. In another embodiment remote line units can perform semi-autonomously with tasks such as backplane traffic management and primary and backup DSP resourcing made autonomously by each remote line unit.

FIGS. 7A–D shows the T1 frame format which forms the high speed digital backbone of the PSTN. The T1 carrier consists of a 193 bit frame (DS 1). It is into this digital format that analog POTS voice calls are placed. Each DS1 consists of 24 eight bit channels 701–724 and a framing bit 700. Each of the 24 channels are time division multiplexed (TDM) within each frame. Each channel is identified as a DS0. Usually the analog signals are sampled on a round robin basis with the resulting analog stream fed to the codec. Each of the 24 channels in turn gets to insert 8 bits into the output stream every 125μ seconds. Seven bits are data and one may be for control yielding 7×8,000 equals 56,000 bps of data and possibly 8,000 bps of signaling information per channel, or a gross data rate for all 24 channels of 1.544 Mbps. The 193rd bit is used for frame synchronization. It takes on the pattern 010101 . . . . Normally the receiver keeps checking this bit to make sure it has not lost synchronization.

Analog subscriber line signals are digitized by a device called a codec. The codec produces only 8,000 samples per second (125μ Sec/sample with 8 bits per sample). The Nyquist theorem indicates this is the maximum sampling rate required to capture all the information from the 4-kHz telephone. The sampling technique is called PCM. PCM forms the heart of the modem telephone system as a consequence virtually all time intervals within the telephone systems are multiples of 125μ second.

ITU also has a recommendation for a PCM carrier at 2.048 Mbps called E1. This carrier has 32 channels each with 8 bit samples packed into the basic 125μ second frame. 30 of the channels are used for information and 2 are used for signaling. Each group of four frames provides 64 signaling bits, half of which are used for channel associated signaling and half of which are used for frame synchronization. Outside North America and Japan the 2.048 Mbps carrier is in wide spread use.

In FIG. 7A–D the 193 bit DS1 frame is shown. In FIG. 7A the frame is superimposed on a 1.56 MHZ clock. In FIGS. 7B–D sequential frames at integer time intervals N, 2N and 4N are shown. Channels 1–2, 12–13, and 23–24 are shown in detail. The contents of those channels are labeled with reference numbers, 701 for channel 1, 702 for channel 2, 712 for channel 12, 713 for channel 13, 723 for channel 23 and 724 for channel 24. In FIGS. 7B–D call sessions originating on subscriber lines 1, 5, 50, 40, 100 and 2 are shown. The DS0s allocated to these lines are respectively channels 1–2, 12–13, and 23–24. The call sessions on all the above mentioned lines are active throughout the interval covered in FIGS. 7B–D. Although caller and answerer are linked by these channels over the full course of the session, the dedicated channels do not always have data, or voice to carry. labeled contents of frame N shown in FIG. 7B have the suffix A. The labeled contents associated with frame 2N shown in FIG. 7C have the suffix B. The labeled contents of frame 4N shown in FIG. 7D have the suffix C.

FIGS. 7B–D show POTS sessions from subscriber lines 1, 40, and 100 allocated respectively to channels 1, 13, and 100, and V.34 sessions from subscriber lines 5, 50, and 2, allocated respectively to channels 2, 12, and 24. Channel 1 only contains payload, i.e. payload 701B in one of the 3 frames. Channel 2 only contains payload, i.e. user data payload 702A in one of the 3 frames. Channel 12 only contains payload, i.e. user data payloads 712A–B in two of the 3 frames. Channel 13 only contains payload, i.e. user data payload 713B in one of the 3 frames. Channel 23 only contains payload, i.e. user data payload 723B in one of the 3 frames. Channel 24 only contains payload, i.e. user data payload 724B in one of the 3 frames. Several limitations of traditional TDM are evident. First, a channel is allocated to a session whether or not data is being transmitted. In the example in FIG. 7B–D channels 1, 2, 12, 13, 23 and 24 only contain payload, i.e. voice or data, in only 7 out of the 24 intervals depicted. Second, data that is being transmitted is traditionally processed thus requiring either dedicated DSP resources to each subscriber line or a large modem pool at the subscriber line interface sufficient to receive and transmit all incoming and outgoing calls. Third, V.34 and voice traffic are allocated equal data bandwidth even though V.34 data traffic requires less data bandwidth.

Statistical and Intelligent Multiplexers

To overcome the limitations of traditional TDM, statistical time division multiplexing (STDM was developed). In a traditional TDM, data streams are combined from a number of devices so that each device has a time slot assigned for its use. While such TDMs are inexpensive and reliable, and can be effectively employed to reduce communications costs, they make inefficient use of the high-speed transmission medium. This inefficiency is due to the fact that a time slot is reserved for each connected device, whether or not the device is active. When the device is inactive, the TDM pads the slot with nulls and cannot use the slot for other purposes. These pad characters are inserted into the message frame since demultiplexing occurs by the position of characters in the frame. If these pads are thus eliminated, a scheme must then be employed to indicate the origination port or channel of each character. Otherwise, there would be no way to correctly reconstruct the data and route it to its correct computer port during the demultiplexing process.

A statistical multiplexer combines signals from a number of connected devices in such a manner that there is a certain probability that a device will have access to the use of a time slot for transmission. By dynamically allocating time slots as required, statistical multiplexers permit more efficient utilization of the high-speed transmission medium. This permits the multiplexer to service more terminals without an increase in the high-speed link as would a traditional multiplexer. The technique of allocating time slots on a demand basis is known as statistical multiplexing and means that data is transmitted by the multiplexer only from the terminals that are actually active.

FIGS. 8A–D show an implementation of a hierarchical, statistical, variable bandwidth time division multiplexing format (HSVIDM) suitable for utilization in the backplane bus of the remote line units 104A–C and global control unit 106 or on the circuit-switched network [see FIG. 1A]. The implementation is hierarchical in that processing of incoming subscriber line traffic can occur in DSP primary or backup resources, either on the remote line units or the global control unit. The backplane bus therefore must be able to transport either user data or sampled analog data. The implementation is statistical in that time slots on the backplane are dynamically allocated only to those subscriber lines that are actually transmitting data. This permits the backplane to service more terminals without an increase in a number of physical lines on the backplane as would be the case with a traditional TDM implementation. The implementation is variable in that more than one channel can be assigned to a single session thereby providing higher bandwidth for data traffic than voice, for example. The circuit-switched network 116 can implement similar functionality through the generation by the circuit-switched cards, e.g. card 408, of each remote line unit, e.g. 104A [see FIG. A], of pseudo channel assignments which result in one session being assigned to multiple DSOs.

FIGS. 8A–D show a HSVTDM protocol suitable for implementation on the backplane busses of the remote line unit, the global control unit, and the circuit-switched network 116 [see FIG. 1A]. In FIG. 8A a frame, 512 bytes in length, is shown superimposed on a 4,096 MHz clock. The frame is divided equally into 8 bit segments each allocated to one of 64 channels. Each frame is transmitted in a 125μ second interval. Each physical line on the backplane bus, is in this embodiment, therefore capable of transmitting at 4,096 Mbps.

Channels 1–2, 32–33, and 63–64 are shown in detail. The contents of those channels are labeled with reference numbers, 801 for channel 1, 802 for channel 2, 832 for channel 32, 733 for channel 33, 763 for channel 63 and 764 for channel 64. In FIGS. 8B–D call sessions originating on subscriber lines 7,5, 50 and 2 are shown. In the example shown all traffic is received from a corresponding subscriber line. Return traffic, sent to the subscriber lines, would be allocated to different channels but handled in a manner similar to the following. The DS0s allocated to these lines in frame 2N [see FIG. 8B] are respectively the odd channels 1–63 for subscriber line 7, channel 2 for subscriber line 5, channel 32 for subscriber line 50 and channel 64 for subscriber line 2. The call sessions on all the above mentioned lines are active throughout the interval covered in FIGS. 8B–D. Although caller and answerer are linked by these channels over the full course of the session, the dedicated channels do not always have data, or voice to carry. The labeled contents of frame N shown in FIG. 8B have the suffix A. The labeled contents associated with frame 2N shown in FIG. 8C have the suffix B. The labeled contents of frame 4N shown in FIG. 8D have the suffix C. Sampled analog data is shown symbolically with a horizontal hashmark, User data is shown with a vertical hashmark, and diagonally hashmarked data is not categorized.

As shown in FIG. 8B, the high speed data modem (HSDM) user data from subscriber line 7 is allocated to the odd channel numbers 1–63. Channels 801B, 833B and 863B are referenced. Thus, HSDM traffic from line 7 has a data bandwidth potential of 2,048 Mbps in the HSVTDM protocol shown in FIG. 8B. The fact that the traffic is user data indicates that the primary DSP on subscriber line 7's line card is handling the receive processing. In the frame shown in FIG. 8C, i.e. frame 2N, the HSDM traffic from line 7 is not present because an idle condition has been detected and backplane bus bandwidth is not being utilized for the transmission of empty data channels. Instead local line card DSP resources are allocated at a reduced rate to monitor subscriber line 7 for a resumption of high speed data modem traffic. In this embodiment of the invention none of the monitored traffic is placed on the backplane, instead it is discarded. Additionally, during the idle interval, the channels allocated to subscriber line 7 are reallocated to carry the payload 801C, 832C, 863C for other active subscriber lines. In FIG. 8D subscriber line 7 HSDM traffic has resumed and has been reallocated in the form of a sampled analog signal, by the local and global control units 404 [see FIG. 4] and 604 [see FIG. 6] to the odd channels 1–63 of frame 4N. Channel contents 801D, 833D and 863D are referenced. Thus, subscriber line 7 has been reallocated to carry a sampled analog signal during an idle interval within an active session. The fact that these channels are carrying sampled analog data indicates that the primary DSP resources are not processing incoming data from line 7. Instead the data is being routed via switch 526 directly to the ADM 416 and thence to the backplane bus 410 [see FIG. 5].

Subscriber lines (2) and (5,50) are also active and carry respectively POTS, and V.34 traffic 802B, 832B, and 864B in channels 2,32 and 64. The POTS traffic is companded. One of the V.34 sessions on channel 32 is processed 832B while the other session 802B on channel 2 is not. Incoming subscriber line traffic that bypasses the primary DSP on the associated line card enters the backplane bus in a digital form. It will be processed by one of the backup DSPs. Incoming subscriber line traffic that is processed by the primary DSP on the associated line card enters the backplane bus as user data. The global 604 [see FIG. 6] and local 404 [see FIG. 4] controller handle this allocation of either or both the backplane channels and the DSP resources. Thus, all channels within frame N shown in FIG. 8B carry data and the data can be either a sampled analog signal or user data.

Between the time of transition of frame N shown in FIG. 8B and frame 2N shown in FIG. 8C, an idle condition is detected on subscriber lines 5, 7 and 50. The idle condition may be mono or bidirectional, i.e. on the incoming and/or outgoing line. The idle condition is detected by whichever of the DSP resources i.e. line card, remote line unit or global is handling the receive processing. In modem protocol specs such as V.34 all transmitter functions interact even during idle periods. Thus, the digitized output of a modem appears the same during the transmission of user data and during idle periods in which no user data is being transmitted. For this reason, the task of detecting idle periods is delegated to the DSP handling the session. In another embodiment of the invention the task of monitoring for idle intervals could be allocated to other entities potentially closer to the subscriber line, provided that alterations to the modem specification were implemented that called for tone generation for example by the sending modem during idle periods.

The result of idle detection is shown in frame 2N in FIG. 8C. After an idle is detected, backplane resources are made available in channels 1, 2, 32 and 33 and 63 referenced as respectively 801C, 802C, 832C, 833C and 863C. The POTS traffic on subscriber line 2 continues to occupy channel 64 referenced as 864C. The available channels on the backplane are reallocated to subscriber lines which have new sessions or which are returning from an idle condition.

In the interval between frame 2N and 4N shown in respectively FIGS. 8C–D. The monitoring of subscriber lines 5, 7 and 50 by the receiving DSPs indicates a resumption of data transmission. As shown in FIG. 8D, sampled analog traffic from subscriber line 7 is reallocated to the odd channels 1–63 of frame 4N referenced as 801D, 833D and 864D. The 32 channels allocated provide a total bandwidth of 2,048 Mbps to the HSDM traffic. This sampled analog signal will be processed by either remote line unit DSP card 402 [see FIG. 4] or global DSP card 602 [see FIG. 6]. Subscriber line 2 POTS traffic 864D continues to occupy channel 64. Subscriber line 5 V.34 traffic has been re-allocated in user data form 832D to channel 32. The fact that the data is user data indicates that global control 106 operating in conjunction with local control card 404 has directed line card DSP, e.g. DSP 414 associated with subscriber line 5 to perform receive processing of the data prior to placing it on the backplane bus 410 [see FIG. 4]. Conversely, subscriber line 50 V.34 backplane traffic 802D has been reallocated to channel 2 as a sampled analog signal. This indicates that primary line card DSP resources are no longer being used to process a subscriber line 50 V.34 traffic and instead that traffic is bypassing the line card DSP via a switch and being placed as a sampled analog signal directly on the backplane for receive processing, either by the backup DSP resources e.g. the DSP of a neighboring line card, the DSP of a remote line unit DSP or the global DSP. Thus the backplane of the remote and global line units implements hierarchical statistical and variable time division multiplexing in accordance with the current invention.

Figure 9:
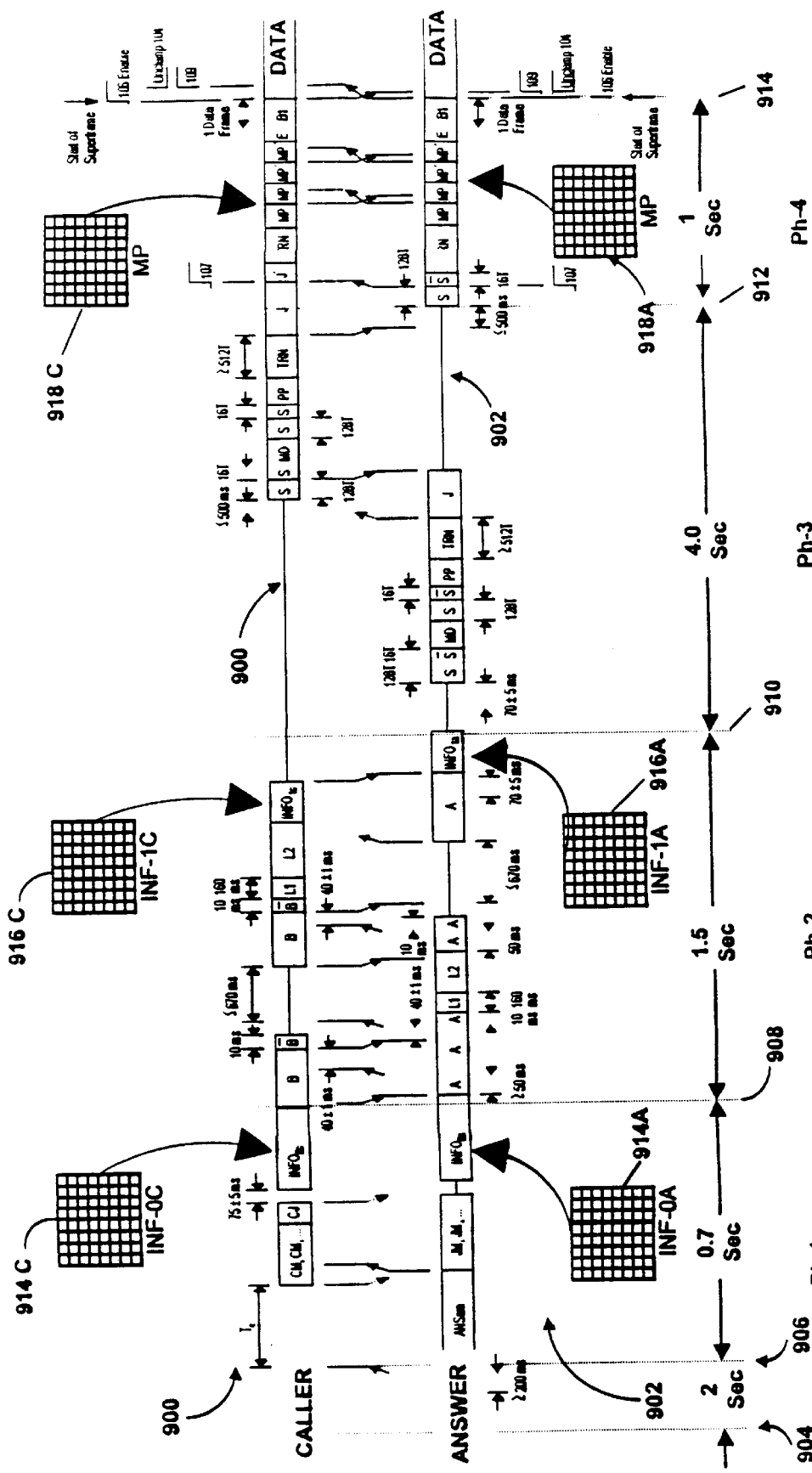
FIG. 9 shows modem startup parameters according to a V.34 specification.

The following FIGS. 9–10 show specific examples for managing communications on a digital network, and in particular communications with a modem. The techniques that are shown allow for reduction of modem resource allocation during idle intervals, and reduce the amount of time required to re-establish or setup a call session. These techniques allow for statistical multiplexing of call sessions. A benefit to statistical multiplexing is that the amount of resources required to support multiple modem call sessions can be reduced.

In the examples shown a modem interfaces with the digital network over an analog subscriber link using the ITU V.34 communications protocol. As will be evident to those skilled in the art the techniques that are disclosed in this invention can be implemented with either analog or digital modems, communicating over either analog or digital lines either within the voice-band or the broad-band. The techniques disclosed can be implemented in a variety of communication protocols including: V.34, V.34.bis, V.34/X2, V.pcm, HDSL, HDSL2, ISDN, etc., HDSL implementations may be based on the 2B1Q encoding, and HDSL2 implementations may be based on the overlapped pulse amplitude modulation (PAM) with interlocking spectrum (OPTIS). Several of the techniques which are disclosed, e.g. idle detection and rate renegotiation, can be implemented using existing modems without requiring modification.

FIG. 9 shows the modem start up protocol according to a V.34 specification. Modem start up occurs over 5 intervals. The first bracketed by reference numerals 904–906 is approximately 2 seconds in duration and corresponds to the detection by SLIC of an off hook condition and the allocation by central office of a DS0 from the calling to the answering modem. The second bracketed by reference numbers 906–908 is approximately 0.7 seconds in duration and is identified as a interaction phase 1 [See V.34 Spec. Phase 1, 11.1]. The third bracketed by reference numerals 908–910 is approximately 1.5 seconds in duration and is identified as a probing and ranging phase 2 [See V.34 Spec. Phase 1, 11.2]. The third bracketed by reference numerals 910–912 is approximately 4 seconds in duration and is identified as phase 3 for equalizer and echo canceler training [See V.34 Spec. Phase 1, 11.3]. The last phase prior to the onset of data transmission is bracketed by reference numerals 912–914 and is approximately 1 second in duration. This phase, phase 4 is identified as the final training phase training [See V.34 Spec. Phase 1, 11.4].

Phases 1, 2 and 4 are each accompanied by data transfer in the form of tables of information transferred between calling and answering modem. In Phase 1 the calling and answering modem exchange what are known as $INFO_0$ sequences [see FIG. 11A] contain preliminary information on the calling and answering modem capabilities and/or configuration. These tables are referenced as 914C-A corresponding to respectively the calling and answering modem. The call modem start up procedure is indicated by procedures on line 900. The answering modem start up procedures are indicated by the sequences shown on line 902.

In Phase 2 the calling and answering modems exchange what are identified as $INFO_1$ tables 916C-A [see FIGS. 11B–C]. These contain information pertaining to line conditions and parameters to be used during the later stages of training as well as during data transfer. In the final start up phase, Phase 4, the calling and answering modems exchange modem parameter tables [see FIG. 11D] referenced as 918C-A for respectively the calling and answering modem. These tables contain the final session parameters for the call which represents a combination of the line constraints in conjunction with the limitations of the less highly featured of the 2 modems.

The following sections are excerpted from the V.34 specification and describe phases 1–4 of the V.34 modem startup.

11.1 Phase 1—Network Interaction 11.1.1 Call Modem 11.1.1.1 Initially, the call modem shall condition its receiver to detect either signal ANS or ANSam as defined in Recommendation V.8, and the modem shall transmit CI, CT or CNG as defined in Recommendation V.8. If signal ANSam is detected, the modem shall transmit silence for the period $T_e$ as specified in Recommendation V.8. The modem shall then condition its receiver to detect JM and sends CM with the appropriate bits set in the modulation modes category to indicate that V.34 operation is desired. When a minimum of two identical JM sequences have been received, the modem shall complete the current CM octet and send CJ. After sending CJ, the modem shall transmit silence for 75±5 ms and proceed with Phase 2.

11.1.1.2 If the JM modulation mode bits indicate V.34 duplex operation, the modem shall proceed in accordance with 11.2. If half-duplex V.34 operation is indicated, the modem shall proceed in accordance with 12.2. If V.34 operation is not indicated, the modem shall proceed in accordance with Recommendation V.8.

11.1.1.3 If signal ANS (rather than ANSam) is detected, the modem shall proceed in accordance with Annex A/V.32 bis, Recommendation T.30, or other appropriate Recommendations.

11.1.2 Answer Modem 11.1.2.1 Upon connection to line, the modem shall initially remain silent for a minimum of 200 ms and then transmit signal ANSam according to the procedure in Recommendation V.8. If duplex operation is intended, this signal shall include phase reversals as specified in Recommendation V.8. If half-duplex operation is intended, phase reversals are optional. The modem shall condition its receiver to detect CM and, possibly, calling modem responses from other appropriate Recommendations.

11.1.2.2 If a minimum of 2 identical CM sequences are received and the modulation mode bits indicate V.34 operation, the modem shall send JM and condition its receiver to detect CJ. After receiving all 3 octets of CJ, the modem shall transmit silence for 75±5 ms, and proceed with Phase 2 of start-up. This procedure is shown in FIG. 15.

11.1.2.3 If the JM modulation mode bits indicate V.34 duplex operation, the modem shall proceed in accordance with 11.2. If half-duplex V.34 operation is indicated, the modem shall proceed in accordance with 12.2. If V.34 operation is not indicated, the modem shall proceed in accordance with Recommendation V.8.

11.1.2.4 If a call modem response from some other appropriate Recommendation is detected, the modem shall proceed in accordance with the appropriate Recommendation.

11.1.2.5 If neither CM nor a suitable call modem response is detected for the allowed ANSam transmission period as specified in Recommendation V.8, the modem shall transmit silence for 75±5 ms, and then proceed in accordance with Annex A/V.32 bis, Recommendation T.30, or other appropriate Recommendations.

11.2 Phase 2—Probing/ranging

Channel probing and ranging are performed in Phase 2 of the start-up procedure. The description below details the error-free and recovery procedure in the call and answer modems. Capabilities information and modulation parameters are sent in the INFO sequences.

11.2.1 Error Free Procedures

11.2.1.1 Call Modem 11.2.1.1.1 During the 75±5 ms silent period ending Phase 1, the call modem shall condition its receiver to receive $INFO_{0a}$ and detect Tone A. After the 75±5 ms silent period, the call modem shall send $INFO_{0c}$ with bit 28 set to 0, followed by Tone B.

11.2.1.1.2 After receiving $INFO_{0a}$, the call modem shall condition its receiver to detect Tone A and the subsequent Tone A phase reversal.

11.2.1.1.3 After detecting the Tone A phase reversal, the call modem shall transmit a Tone B phase reversal. The Tone B phase reversal shall be delayed so that the time duration between receiving the Tone A phase reversal at the line terminals and the appearance of the Tone B phase reversal at the line terminals is 40±1 ms. Tone B shall be transmitted for another 10 ms after the phase reversal. The modem shall then transmit silence and condition its receiver to detect a second Tone A phase reversal.

11.2.1.1.4 After detecting the second Tone A phase reversal, the call modem can calculate the round trip delay. The round trip delay estimate, RTDEc, is the time interval between the appearance of the Tone B phase reversal at the modem line terminals and receiving the second Tone A phase reversal at the line terminals minus 40 ms. The modem shall then condition its receiver to receive the probing signals L1 and L2.

11.2.1.1.5 The call modem shall receive signal L1 for its 160 ms duration. The call modem may then receive signal L2 for a period of time not to exceed 500 ms. The call modem shall then transmit Tone B and condition its receiver to detect Tone A and the subsequent Tone A phase reversal.

11.2.1.1.6 After detecting Tone A and the subsequent Tone A phase reversal, the call modem shall transmit a Tone B phase reversal. The Tone B phase reversal shall be delayed so that the time duration between receiving the Tone A phase reversal at the line terminals and the appearance of the Tone B phase reversal at the line terminals is 40±1 ms. Tone B shall be transmitted for an additional 10 ms after the phase reversal. The modem shall then transmit signal L1 followed by signal L2 and condition its receiver to detect Tone A.

11.2.1.1.7 After the call modem detects Tone A and has received the local echo of L2 for a period of time not to exceed 550 ms plus a round trip delay, the modem shall send $INFO_{1c}$.

11.2.1.1.8 After sending $INFO_{1c}$, the call modem shall transmit silence and condition its receiver to receive $INFO_{1a}$. After receiving $INFO_{1a}$, the modem shall proceed to Phase 3 of the start-up procedure.

11.2.1.2 Answer Modem 11.2.1.2.1 During the 75±5 ms silent period ending Phase 1, the answer modem shall condition its receiver to receive $INFO_{0c}$ and detect Tone B. After the 75±5 ms silent period, the answer modem shall send $INFO_{0a}$ with bit 28 set to 0, followed by Tone A.

11.2.1.2.2 After receiving INFO(K, the modem shall condition its receiver to detect Tone B and receive $INFO_{0c}$.

11.2.1.2.3 After Tone B is detected and Tone A has been transmitted for at least 50 ms, the answer modem shall transmit a Tone A phase reversal, and condition its receiver to detect a Tone B phase reversal.

11.2.1.2.4 After detecting the Tone B phase reversal, the answer modem can calculate the round trip delay. The round trip delay estimate, RTDEa, is the time interval between sending the Tone A phase reversal at the line terminals and receiving the Tone B phase reversal at the line terminals minus 40 ms.

11.2.1.2.5 The answer modem shall then transmit a Tone A phase reversal. The Tone A phase reversal shall be delayed so that the time duration between receiving the Tone B phase reversal (as in 11.2.1.2.4) at the line terminals and the appearance of the Tone A phase reversal at the line terminals is 40±1 ms. Tone A shall be transmitted for 10 ms after the phase reversal. Then the modem shall transmit signal L1 followed by signal L2 and condition its receiver to detect Tone B.

11.2.1.2.6 When Tone B is detected and the answer modem has received the local echo of L2 for a period of time not to exceed 550 ms plus a round trip delay, the answer modem shall transmit Tone A for 50 ms followed by a Tone A phase reversal. Tone A shall be transmitted for an additional 10 ms after the phase reversal. Then the modem shall transmit silence and condition its receiver to detect a Tone B phase reversal.

11.2.1.2.7 After detecting the Tone B phase reversal, the modem shall condition its receiver to receive the probing signals L1 and L2.

11.2.1.2.8 The answer modem shall receive signal L1 for its 160 ms duration. The answer modem may then receive signal L2 for a period of time not to exceed 500 ms. The answer modem shall then transmit Tone A and condition its receiver to receive $INFO_{1c}$.

11.2.1.2.9 After receiving $INFO_{1c}$ the modem shall send $INFO_{1a}$. After sending $INFO_{1a}$, the modem shall proceed to Phase 3 of the start-up procedure.

11.3 Phase 3—Equalizer and Echo Canceler Training

All signals in Phases 3 and 4 are transmitted using the selected symbol rate, carrier frequency, pre-emphasis filter and power level.

Equalizer and echo canceler training are performed in Phase 3 of the duplex start-up procedure. The description below details the error-free and recovery procedure in the call and answer modems.

11.3.1 Error Free Procedure 11.3.1.1 Call Modem 11.3.1.1.1 The call modem shall be initially silent and condition its receiver to detect S and the subsequent s̄. If the duration of signal MD indicated by $INFO_{1a}$ is zero, the modem shall proceed according to 11.3.1.1.2. Otherwise, after detecting the S-to-s̄ transition, the modem shall wait for the duration of signal MD as indicated by $INFO_{1a}$ and then shall condition its receiver to receive signal S and the S-to-s̄ transition.

11.3.1.1.2 After detecting signal S and the S-to-s̄ transition, the modem shall condition its receiver to begin training its equalizer using signal PP. After receiving signal PP, the modem may further refine its equalizer using the first 512T of signal TRN.

11.3.1.1.3 After receiving the first 512T of signal TRN, the modem shall condition its receiver to receive sequence J. After receiving J, the call modem may wait for up to 500 ms and then shall transmit signal S for 128T and signal s̄ for 16T.

11.3.1.1.4 If the duration of the call modem's MD signal, as indicated in the previous $INFO_{1c}$, is zero, the modem shall proceed according to 11.3.1.1.5. Otherwise, the modem shall transmit signal MD for the duration indicated in the previous $INFO_{1c}$ and then transmit S for 128T and signal s̄ for 16T.

11.3.1.1.5 The call modem shall then transmit signal PP.

11.3.1.1.6 After transmitting signal PP, the modem shall transmit signal TRN. Signal TRN consists of four constellation points and shall be transmitted for at least 512T. The total time from the beginning of transmission of signal MD to the end of signal TRN shall not exceed two round trip delays plus 2000 ms.

11.3.1.1.7 After transmitting signal TRN, the modem shall send sequence J and condition its receiver to detect signal S. After detecting signal S, the modem shall proceed to Phase 4 of the start-up.

11.3.1.2 Answer Modem 11.3.1.2.1 After sending sequence $INFO_{1a}$, the modem shall transmit silence for 70±5 ms, signal S for 128T and signal S for 16T. If the duration of the answer modem's MD signal, as indicated in the $INFO_{1a}$, is zero, the modem shall proceed according to 11.3.1.2.2. Otherwise, the modem shall transmit signal MD for the duration indicated in $INFO_{1a}$, signal S for 128T, and signal s̄ for 16T.

11.3.1.2.2 The answer modem shall then transmit signal PP.

11.3.1.2.3 After transmitting signal PP, the modem shall transmit signal TRN. Signal TRN consists of four constellation points and shall be transmitted for at least 512T. The total time from the beginning of transmission of signal MD to the end of signal TRN shall not exceed one round trip delay plus 2000 ms.

11.3.1.2.4 After transmitting signal TRN, the modem shall send sequence J and condition its receiver to detect signal S and the S-to-s̄ transition. After detecting the S-to-s̄ transition, the modem shall transmit silence. If the duration of signal MD indicated by $INFO_{1c}$ is zero, the modem shall proceed according to 11.3.1.2.5. Otherwise, it shall wait for the duration of signal MD as indicated by $INFO_{1c}$ and condition its receiver to detect signal S and the S-to-s̄ transition. After detecting the S-to-s̄ transition, the modem shall proceed according to 11.3.1.2.5.

11.3.1.2.5 The modem shall condition its receiver to begin its equalizer training using signal PP. The modem may further refine its equalizer using the first 512T of signal TRN.

11.3.1.2.6 After receiving the first 512T of signal TRN, the modem shall condition its receiver to receive sequence J. After receiving J, the answer modem may wait for up to 500 ms and shall then begin transmitting signal S. The modem shall then proceed to Phase 4 of the start-up.

11.4 Phase 4—Final Training

Final training of the modem in duplex mode and exchange of final data mode modulation parameters are performed in Phase 4 of the start-up procedure. The description below details the error-free and recovery procedure in the call and answer modems. Data mode modulation parameters are passed in the MP sequences.

11.4.1 Error Free Procedure 11.4.1.1 Call Modem 11.4.1.1.1 After detecting S followed by s̄, the call modem shall stop sending J sequences, condition its receiver to detect signal TRN, turn on circuit 107, transmit one J₃ sequence, and then transmit signal TRN.

11.4.1.1.2 After transmitting signal TRN for a minimum of 512T, the modem shall condition its receiver to receive sequence MP and may continue sending TRN for up to 2000 ms. After training adequately, the call modem shall then cease transmitting TRN and send sequence MP. After receiving the answer modem's MP sequence, the call modem shall complete sending the current MP sequence and then send MP' sequences (MP sequences with the acknowledge bit set).

11.4.1.1.3 The call modem shall continue sending MP' sequences until it receives MP' or E from the answer modem. The modem shall then complete the current MP' sequence and then send a single 20-bit E sequence. The modem can then determine the data signaling rates in both directions as follows:

If bit 50 of MP is set to 0 (symmetric rates) by either the call or answer modems, the call modem's transmit and receive rate shall be the maximum rate enabled in both modems that is less than or equal to the call-to-answer and answer-to-call rates specified in both modems' MP sequences.

If both call and answer modems have bit 50 set to 1 (asymmetric rate) the call modem's transmit rate shall be the maximum rate enabled in both modems that is less than or equal to the call-to-answer rates specified in both modems' MP sequences. The call modem's receive rate shall be the maximum rate enabled in both modems that is less than or equal to the answer-to-call rates specified in both modems' MP sequences.

11.4.1.1.4 After sending an E sequence, the call modem shall send B1 at the negotiated data signaling rate using the data mode modulation parameters, enable circuit 106 to respond to the condition of circuit 105, start a new superframe, and begin data transmission using the modulation procedures of clauses 5 to 9 of the ITU V.34 specification.

11.4.1.1.5 After receiving a 20-bit E sequence, the modem shall condition its receiver to receive B1. After receiving B1, the modem shall unclamp circuit 104, turn on circuit 109, and begin demodulating data.

11.4.1.2 Answer Modem 11.4.1.2.1 The answer modem shall transmit signal S for 128T, condition its receiver to detect sequence J' followed by signal TRN, and turn on circuit 107. The modem shall then transmit signal $\bar{s}$ for 16T followed by signal TRN.

11.4.1.2.2 After receiving 512T of signal TRN, the answer modem shall condition its receiver to receive sequence MP and continue transmitting TRN until its receiver is trained adequately. The modem shall transmit TRN for at least 512T but no longer than 2000 ms plus a round trip delay. It shall then send MP sequences. After receiving the call modem's MP sequence, the modem shall complete sending the current MP sequence, and then send MP' sequences (MP sequences with the acknowledge bit set).

11.4.1.2.3 The answer modem shall continue sending MP sequences until it has sent an MP' sequence and received MP' or E from the call modem. The modem shall then complete the current MP' sequence and send a single 20-bit E sequence. The modem shall determine the data signaling rates as follows:

If bit 50 of MP is set to 0 (symmetric rates) by either the call or answer modem, the answer modem's transmit and receive rate shall be the maximum rate enabled in both modems that is less than or equal to the call-to-answer and answer-to-call rates specified in both modems' MP sequences.

If both call and answer modems have bit 50 set to 1 (asymmetric rate) the answer modem's transmit rate shall be the maximum rate enabled in both modems that is less than or equal to the answer-to-call rates specified in both modems' MP sequences. The answer modem's receive rate shall be the maximum rate enabled in both modems that is less than or equal to the call-to-answer rates specified in both modems' MP sequences.

11.4.1.2.4 After sending the E sequence, the answer modem shall send B1 at the negotiated data signaling rate using the data mode modulation parameters. The modem shall then enable circuit 106 to respond to the condition of circuit 105, start a new superframe, and begin data transmission using the modulation procedures of clauses 5 to 9 of ITUJ V.34 specification.

11.4.1.2.5 After receiving a 20-bit E sequence, the answer modem conditions its receiver to receive B1. After receiving B1, the modem shall unclamp circuit 104, turn on circuit 109, and begin demodulating data.

ENTERING IDLE CONDITION

Rate Renegotiation 11.6 Rate Renegotiation

The rate renegotiation procedure can be initiated at any time during data mode to change to a new data signaling rate. This procedure can also be used to resynchronize the receiver without going through a complete retrain. In this case, signal TRN is transmitted until the receiver is prepared to enter data mode. Then the Modulation Parameters (MPs) sequence is sent. The TRN signal and the MP and E sequences are all sent using a 4-point constellation during rate renegotiation.

Error Free Procedure 11.6.1.1 Initiating Modem 11.6.1.1.1 To initiate a rate renegotiation, the modem shall turn OFF circuit 106, transmit signal S for 128T, followed by signal $\bar{s}$ for 16T. The modem may then transmit signal TRN for a maximum of 2000 ms plus a round trip delay, followed by sequence MP.

11.6.1.1.2 After detecting signal S, the modem shall clamp circuit 104 to binary one and be conditioned to detect the S-to-$\overline{S}$ transition. After detecting the S-to-$\overline{S}$ transition, the modem shall condition its receiver to receive sequence MP. When the modem has received at least one MP sequence, and the modem is sending MP sequences, the modem shall complete sending the current MP sequence and then send MP' sequences.

11.6.1.1.3 The initiating modem shall continue sending MP' sequences until it has sent an MP' sequence and received MP' or E from the responding modem. The modem shall then complete the current MP' sequence and send a single 20-bit E sequence. The initiating modem shall determine the data signaling rates as described in 11.4.1.1.3, if it is the call modem or in 11.4.1.2.3, if it is the answer modem.

11.6.1.1.4 After sending the E sequence, the initiating modem shall send B1 at the negotiated data signaling rate using the data mode modulation parameters. The modem shall then enable circuit 106 to respond to the condition of circuit 105, start a new superframe, and begin data transmission using the modulation procedures of clauses 5 to 9.

11.6.1.1.5 After receiving a 20-bit E sequence, the initiating modem shall condition its receiver to receive B1. After receiving B1, the modem shall unclamp circuit 104, and begin demodulating data.

11.6.1.2 Responding Modem 11.6.1.2.1 After detecting signal S, the responding modem shall clamp circuit 104 to binary one and be conditioned to detect the S-to-$\overline{S}$ transition. After detecting the S-to-$\bar{s}$ transition, the responding modem shall condition its receiver to detect sequence MP.

11.6.1.2.2 The responding modem shall then turn OFF circuit 106 and transmit signal S for 128T followed by signal $\overline{S}$ for 16T. The modem may then transmit signal TRN for a maximum of 2000 ms, followed by sequence MP. When the modem has received at least one MP sequence, and the modem is sending MP sequences, the modem shall complete sending the current MP sequence and then send MP' sequences.

11.6.1.2.3 The responding modem shall continue transmitting MP' sequences until it receives MP' or E from the initiating modem. The modem shall then complete the current MP' sequence and then send a single 20-bit E sequence. The responding modem shall determine the data signaling rates as described in 11.4.1.1.3, if it is the call modem or in 11.4.1.2.3, if it is the answer modem.

11.6.1.2.4 After sending an E sequence, the responding modem shall send B1 at the negotiated data signaling rate using the data mode modulation parameters, enable circuit 106 to respond to the condition of circuit 105, start a new superframe, and begin data transmission using the modulation procedures of clauses 5 to 9.

11.6.1.2.5 After receiving a 20-bit E sequence, the modem shall condition its receiver to receive B1. After receiving B1, the modem shall unclamp circuit 104, and begin demodulating data.

Cleardown 11.7 Cleardown

The cleardown procedure can be initiated at any time during data mode to terminate a connection gracefully. This procedure is similar to the rate renegotiation procedure.

11.7.1 Initiating Modem 11.7.1.1 To initiate a cleardown, the initiating modem shall transmit signal S for 128T and condition its receiver to detect signal S. The modem shall then transmit signal $\overline{S}$ for 16T, and send MP sequences requesting zeroes for the call-to-answer and answer-to-call data rates.

11.7.1.2 After detecting signal S from the responding modem, the initiating modem shall condition its receiver to detect $\overline{S}$ followed by MP sequences.

11.7.1.3 If the MP sequence from the responding modem has already been received, the modem shall send MP' sequences rather than MP sequences. After receiving MP sequences, the initiating modem shall send MP' sequences.

11.7.1.4 When the initiating modem is both receiving and sending MP' sequences, it shall terminate the connection.

11.7.2 Responding Modem 11.7.2.1 If a modem in data mode receives signal S followed by $\overline{S}$, it becomes the responding modem. The responding modem shall stop transmitting data and transmit signal S for 128T followed by signal $\overline{S}$ for 16T.

11.7.2.2 The responding modem shall then send MP sequences and condition its receiver to receive the initiating modem's MP sequence as in a normal rate renegotiation. If the MP sequence from the initiating modem has already been detected, the modem shall send MP' sequences rather than MP sequences. After detecting the MP sequence from the initiating modem, the responding modem shall send MP' sequences.

11.7.2.3 After the responding modem has both received an MP' sequence from the initiating modem requesting zeroes for the call-to-answer and answer-to-call data signaling rates, and has sent an MP' sequence, it shall then terminate the connection.

Figure 10A:
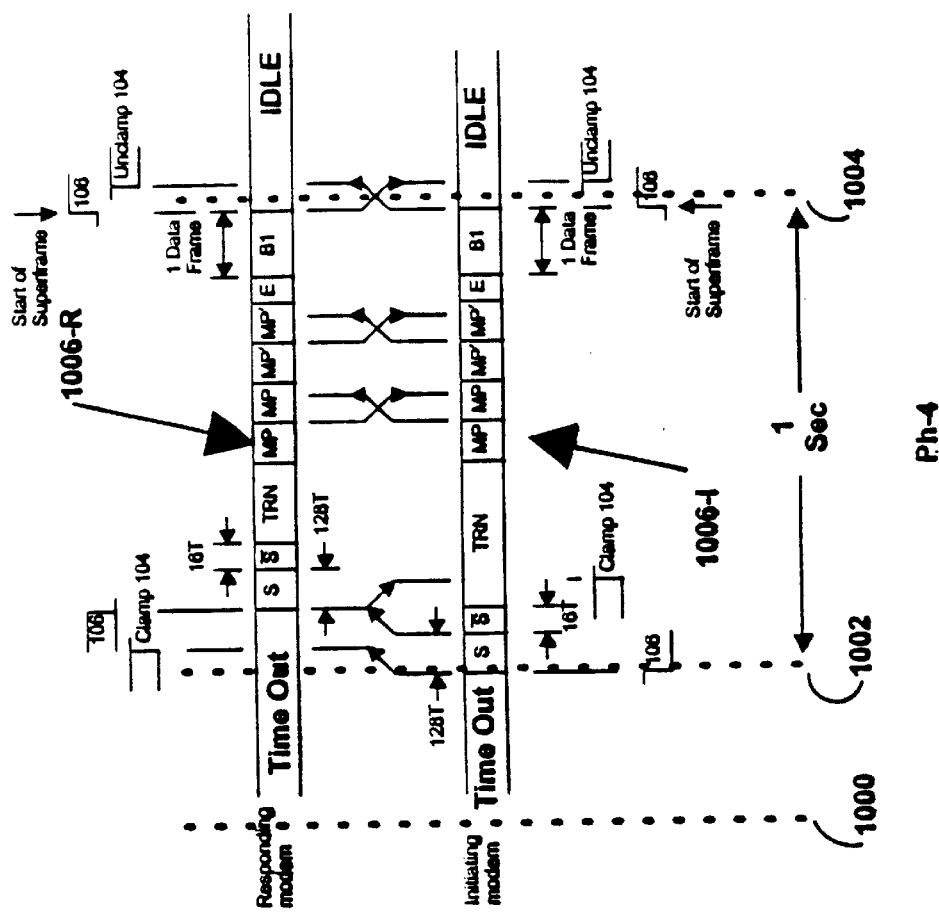
FIGS. 10A–C show an embodiment of modem protocols for entering and exiting an idle condition.

FIG. 10A shows the procedures for entering into an idle condition. In an embodiment of the invention, an idle condition is indicated by a message passed from the sending to the receiving modem. In another embodiment of the invention, an idle condition is indicated when the receiving modem experiences a sufficiently lengthy period of inactivity in the user data in both directions. Under either of these circumstances an idle may be appropriate.

In the example shown in FIG. 10A, a timeout of a sufficient duration occurs between over the time interval bracketed by reference numerals 1000–1002. Under the direction of the receiving DSP a rate reduction negotiation is commenced thereby reducing DSP resources devoted to processing the trivial traffic, i.e. no data. The interval 1002–1004 for this rate negotiation consumes less than 1 second. The receiving DSP, can, as mentioned above be either the global DSP, the remote line unit DSP or the line card DSP. In an embodiment of the invention, the rate renegotiation is conducted in accordance with the V.34 specification. In this protocol rates are reduced from a data rate, which can be as high as 33.6 kbps, to a monitoring rate which can be as low as 2400 bps. Similar considerations apply to high speed data modem traffic (HSDM). To reduce the rate, the modem parameter tables 1006-R and 1006-I are exchanged between the initiating and responding modem. The parameters exchanged can indicate either a rate lowering or a clear down. A clear down can take place in the traditional manner, i.e. with an end of session, or can occur without a hang up, according to protocols which will be described. An example of the required modifications for the V.34 protocol are shown in FIG. 11D. The rate renegotiation can be implemented by the receiving DSP operating on its own, or under the control of either the local 404 or global 604 [see FIGS. 4,6]. Once the rate has been reduced the task of monitoring the session for a resumption of traffic is passed off to the primary DSP. This pass-off occurs under the supervision of the local and global controls. The pass-off can be accompanied by the passing of session parameters from the backup DSP to the primary DSP. Next network, bus, and DSP resources are freed by the global and/or local control and reallocated to other new or active sessions.

Cleardown (Modified)

In another embodiment of the invention, a modified cleardown procedure is engaged in after an idle detection. For the V.34 modem the basic cleardown is specified by V.34 section 11.7 "Cleardown." However, once cleardown has occurred it is assumed that the session is terminated. In order to restore the session it is necessary to execute the entire retraining sequence.

In the modified procedure proposed here, the cleardown sequence would be modified at section 11.7.1.1 to indicate a cleardown and hold. There are several ways this procedure can be modified. An alternate to the "S" signal can be used. Alternatively, the MP sequences requesting zeros for the call-to-answer and answer-to-call data rates can be redefined to indicate the hold condition. See FIG. 11D for the definition of the bits in the MP sequences. Any distinctive pattern of bits in the MP messages can be used to indicate the cleardown-hold condition. One possibility would be to set "N", i.e. bits 20:23 to 15.

During this idle state condition, no DSP resources are required other than a small amount to monitor a request to restore the session. When new data appears for transmission, the initiating modem exits the cleardown-hold condition and enters the procedure as specified by 11.6 for rate renegotiation.

Figure 10B:
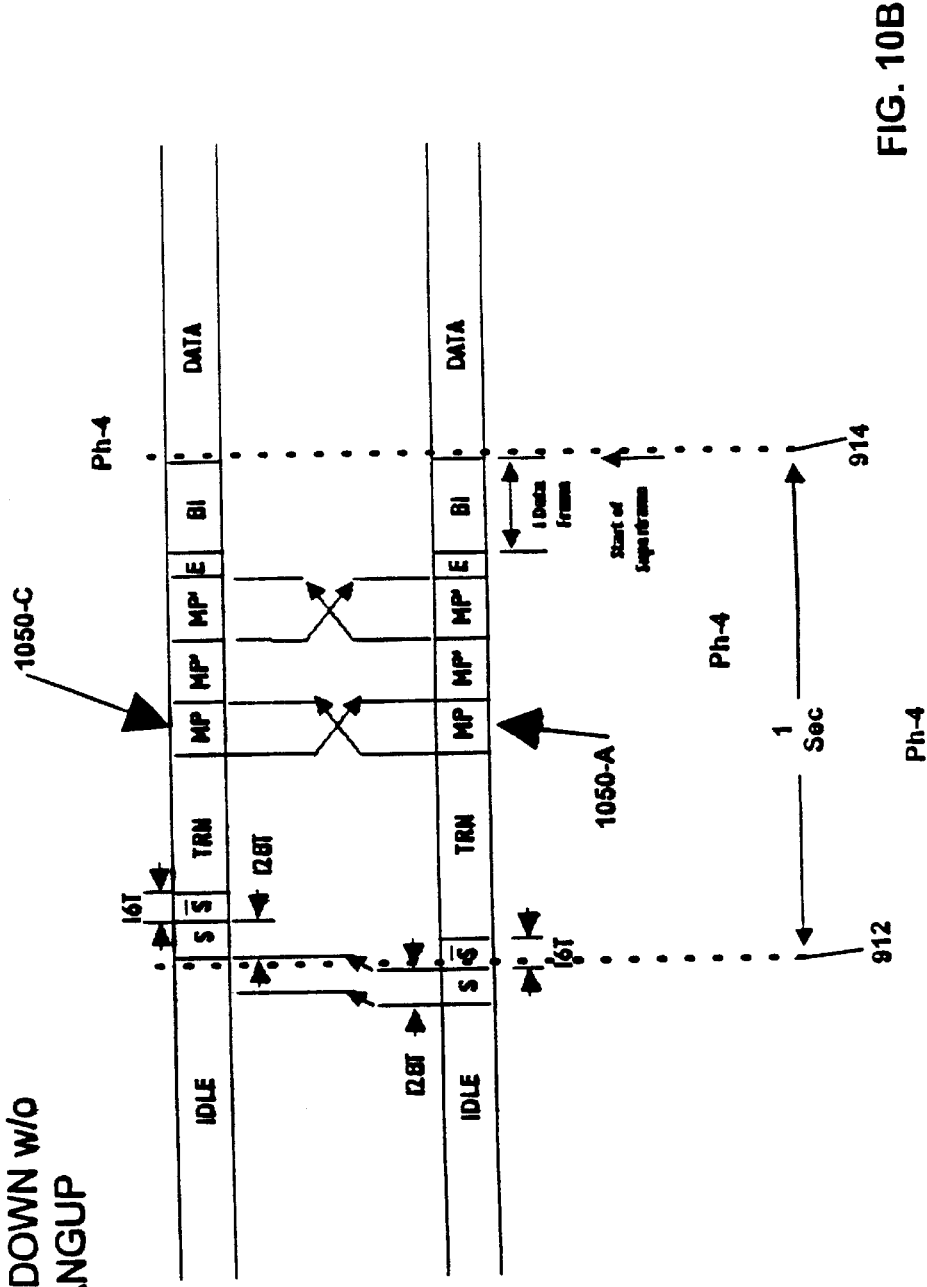

FIG. 10B shows the exit of an idle condition induced by a resumption of data activity after either a rate reduction or a clear down and hold. The amount of time required to resume data transmission upon returning from an idle condition is less than 1 second. This interval is bracketed by reference numerals 912–914. During interval rate renegotiation and parameter passing is accomplished. In the case of cleardown and hold, the approximately 9.2 second interval shown in FIG. 9 for modem startup is reduced to a 1 second interval, due to the storage of session parameters by the receiving DSP prior to cleardown and hold.

EXIT IDLE CONDITION

Initiating Modem

To initiate an exit from the idle condition, the modem shall transmit signal S for 128T, followed by signal $\overline{S}$ for 16T. The modem may then transmit signal TRN for a maximum of 2000 ms plus a round trip delay, followed by sequence MP 1050-C.

After detecting signal S, the modem shall be conditioned to detect the S-to-$\overline{S}$ transition. After detecting the S-to-$\overline{S}$ transition, the modem shall condition its receiver to receive sequence Mp. When the modem has received at least one MP sequence, and the modem is sending MP sequences, the modem shall complete sending the current MP sequence and then send MP' sequences.

The initiating modem shall continue sending MP' sequences until it has sent an MP' sequence and received MP' or E from the responding modem. The modem shall then complete the current MP' sequence and send a single 20-bit E sequence. The initiating modem shall determine the data signaling rates as described in V.34 section 11.4.1.1.3, if it is the call modem or in section 11.4.1.2.3, if it is the answer modem.

After sending the E sequence, the initiating modem shall send B1 at the negotiated data signaling rate using the data mode modulation parameters. The modem shall then enable circuit 106 to respond to the condition of circuit 105, start a new superframe, and begin data transmission using the modulation procedures of sections 5. to 9 of the ITU V.34 specification.

After receiving a 20-bit E sequence, the initiating modem shall condition its receiver to receive B1. After receiving B1, the modem shall unclamp circuit 104, and begin demodulating data.

Responding Modem

After detecting signal S, the responding modem shall be conditioned to detect the S-to-$\overline{S}$ transition. After detecting the S-to-$\overline{S}$ transition, the responding modem shall condition its receiver to detect sequence MP.

The responding modem shall transmit signal S for 128T followed by signal S̄ for 16T. The modem may then transmit signal TRN for a maximum of 2000 ms, followed by sequence MP. When the modem has received at least one MP sequence, and the modem is sending MP sequences, the modem shall complete sending the current MP sequence and then send MP' sequences.

The responding modem shall continue transmitting MP' sequences until it receives MP' or E from the initiating modem. The modem shall then complete the current MP' sequence and then send a single 20-bit E sequence. The responding modem shall determine the data signaling rates as described in V.34 section 11.4.1.1.3 if it is the call modem or in section 11.4.1.2.3 if it is the answer modem.

After sending an E sequence, the responding modem shall send B1 at the negotiated data signaling rate using the data modem modulation parameters, enable circuit 106 and respond to the condition of circuit 105, start a new superframe, and begin data transmission using the modulation procedures of sections 5. to 9 of the ITU V.34 specification. The amount of time required to resume data transmission upon returning from an idle condition is approximately 1 second. This interval is bracketed by reference numerals 912–914.

Figure 10C:
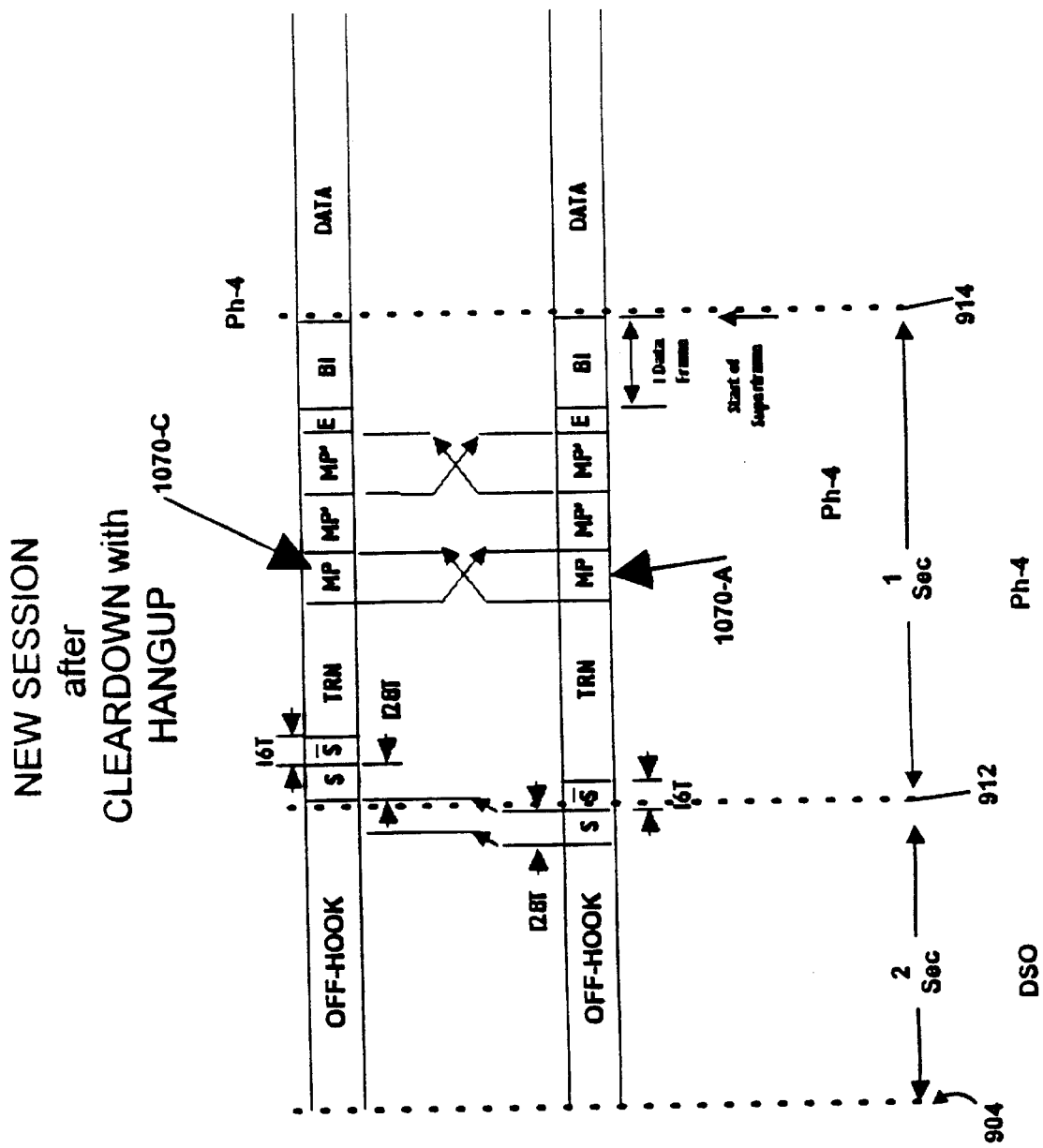

FIG. 10C shows an alternate embodiment of the current invention in which calling and answering modems can resume a session in less than 3 seconds, vs. the normal 9.2 second start up shown in FIG. 9. This feature of the current invention is made possible by modifications to the V.34 spec and the calling and answering modem which allow those modems to store parameters specific to a each designated destination modem on the presumption that the modem capabilities and line parameters from one session to the next are not likely to change. In this instance, phases 1 through 3 can be skipped provided that the calling and answering modem have stored modem parameter tables from their last session. In the event that the channel conditions have changed significantly, either of the modems can call for a full retrain returning them both to the beginning of Phase 2. Upon initiation of a call the 2 second interval bracketed by reference numbers 904, 912 is required to set up a DS0 channel. Then the modem parameter tables referenced as 1070-C and 1070-A corresponding respectively to the calling and answering modem parameter tables are passed during phase 4 of the session. Phases 1–3 are skipped because line characteristics, and modem capabilities have been stored.

FIGS. 11A–C show the INFO$_0$, INFO$_{1C}$ and INFO$_{1A}$ sequences referenced respectively as 914C/A, 916C and 916A. As shown in FIG. 11A, to indicate the desire to use parameter storage and/or passing capabilities, the modems could use for example, set bits 21:23 [reference number 1100] in the INFO$_0$ sequence and set those bits to 6. If it is desired to disable this feature after it is enabled, a modem could initiate a retrain and set these bits to some other value. En In FIG. 11D modulation parameter tables 918C-A are shown. By using bits in the MP sequences it is possible to signal many desired modes of operation taught in this invention. The ability to cleardown and hold and the ability of parameter storage and/or passing capabilities can be indicated by both modems before the feature is invoked. Once the modems had consented to use a certain feature set, the indication to initiate it could be made using bits 20:23 [ reference number 1180] of the MP sequence or some other unique pattern of bits in the MP sequence. Other alternatives such as defining new signals or escaping to a different mode exist once both modems have indicated joint capabilities.

Figure 12A:
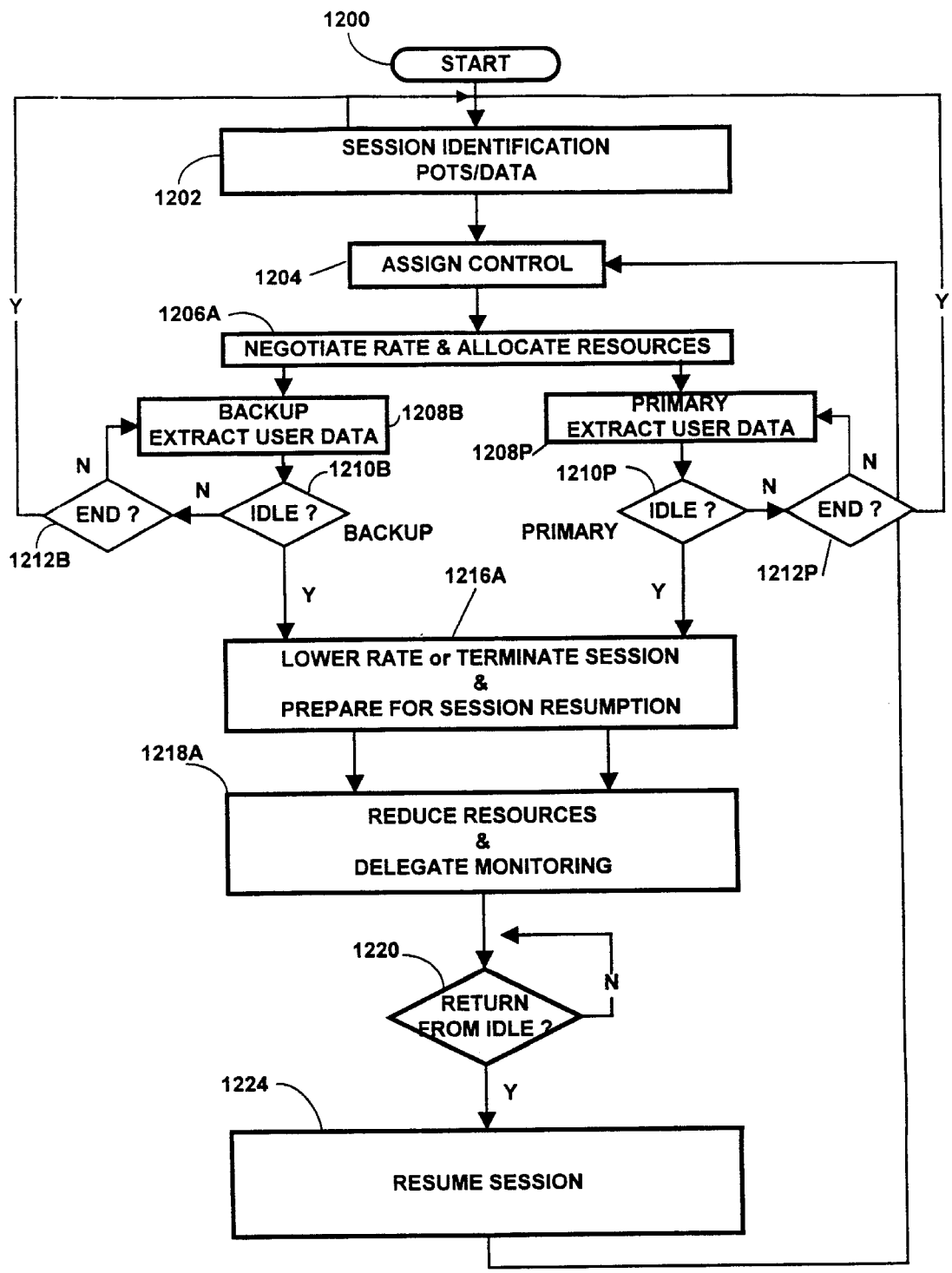
FIGS. 12A–B show alternate embodiments of the process flow associated with hierarchical signal processing.

FIG. 12A shows an embodiment of the processes implemented by the control entities, i.e. the global control unit and or the local control unit. These processes include hierarchical resource allocation of backplane bandwidth, hierarchical resource allocation of DSP resources, idle detection and statistical multiplexing. Processing begins at start block 1200 from which control is passed to process 1202. In process 1202 a new session is identified. If the session is POTS voice traffic, it is handled in this process by primary DSP resources which compand the traffic. Sessions identified as data sessions whether voice-band or broad-band are handled in process 1204 in which a data rate is negotiated. Control is then passed to the process 1206A. In process 1206A the global and or local controller allocates DSP resources for modem reception. These resources may be primary or backup. Backup resources may reside on the remote line unit or the global control unit. In an embodiment of the invention the control unit may also allocate backplane resources. In an alternate embodiment backplane resources can be allocated at a remote line unit level provided that the allocation information is transmitted to the global control unit.

From process 1206A control passes either to decision process 1210B/P depending on whether the primary or backup DSP has been allocated the task of modem reception. Decision process 1210P corresponds to line card DSP resources handling subscriber line modem reception. Decision process 1210B corresponds to backup DSP resources handling modem reception. Backup DSP resources can include remote line unit DSP card 402 [see FIG. 4] or global DSP resource 602 [see FIG. 6]. If an idle determination is made by the monitoring DSP, then control is passed from decision process 1208B/P to process 1216A. Alternately, if no idle determination is made then control is passed to the corresponding decision process 1212B/P. Decision processes 1212B/P determine whether an end of session, i.e. a cleardown in V.34 parlance is indicated. If that determination is in the affirmative then control returns to process 1202. Alternately if that determination is in the negative then control returns to process 1208B/P for further modem reception.

In process 1216A the onset of an idle condition results in the monitoring DSP lowering the rate at which the session is conducted or requesting a clear down and hold for the session. Control is then passed to process 1218A. In process 1218A monitoring of the session is delegated to the primary DSP. The delegation may be accompanied by parameter passing. Then backup and/or global DSP resources are reduced and backplane resources in both the control unit and remote line card units are freed. Monitoring is delegated to DSP's on the line card. Control is then passed to decision process 1220.

In decision process 1220 the primary DSP resource monitors the session for a return from idle or clear down and hold. In other embodiments secondary DSP resources could perform the monitoring. In the event this determination is in the affirmative control passes to process 1224. In process 1224 a resumption of session is indicated. Control is therefore returned to process 1204 for reassignment of processing resources for determining the user data of the session.

Figure 12B:
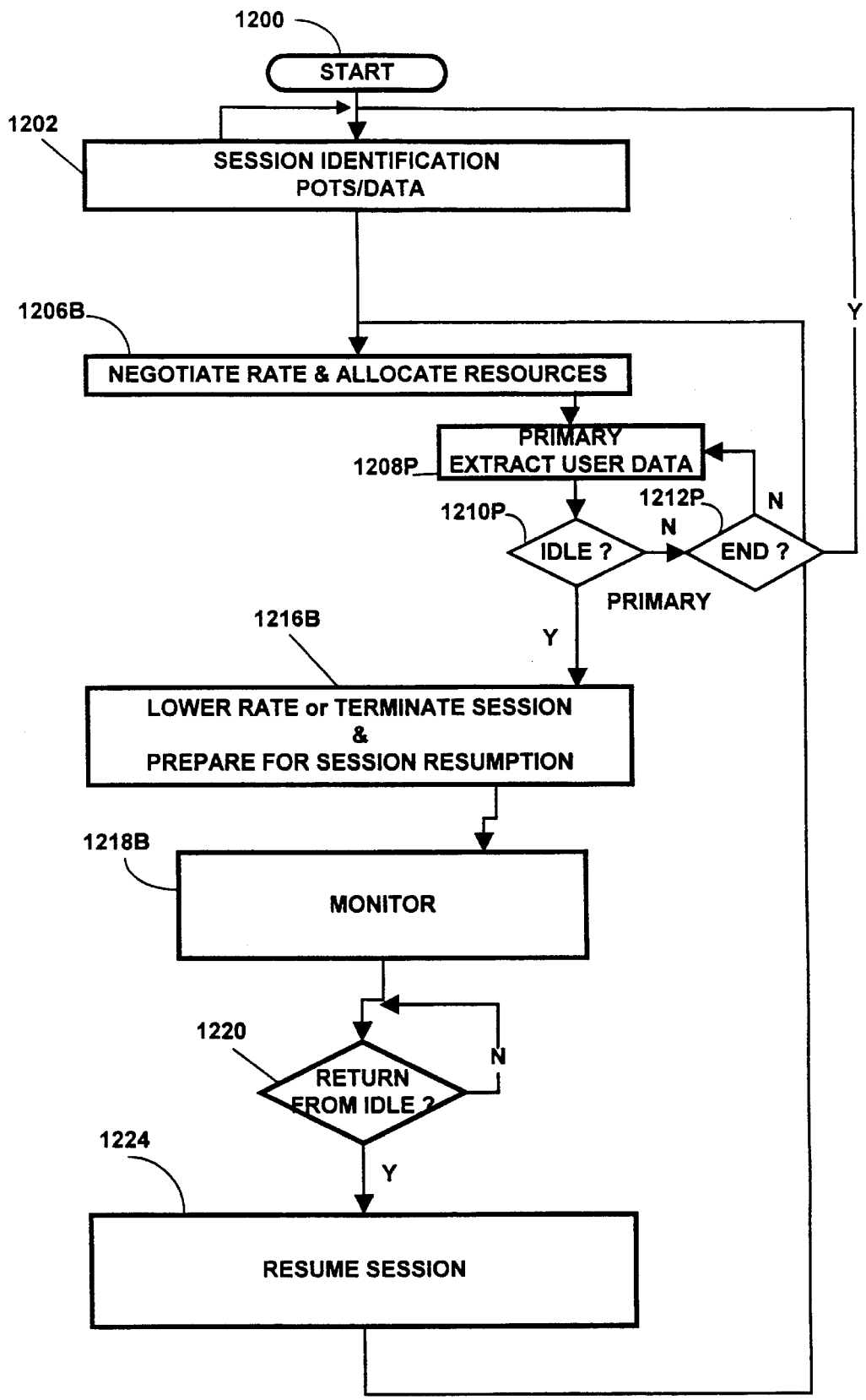

FIG. 12B shows an alternate embodiment of the current invention in which statistical multiplexing and idle detection are utilized to advantage without hierarchical DSP resourcing. These processes might for example be applied with advantage in a modem pooling arrangement in which a number of subscriber lines are switchably interfaced to a modem pool.

Processing begins at start block 1200 from which control is passed to process 1202. In process 1202, a determination is made as to whether on the basis of the caller ID the session connection is POTS or data traffic. For data traffic, control passes to process 1206B. POTS traffic is handled in process 1202. In process 1206B the calling and answering modem negotiate a rate and their resources are allocated. Control is then passed to process 1208P. In process 1208P the primary digital signal processing unit receives the call from the subscriber line. Control is then passed to decision block 1210P.

In decision block 1210P a determination is made as to whether an idle condition is detected by the receiving DSP. In the event that determination in the negative control passes to decision process 1212P. In decision process 1212P a determination is made as to whether an end of session is indicated. This might be indicated for example by a clear-down. In the event the determination is in the negative, control returns to process 1208P for continued modem reception. In the event that determination is in the affirmative control returns to process 1202 for identification of the next session.

When a determination in the affirmative is made that an idle detection has been made then control is passed to process 1216B. In process 1216B a rate lowering or session termination or clear down and hold is implemented. In preparation for a session resumption these preparations may include saving session parameters. Control is passed to the process 1218B. In process 1218B monitoring by the primary DSP of the subscriber line is enabled. Control then passes to decision process 1220. In the decision process 1220 a determination is made as to when a return from idle is indicated by the calling modem. In the event that determination is in the affirmative, control passes to process 1224. In process 1224 a resumption of session is indicated. Control is then returned to process 1206B in which an abbreviated rate negotiation is initiated.

Figure 13A:
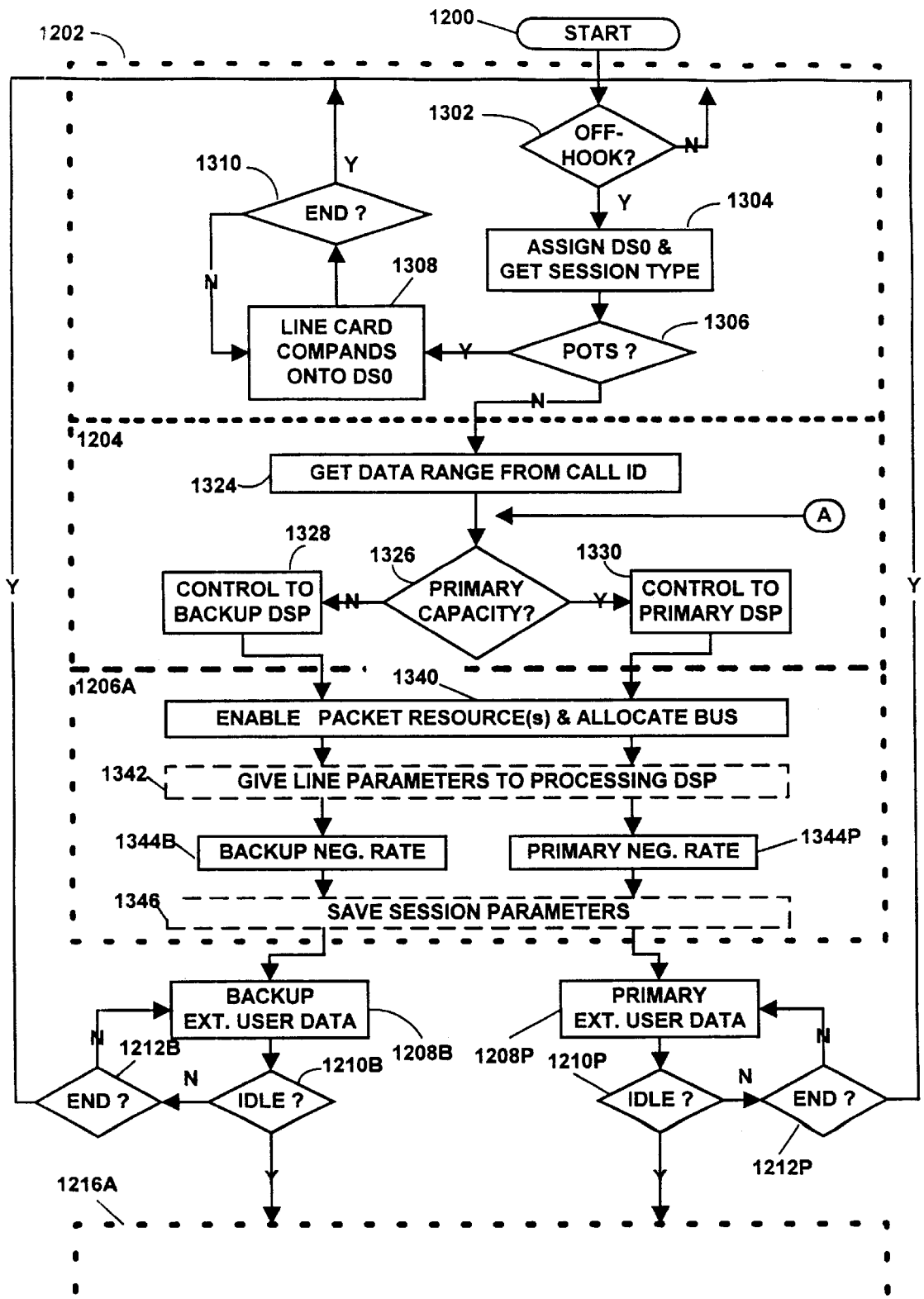
FIGS. 13A–B show detailed process flow associated with the hierarchical signal processing shown in FIG. 12A.
Figure 13B:
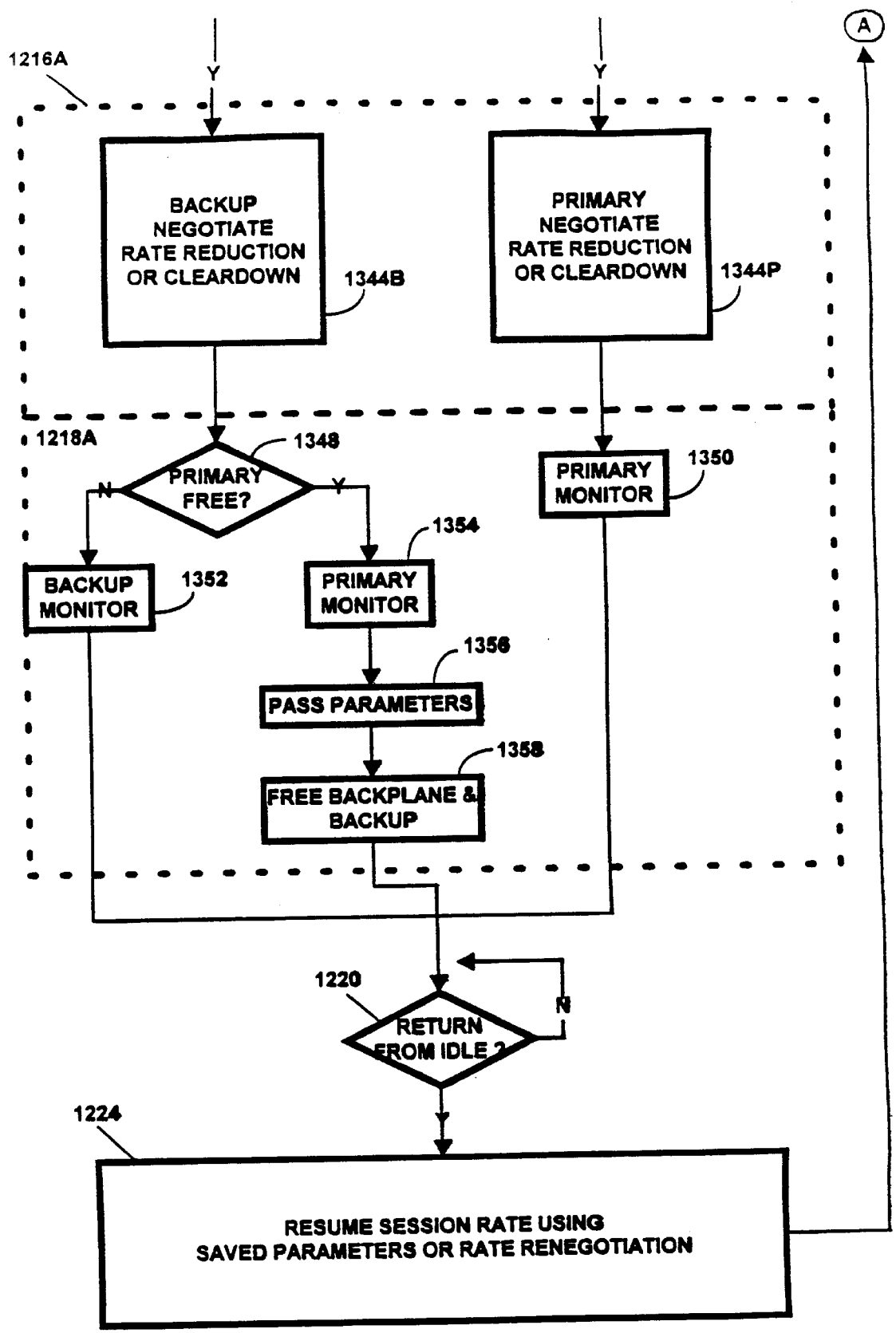

FIGS. 13A–B show in greater detail the processes set forth in FIG. 12A. Processing commences at start block 1200 from which control is passed to process 1202 and specifically to decision process 1302. In decision process 1204 a determination is made as to whether an off hook condition exists. In the event that determination is in the affirmative control is passed to process 1304. In process 1304 a new session is commencing and a DS0 channel is allocated for the session. The session type is identified on the basis of the dial tone or caller Id. This session identification is made by the control unit of the central office using a look up table correlating caller ID and/or destination number with a specific session e.g. POTS, V.34 or HSDM.

Control is then passed to decision process 1306. In decision process 1306 a determination is made as to whether the session type is POTS. In the event that determination is in the affirmative, control is passed to process 1308. In process 1308 the DSP on the line card compands the incoming POTS traffic and places it on the assigned DS0. Control then passes to decision process 1310. In decision process 1308 determination is made as to whether an end of POTS session is indicated. In the event that determination is in the affirmative control returns to decision process 1302 for the detection of a new session.

If in decision process 1306 a negative determination is reached, i.e. that the session type is data, e.g. V.34 or HSDM, then control is passed to process block 1204 and specifically process 1324 within that process block. In process 1324 a determination is made on the basis of call ID or destination ID, as to whether the call is a V.34 or HSDM session. The determination may also be based on saved parameters associated with the caller ID. In either event control is passed to decision process 1326. In decision 1326 the global controller determines DSP resource capacity at the line card, remote line unit chassis and global DSP levels. A determination is made as to whether the primary DSP, e.g. the DSP on the line card has available capacity sufficient to the upcoming data session. In the event that determination is in the affirmative, control has passed to process 1330 in which control is assigned to the primary DSP, e.g. the line card DSP. In the event that determination is in the negative, control is passed to process 1328. In process 1328 control is assigned to one of the backup DSP's, e.g. the line card DSP 402 [see FIG. 4] or the global DSP 602 [see FIG. 6].

In either event processing then passes to process block 1206A and specifically to process 1340 within that block. In process 1340, packet-switched cards 406, 606 [see FIG. 4, 6] at the remote line unit and possibly the global control unit are allocated. Backplane bus resources are also allocated. Control then passes to optional process 1342. In optional process 1342 stored line parameters are passed to whichever of the DSP's has been given control over the session. Control is then passed to either of processes 1344B or 1344P associated with whichever of the backup or primary DSP's is controlling the session. In those processes the controlling DSP negotiates the rate for the session. In the event parameters from current or previous sessions are stored, these were loaded in process 1342. Modem time will be reduced because phases 1, 2 and 3 shown in FIG. 9 can be skipped. For an initial session however in which no parameters have been saved, phases 1, 2, 3 and 4 will be implemented in processes 1344B/P. Control is then passed to optional process 1346 in which session parameters including the negotiated rates, line equalization parameters etc. are saved. Control is then passed to whichever of processes 1208B-P is associated with the DSP to which control has been allocated, i.e. the backup or primary DSP. Control is then passed to idle detection process 1210B-P for detection of an idle condition. In the event a controlling DSP does not detect an idle condition, control is passed to a decision process 1212P.

In decision process 1210B-P a determination is made as to whether an end of session indication has been received. In the event that determination is in the negative control returns to a corresponding one of reception processes 1208B–P. When idle is detected in either of decision processes 1210B–P, control is passed to process block 1216A as shown in FIG. 13B. Processing commences at a corresponding one of processes 1344B–P which is associated with the controlling DSP. In those processes the controlling DSP negotiates a rate reduction or cleardown with/without a hold with the calling modem. Control passes from process 1344B in which the backup has just negotiated a rate reduction or clear down to decision process 1348 within process block 1218A.

In decision process 1348, a determination is made by the control unit as to whether the primary DSP is free. In the event that determination is in the negative then control is passed to process 1352. In process 1352 the backup DSP continues monitoring the session and passes control to decision block 1220. Alternately if in decision process 1348 a determination is made that the primary is free then the control is passed to process 1354. In process 1354 the control unit assigns monitoring to the primary DSP. Control is then passed to process 1356 in the rate is reduced and the parameters associated with the session are passed to the primary DSP. Control is then passed to process 1358. In process 1358 the control unit [see unit 106 FIG. 1] frees back plane resources and backup DSP resources. Control is then passed to decision process 1220.

Alternately, control also passes to the process block 1218A from process 1344P in which the primary has just negotiated a rate reduction or a clear down. In that event control passes to process 1350 in which the primary continues monitoring at the session at a reduced rate and passes control to decision process 1220 in the event a return from idle is indicated.

When a return from idle is indicated in process 1220 by the monitoring DSP e.g. the backup or primary, control is then passed to process 1224. In process 1224 the session is resumed using either saved parameters or up-rate renegotiation. This is accomplished by returning control to splice block A which is shown in FIG. 13A to return control to decision block 1326 in which the control entity reallocates DSP resources for control and monitoring of the session. The session can be more quickly resumed in the following steps 1340B–P when line parameters associated with the session prior to idle are made available to the controlling DSP in process 1342. In this manner the session resumption features shown in detail in FIGS. 10B–D can be implemented.

Figure 14A:
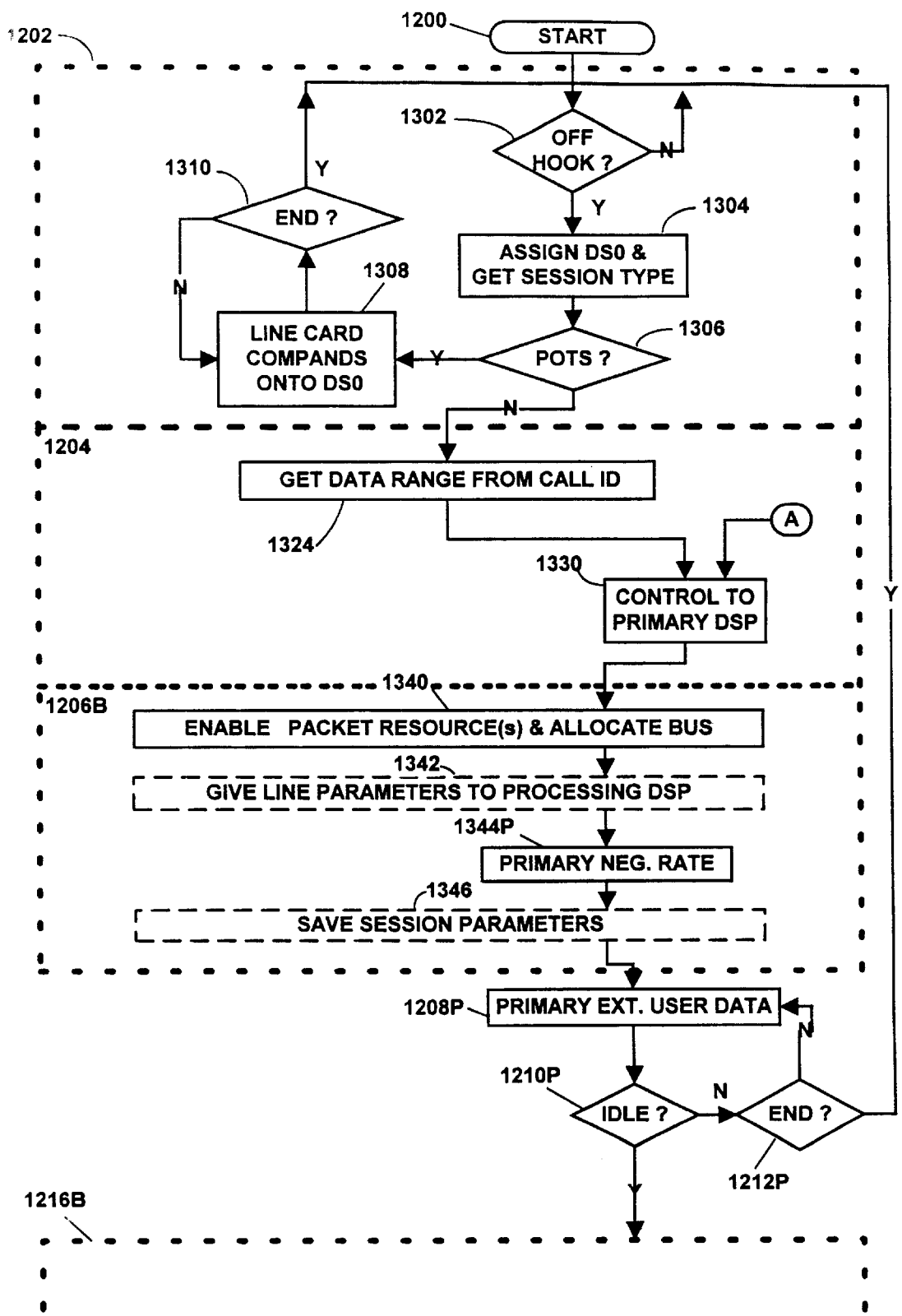
FIGS. 14A–B show detailed processes associated with the hierarchical signal processing shown in FIG. 12B.
Figure 14B:
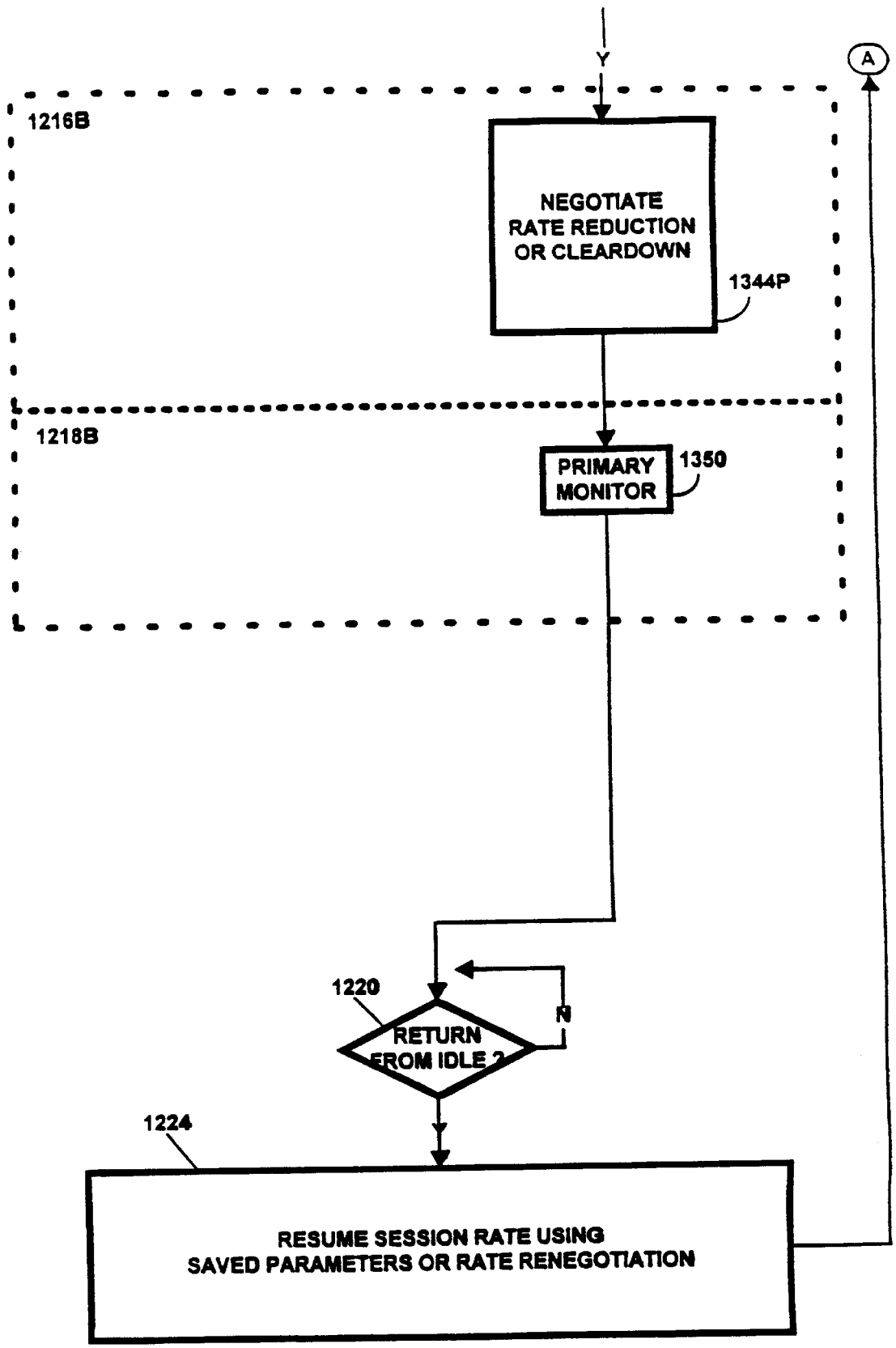

FIGS. 14A–B show in greater detail the processes set forth in FIG. 12B. Processing commences at start block 1200 from which control is passed to process block 1202 and specifically to decision process 1302. In decision process 1302 a determination is made as to whether an off-hook condition exists. If the determination is in the affirmative then control is passed to process 1304. In process 1304 a DS0 channel is allocated for the session and the session type is identified on the basis of the touch tone sequence, i.e. dual tone multiple frequency (DTIF), or caller ID. In an embodiment of the invention the session identification is made by the control unit of the central office using a look up table correlating caller ID and/or destination number with a specific session e.g. POTS, V.34 or HSDM. In another embodiment of the invention, the session identification is made by the global control unit 106 [see FIG. 6]. Control is then passed to decision process 1306. In decision process 1306 a determination is made as to whether the session type is POTS. In the event that determination is in the affirmative, control is passed to process 1308. In process 1306 the DSP on the line card compands the incoming POTS traffic and places it on to the assigned DS0. Control then passed to decision process 1310. In decision process 1310 a determination is made as to whether an end of POTS session is indicated. In the event that determination is in the affirmative control returns to decision process 1302.

If in decision process 1304 a negative determination is reached, i.e. that the session type is data, e.g. V.34 or HSDM then control is passed to process block 1204 and specifically process 1324 within that process block. In process 1324 a determination is made on the basis of call or destination ID as to whether the call is a V.34 or HSDM session. The determination may in an embodiment also be based on saved parameters associated with the call ID. In either event control has passed a decision process 1330 in which the primary DSP on the line card is allocated the processing for the session. Control then passes to process block 1206A and specifically to process 1340 within that block. In process 1340, packet-switched network resources at the remote line unit and possibly the global control unit. Backplane bus resources are also allocated. Control then passes to optional process 1342. In optional process 1342 stored line parameters are passed to the primary DSP. Control is then passed to process 1344P. The primary DSP negotiates the rate for the session in process 1344P. In the event there are stored parameters for a past session between the same call and answering modems or in the event parameters were saved prior to an idle condition, these parameters will be utilized to reduce the setup associated with resuming the session. Phases 1, 2 and 3 shown in FIG. 9 can be skipped. For an initial session however in which no parameters have been saved, phases 1, 2, 3 and 4 will be implemented in processes 1344P. Control is then passed to optional process 1346 in which session parameters including the line equalization parameters etc. are saved by the control entity. Control is then passed to process 1208P. In process 1208P the primary DSP extracts user data from the signal. Control is then passed to idle detection process 1210P for detection of an idle condition In the event a controlling DSP does not detect an idle condition, control is passed to a decision process 1212P.

In decision process 1212P a determination is made by the control modem as to whether an end of session indication has been received. In the event that determination is in the negative control returns to modem reception process 1208P. In the event the decision is in the affirmative control returns through splice block A to process 1302, to detect the next session.

As shown in FIG. 14B, when an idle is detected in decision processes 1210P control is passed to process block 1216B and specifically to process 1344P associated with the controlling DSP. The controlling DSP negotiates a rate reduction or cleardown with the calling modem. Control passes from process block 1218B and specifically to process 1350. In process 1350 the control unit assigns monitoring to the primary DSP. Control is then passed to process 1220 for monitoring of the session.

When a return from idle is indicated in process 1220 by the monitoring DSP whether it be back up or primary, control is passed to process 1224. In process 1224 the session is resumed using either saved parameters or rate renegotiation. This is accomplished by returning control to splice block A which is shown in FIG. 14A to return control to decision block 1330 in which the control entity reallocates DSP resources for control and monitoring of the session. The session can be more quickly resumed in the following steps 1340P when line parameters associated with the session prior to idle are made available to the controlling DSP.

The foregoing description of an embodiment of the present invention has been presented for purposes of illustration and description only. It is not intended to be exhaustive or to limit the invention to the forms disclosed. Obviously, many modifications and variations will be apparent to practitioners skilled in the art.

GLOSSARY OF TERMS

Auxiliary Channel

A 200 bit/s data channel which, along with the primary channel, is multiplexed into the bit stream transmitted by the modem. Data conveyed in the auxiliary channel is independent from the primary channel and may consist of secondary channel data and modem control data.

Constellation Shaping

A method for improving noise immunity by introducing a non-uniform two-dimensional probability distribution for transmitted signal points. The degree of constellation shaping is a function of the amount of constellation expansion.

Data Mode Modulation Parameters

Parameters determined during start-up and used during data mode transmission.

Frame Switching

A method for sending a fractional number of bits per mapping frame, on average, by alternating between sending an integer b—1 bits per mapping frame and b bits per mapping frame according to a periodic switching pattern.

Info Sequences

INFO sequences are used to exchange modem capabilities, results of line probing, and data mode modulation parameters. Two sets of INFO sequences are used: ($INFO_{0a}$, $INFO_{0c}$) and ($INFO_{1a}$, $INFO_{1c}$), where "a" identifies INFO sequences sent by the answer modem, and "c" identifies INFO sequences sent by the call modem. During start-up error recovery, two additional sequences are used to indicate an error condition: $INFOMARKS_a$ and $INFOMARKS_c$.

$Infomarks_c$ is transmitted by the call modem by applying binary ones to the differential phase shift key (DPSK) modulator described in 10.1.2.3.1.

$Infomarks_a$ is transmitted by the answer modem by applying binary ones to the DPSK modulator described in 10.1.2.3.1.

Line Probing

A method for determining channel characteristics by sending periodic signals, which are analyzed by the modem and used to determine data mode modulation parameters.

Nominal Transmit Power

Reference transmit power that is configured by the user. A modem that has negotiated a transmit power reduction in Phase 2 of the start-up procedures is said to be transmitting below the Nominal Transmit Power.

Non-linear Encoding

A method for improving distortion immunity near the perimeter of a signal constellation by introducing a non-uniform two-dimensional (2D) signal point spacing.

Precoding

A non-linear equalization method for reducing equalizer noise enhancement caused by amplitude distortion. Equalization is performed at the transmitter using preceding coefficients provided by the remote modem.

Pre-emphasis

A linear equalization method where the transmit signal spectrum is shaped to compensate for amplitude distortion. The pre-emphasis filter is selected using a filter index provided by the remote modem.

Primary Channel

The main data channel which, together with auxiliary channel data, constitutes the bit stream transmitted by the modem.

Shell Mapping

A method for mapping data bits to signal points in a multi-dimensional signal constellation, which involves partitioning a two-dimensional signal constellation into rings containing an equal number of points.

Trellis Encoding

A method for improving noise immunity using a convolutional coder to select a sequence of subsets in a partitioned signal constellation. The trellis encoders used in the V.34 recommendation are all four-dimensional (4D) and they are used in a feedback structure where the inputs to the trellis encoder are derived from the signal points.

xDSL Refers collectively to all types of digital subscriber lines, the two main categories being ADSL and SDSL. Two other types of xDSL technologies are High-data-rate DSL (HDSL) and Single-line DSL (SDSL). DSL technologies use sophisticated modulation schemes to pack data onto copper wires. They are sometimes referred to as last-mile technologies because they are used only for connections from a telephone switching station to a home or office, not between switching stations. xDSL is similar to ISDN inasmuch as both operate over existing copper telephone lines (POTS) and both require the short runs to a central telephone office (usually less than 20,000 feet). However, xDSL offers much higher speeds-up to 32 Mbps for downstream traffic, and from 32 Kbps to over 1 Mbps for upstream traffic.

ADSL Short for asymmetric digital subscriber line, a new technology that allows more data to be sent over existing copper telephone lines (POTS). ADSL supports data rates of from 1.5 to 9 Mbps when receiving data (known as the downstream rate) and from 16 to 640 bps when sending data (known as the upstream rate). ADSL requires a special ADSL modem. The ITU is currently defining an xDSL standard based on ADSL, called G.dmt.

SDSL Short for symmetric digital subscriber line, a new technology that allows more data to be sent over existing copper telephone lines (POTS). SDSL supports data rates up to 3 Mbps. SDSL works by sending digital pulses in the high-frequency area of telephone wires. Since these high frequencies are not used by normal voice communications, SDSL can operate simultaneously with voice connections over the same wires. SDSL requires a special SDSL modem. It is not currently available to the general public except in trial areas. SDSL is called symmetric because it supports the same data rates for upstream and downstream traffic. A similar technology that supports different data rates for upstream and downstream data is called asymmetric digital subscriber line (ADSL).

A Tone A is a 2400 Hz tone transmitted by the answer modem. Transitions between A and $\overline{A}$, and similarly between $\overline{A}$ and A, are 180 degree phase reversals in the 2400 Hz tone. During the transmission of A and $\overline{A}$, the answer modem sends a 1800 Hz guard tone without any phase reversals. Tone A is transmitted at 1 dB below the nominal transmit power while the guard tone is transmitted at the nominal transmit power.

B Tone B is a 1200 Hz tone transmitted by the call modem. Transitions between B and $\overline{B}$, and similarly between $\overline{B}$ and B, are 180 degree phase reversals in the 1200 Hz tone.

B1 Sequence B1 consists of one data frame of scrambled ones transmitted at the end of start-up using the selected data mode modulation parameters. Bit inversions for superframe synchronization are inserted as if the data frame were the last data frame in a superframe. Prior to transmission of B1, the scrambler, trellis encoder, differential encoder, and the pre-coding filter tap delay line are initialized to zeroes.

E E is a 20-bit sequence of binary ones used to signal the end of MP. It is mapped into a sequence of symbols chosen from the 4 or 16-point 2D constellation depending on the signal J. The 4-point E sequence is generated as described in 10.1.3.3. The 16-point E sequence is generated as described in 10.1.3.9.

J Sequence J consists of a whole number of repetitions of one of the two 16-bit patterns shown in Table 18. J indicates constellation size used by the remote modem for transmitting sequences TRN, MP, MP', and E during Phase 4 training. J is a sequence of symbols generated by applying input bits to the scrambler defined in clause 7. Two scrambled bits, $I1_n$, and $I2_n$, are transmitted every 2D symbol interval, where $I1_n$ is the first bit in time. Integers $I_n=2\times I2_n+I1_n$ are differentially encoded to generate the integer $Z_n$ as the modulo 4 sum of $I_n$ and $Z_{n-1}$. The transmitted points are obtained by rotating point 0 from the quarter-superconstellation of FIG. 5 clockwise by $Z_n\times 90$ degrees. The differential encoder shall be initialized using the final symbol of the transmitted TRN sequence.

PP Signal PP consists of six periods of a 48-symbol sequence and is used by the remote modem for training its equalizer. PP(i), i=0, 1, . . . , 287 is defined as follows:

S Signal S is transmitted by alternating between point 0 of the quarter-superconstellation of FIG. 5 and the same point rotated counterclockwise by 90 degrees. Signal $\overline{s}$ is transmitted by alternating between point 0 rotated by 180 degrees and point 0 rotated counterclockwise by 270 degrees. The signal S shall end with the transmission of point 0 rotated counterclockwise by 90 degrees. Signal $\bar{s}$ shall begin with the transmission of point 0 rotated by 180 degrees.

TRN Signal TRN is a sequence of symbols generated by applying binary ones to the input of the scrambler described in clause 7. The scrambled bits are mapped to a 4 or 16-point 2D constellation depending on the signal J. The 4-point TRN signal is generated by using two scrambled bits, $I1_n$ and $I2_n$, which are transmitted every 2D symbol interval, where $I1_n$ is the first bit in time. The transmitted points are obtained by rotating point 0 from the quarter-superconstellation of FIG. 5 clockwise by $I_n \times 90$ degrees, where $I_n = 2 \times I2_n + I1_n$. The 16-point TRN signal is generated by using four scrambled bits, $I1_n$, $I2_n$, $Q1_n$, and $Q2_n$, which are transmitted every 2D symbol interval and $I1_n$ is the first bit in time. The transmitted points are obtained by using integer $2 \times Q2_n + Q1_n$ to select a point from the quarter-superconstellation of FIG. 5 and then rotating that point clockwise by $I_n \times 90$ degrees, where $I_n = 2 \times I2_n + I1_n$. The scrambler is initialized to zero prior to transmission of the TRN signal.

What is claimed is:

1. A method for managing digital transmissions on a network, and the transmissions generated by a data terminal, and the method for managing comprising the acts of:

detecting in the digital transmissions a beginning of a decreased data throughput;

negotiating with the data terminal a decrease in a rate of the digital transmissions to zero, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting.

2. The method of claim 1, wherein the act of detecting in the digital transmissions the beginning of the decreased data throughput further comprises the acts of:

receiving communications generated by the data terminal; and detecting a null interval in the received communications.

3. The method of claim 1, wherein the act of detecting in the digital transmissions the beginning of the decreased data throughput further comprises the act of:

receiving an idle command from the data terminal indicating the beginning of a decreased data throughput.

4. The method of claim 1, wherein the act of detecting in the digital transmissions the beginning of the decreased data throughput further comprises the act of:

detecting a limit in a data processing resource.

5. The method of claim 1, wherein the data terminal implements a modem communications protocol, and wherein the act of negotiating with the data terminal the decrease in the rate of the digital transmissions further comprises the act of:

generating a rate renegotiation modem communications protocol with the data terminal to decrease data throughput.

6. The method of claim 5, wherein the modem communications protocol includes compatibility with at least one of V.34, V.34.bis, V.34/X2, V.pcm, HDSL, HDSL2, and ISDN.

7. A method for managing digital transmissions on a network, and the transmissions generated by a data terminal which implements a modem communications protocol, and the method for managing comprising the acts of:

detecting in the digital transmissions a beginning of a decreased data throughput;

negotiating with the data terminal a decrease in a rate of the digital transmissions, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting;

wherein the act of negotiating with the data terminal the decrease in the rate of the digital transmissions further comprises saving transmission parameters associated with the data terminal and the subscriber link; and wherein further the act of negotiating with the data terminal the increase in the rate of the digital transmissions further comprises initiating communications with the data terminal in accordance with the saved transmission parameters to increase data throughput.

8. The method of claim 7, wherein the transmission parameters in said saving act include at least one member of the transmission parameter group consisting of:

equalization, echo cancellation, gain control, baud rate, symbol rate, pre-emphasis, pre-coding, encoding, mapping, and error control.

9. A method for managing digital transmissions on a network, and the transmissions generated by a data terminal, and the method for managing comprising the acts of:

identifying a call session with the data terminal;

retrieving transmission parameters associated with the data terminal and subscriber link;

initiating communications with the data terminal at the transmission parameters obtained in said retrieving step;

detecting in the digital transmissions a beginning of a decreased data throughput;

negotiating with the data terminal a decrease in a rate of the digital transmissions, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting.

10. The method of claim 9, wherein the transmission parameters in said retrieving act include at least one member of the transmission parameter group consisting of: equalization, echo cancellation, gain control, baud rate, symbol rate, pre-emphasis, pre-coding, encoding, mapping, and error control.

11. The method of claim 9, wherein the modem communications protocol includes compatibility with at least one of V.34, V.34.bis, V.34/X2, V.pcm, HDSL, HDSL2, and ISDN.

12. A method for managing digital transmissions on a network, and the transmissions generated by a data terminal and the method for managing comprising the acts of:

detecting in the digital transmissions a beginning of a decreased data throughput;

negotiating with the data terminal a decrease in a rate of the digital transmissions, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting;

wherein the data terminal implements a modem communications protocol including:

network interaction, probing, ranging, equalizer, echo canceler and final training phases; and wherein the method for managing finder comprises the initial acts of identifying a call session with the data terminal;

retrieving transmission parameters corresponding to the data terminal and subscriber link; and initiating communications with the data terminal in accordance with the transmission parameters obtained in said retrieving step.

13. The method of claim 12, wherein the transmission parameters in said retrieving act include at least one member of the transmission parameter group consisting of: equalization, echo cancellation, gain control, baud rate, symbol rate, pre-emphasis, pre-coding, encoding, mapping, and error control.

14. The method of claim 12, wherein the modem communications protocol includes compatibility with at least one of V.34, V.34.bis, V.34/X2, V.pcm, HDSL, HDSL2, and ISDN.

15. The method of claim 12, wherein said act of initiating communications consists of the final training phase.

16. The method of claim 12, wherein said act of initiating communications further comprises the act of:

skipping at least one of the modem communications protocol phases.

17. The method of claim 1, wherein the act of detecting in the digital transmissions the beginning of the increased data throughput further comprises the acts of:

receiving communications generated by the data terminal;

detecting a non-null interval in the received communications.

18. The method of claim 1, wherein the act of detecting in the digital transmissions the beginning of the increased data throughput further comprises the act of:

receiving a return-from-idle command from the data terminal indicating the beginning of an increased data throughput.

19. The method of claim 1, wherein the interface comprises an analog subscriber link; and wherein the act of detecting in the digital transmissions the beginning of the increased data throughput further comprises the act of:

detecting an availability of a data processing resource.

20. The method of claim 1, wherein the data terminal implements a modem communications protocol, and wherein the act of negotiating with the data terminal the increase in the rate of the digital transmissions further comprises the act of:

generating a rate renegotiation protocol with the data terminal to increase data throughput.

21. The method of claim 20, wherein the modem communications protocol includes compatibility with at least one of V.34, V.34.bis, V.34/X2, V.pcm, HDSL, HDSL2, and ISDN.

22. A method for managing digital transmissions on a network, and the transmissions generated by a data terminal, and the method for managing comprising the acts of:

detecting in the digital transmissions a beginning of a decreased data throughput;

negotiating with the data terminal a decrease in a rate of the digital transmissions, responsive to the beginning of the decreased data throughput during said act of detecting;

monitoring the transmission of the data terminal;

detecting in the monitored transmission the beginning of an increased data throughput; and negotiating with the data terminal an increase in the rate of the digital transmissions, responsive to the beginning of the increased data throughput during said act of detecting;

wherein the data terminal implements a modem communications protocol including:

network interaction, probing, ranging, equalizer, echo canceler and final training phases; and wherein the act of negotiating with the data terminal the increase in the rate of the digital transmissions further comprises the acts of retrieving transmission parameters corresponding to the data terminal and subscriber link; and initiating communications with the data terminal in accordance with the transmission parameters obtained in said retrieving step.

23. The method of claim 22, wherein the transmission parameters in said retrieving act include at least one member of the transmission parameter group consisting of: equalization, echo cancellation, gain control, baud rate, symbol rate, pre-emphasis, pre-coding, encoding, mapping, and error control.

24. The method of claim 22, wherein said act of initiating communications consists of the final training phase.

25. The method of claim 22, wherein said act of initiating communications further comprises the act of:

skipping at least one of the modem communications protocol phases.

26. The method of claim 22, wherein the modem communications protocol includes compatibility with at least one of V.34, V.34.bis, V.34/X2, V.pcm, HDSL, HDSL2, and ISDN.

* * * * *